(12) United States Patent
Ando et al.

(10) Patent No.: US 8,854,934 B2
(45) Date of Patent: Oct. 7, 2014

(54) RECORDING APPARATUS, RECORDING METHOD, REPRODUCING APPARATUS, AND REPRODUCING METHOD

(71) Applicant: Sony Corporation, Tokyo (JP)

(72) Inventors: Hideki Ando, Tokyo (JP); Junichi Horigome, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/757,430

(22) Filed: Feb. 1, 2013

(65) Prior Publication Data

US 2013/0223198 A1 Aug. 29, 2013

(30) Foreign Application Priority Data

Feb. 29, 2012 (JP) ................................. 2012-044518

(51) Int. Cl.
*G11B 7/1374* (2012.01)
*G11B 7/0045* (2006.01)
*G11B 7/00* (2006.01)
*G11B 7/14* (2012.01)
*G11B 7/09* (2006.01)

(52) U.S. Cl.
CPC ...... *G11B 7/1374* (2013.01); *G11B 2007/0013* (2013.01); *G11B 7/14* (2013.01); *G11B 7/00458* (2013.01); *G11B 7/0901* (2013.01)
USPC .................. 369/44.26; 369/44.11; 369/44.14; 369/44.25; 369/112.24; 369/53.23

(58) Field of Classification Search
CPC ............. G11B 2007/0013; G11B 2007/13727; G11B 7/0938; G11B 7/094; G11B 7/0901; G11B 7/1374; G11B 7/2405; G11B 7/1275; G11B 7/24038; G11B 7/00781; G11B 7/08511; G11B 7/08523; G11B 7/08517
See application file for complete search history.

(56) References Cited

U.S. PATENT DOCUMENTS 8,619,521 B2 * 12/2013 Suzuki ........................ 369/44.26
2012/0075983 A1 * 3/2012 Yamasaki et al. ............. 369/284

FOREIGN PATENT DOCUMENTS

JP 2011-123978 6/2011

* cited by examiner

*Primary Examiner* — Wayne Young
*Assistant Examiner* — Dionne Pendleton
(74) *Attorney, Agent, or Firm* — K&L Gates LLP

(57) ABSTRACT

There is provided an recording apparatus including a light irradiation unit, a reference-plane tracking control unit, a recording unit that executes recording on the recording medium by independently modulating first and second recording beams when the recording beams radiated by the first and second objective lenses are designated as the first and second recording beams, respectively, a recording-layer tracking control unit that performs tracking control of the first objective lens based on reflected light of a first servo beam and tracking control of the second objective lens based on reflected light of a second servo beam when the servo beam radiated by the first objective lens is designated as the first servo beam and the servo beam radiated by the second objective lens is designated as the second servo beam, and a control unit that controls the reference-plane tracking control unit, the recording-layer tracking control unit, and the recording unit.

6 Claims, 38 Drawing Sheets

FIG. 5
A
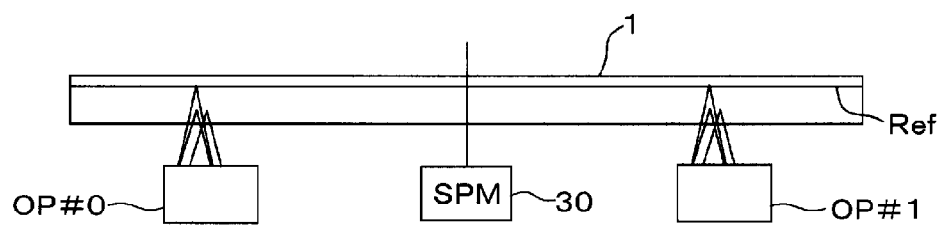
B
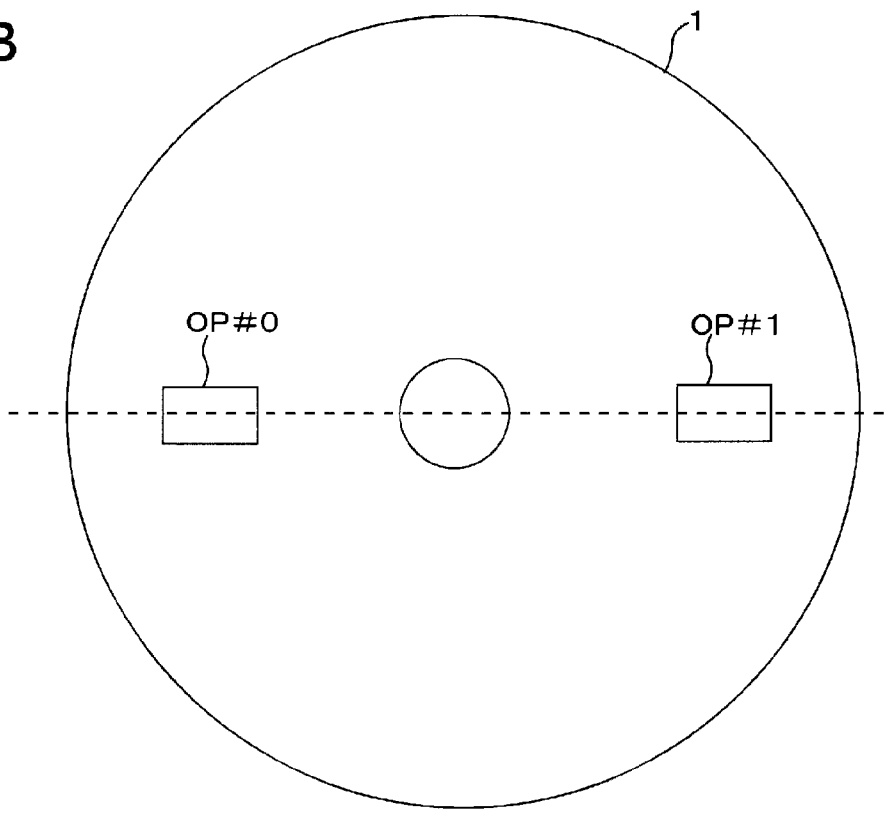

| PIT STRING F | – – – – – – – – – – * – ... |
| PIT STRING E | – – – – – – – – – * – – ... |
| PIT STRING D | – – – – – – – – * – – – ... |
| PIT STRING C | – – – – – – – * – – – – ... |
| PIT STRING B | – * – – – – * – – – – – ... |
| PIT STRING A | * – – – – * – – – – – – ... |

\* ON EACH PIT STRING IS 1 CH BIT

B

4ch bit = 1011 = Data bit 「0」
4ch bit = 1101 = Data bit 「1」

C

12ch bit = 1111 | 1111 | 1011 = Sync1
12ch bit = 1111 | 1111 | 0111 = Sync2
12ch bit = 1111 | 1111 | 1101 = Address Mark

RECORDING APPARATUS, RECORDING METHOD, REPRODUCING APPARATUS, AND REPRODUCING METHOD

CROSS REFERENCES TO RELATED APPLICATIONS

The present application claims priority to Japanese Priority Patent Application JP 2012-044518 filed in the Japan Patent Office on Feb. 29, 2012, the entire content of which is hereby incorporated by reference.

BACKGROUND

The present application relates to a recording apparatus and a reproducing apparatus that perform recording and reproducing on a recording medium having a reference plane on which a position guide is formed and a planar recording layer on which no position guide is formed, and recording and reproducing methods thereof.

As disclosed in Japanese Patent Application Publication No. 2011-123978, as an optical recording medium on which signals are recorded and from which signals are reproduced by irradiation of light, a so-called optical disc recording medium (also hereinafter simply referred to as an optical disc) such as a Compact Disc (CD), a Digital Versatile Disc (DVD), and a Blu-ray Disc (BD) (registered trademark) have become widespread.

In the related art, a large recording capacity has been achieved by improving information recording density in the optical disc. Specifically, a technique of reducing a formation pitch of a track serving as a pit string or a mark string, that is, improving recording density in a radial direction, and a technique of improving a recording density of a line direction (a direction perpendicular to the radial direction) by pit or mark size reduction have been adopted.

On the other hand, when a recording capacity is increased, a technique of increasing the number of recording layers (recording planes) is also effective, and a multilayer disc such as a disc of two layers or a disc of three or more layers has been proposed and come into practical use even at present.

However, in a recordable multilayer disc widely used at present, a recording layer on which a position guide (for example, a wobbling groove or the like) is formed as in the case of a single-layer disc is laminated.

When a multilayer disc having a plurality of recording layers with the above-described position guide is formed, it is necessary to perform a pattern transfer process using a stamper for lamination of each recording layer. Thus, costs increase due to an increase in the number of processes as compared with the case of a normal single-layer disc or two-layer disc.

In addition, when a failure in the pattern transfer process is considered, the yield is also deteriorated as compared with the single- to two-layer disc, and hence there is also a problem in that costs increase.

This applicant has proposed a multilayer recording medium 100 as illustrated in FIG. 35 as a multilayer recording medium having three or more recording layers.

As illustrated in FIG. 35, on the multilayer recording medium 100, a cover layer 101, a recording-layer formation region 102 (in which the number of recording-layer laminations is five of L1 to L5) in which a plurality of recording layers L are formed, an adhesive layer 103, a reflective film 104, and a substrate 105 are formed in order from an upper layer side.

Here, the "upper layer side" used here refers to an upper layer side when a surface on which laser light from a recording/reproducing apparatus that performs recording and reproducing on the multilayer recording medium 100 is incident is used as an upper side.

Within the recording-layer formation region 102, the recording layers L are formed by semi-transparent recording films. Intermediate layers are inserted between the semi-transparent recording films. It should be noted that no position guide is formed on each recording layer L (semi-transparent recording film) according to formation of a groove, a pit string, or the like as illustrated in the drawing. That is, each recording layer L is formed in a planar shape.

On a lower layer side of the recording-layer formation region 102, the reflective film 104 is formed via the adhesive layer (intermediate layer) 103 formed of a necessary adhesive material.

A position guide for guiding a recording/reproducing position is formed on the reflective film 104. When the position guide is formed on the reflective film, it means that the reflective film is formed on an interface on which the position guide is formed.

Specifically, in this case, the position guide is formed on one surface side of the substrate 105 in the drawing and hence a concave/convex cross-sectional shape as illustrated in the drawing is provided. The reflective film 104 is formed on a surface on which the concave/convex cross-sectional shape of the substrate 105 is provided and hence the position guide is formed on the reflective film 104. The substrate 105 is generated by injection molding or the like using a stamper for providing the concave/convex cross-sectional shape as the above-described position guide.

Here, it is possible to record information (absolute position information: radial position information and rotation angle information) representing an absolute position in a direction parallel to a recording in-plane direction of the multilayer recording medium 100 by forming the above-described position guide as in a current recordable disc. For example, this absolute position information can be recorded by modulation of a meandering (wobble) cycle of the groove when the position guide is formed in the groove, and recorded by modulation of a pit length or formation interval when the position guide is formed in the pit string.

In a state in which no position guide is formed on each recording layer L as described above, the recording position on each recording layer L is controlled based on reflected light from the reflective film 104 on which the position guide is formed as will be described later.

In this sense, the reflective film 104 (reflective surface) on which the position guide is formed is referred to as a "reference plane Ref."

According to the above-described multilayer recording medium 100, a process of forming the position guide necessary for formation of each recording layer L is unnecessary, and the multilayer recording medium can be implemented at a low cost.

Here, a specific recording technique for the multilayer recording medium 100 according to the above-described structure will be described.

The multilayer recording medium 100 is irradiated with recording-layer laser light to be radiated by targeting the recording layer L.

To implement position control during recording in the recording-layer laser light, laser light (hereinafter referred to as servo laser light) for performing position control based on the position guide in the reference plane Ref is also radiated to the multilayer recording medium 100.

Specifically, the recording-layer laser light and the servo laser light are radiated to the multilayer recording medium 100 via a common objective lens (objective lens 110) as illustrated in FIG. 35.

During recording of a mark targeting a recording layer L, the servo laser light as illustrated in the drawing is radiated to be focused on the reflective surface (the reference plane Ref) of the reflective film 104, and position control of the objective lens 110 is performed according to a tracking error signal obtained based on the reflected light (that is, a tracking servo is applied).

Thereby, it is possible to cooperatively control a position in a tracking direction of recording-layer laser light radiated via the same objective lens 110.

On the other hand, position control during reproduction can be implemented as follows.

Because a mark string (that is, a recorded track) is formed on a recording layer L during reproduction, it is possible to apply a tracking servo by only recording-layer laser light that targets the mark string. That is, the tracking servo can implement the position control of the objective lens 110 according to a tracking error signal obtained based on reflected light of the recording-layer laser light.

Here, when the above-described position control technique is adopted, the reflectance of the recording-layer laser light is forced to be increased on a reference plane Ref from which reflected light of servo laser light should be obtained if light having the same wavelength as the recording-layer laser light is used as the servo laser light. That is, there is a concern in that the number of stray light components is increased and reproduction performance is significantly deteriorated.

Thus, the servo laser light and the recording-layer laser light have different wavelengths, and a reflective film having wavelength selectivity is used as the reflective film 104 forming the reference plane Ref.

As a specific example, the wavelength of the recording-layer laser light is about 405 nm as in the case of the BD, and the wavelength of the servo laser light is about 650 nm as in the case of the DVD. As the reflective film 104, a wavelength-selective reflective film that selectively reflects light of the same wavelength band as the servo laser light and transmits or absorbs light by the other wavelengths is used.

According to the above-described configuration, it is possible to prevent an unnecessary reflected light component of the recording-layer laser light from being generated from the reference plane Ref and secure a good signal to noise ratio (S/N).

Incidentally, in the multilayer recording medium 100 in which a position guide such as a groove is not formed on the recording layer L, a seek for a recording start position during recording is performed using address information recorded on the reference plane Ref.

Specifically, during recording for the recording layer L, a recording start address on the reference plane Ref is specified based on a write command. First, according to the servo laser light, a seek operation is performed for a recording start address on the reference plane Ref is performed. According to the seek completion, recording by the recording-layer laser light is started. Thereby, it is possible to start recording of data from a position corresponding to the above-described recording start address on the recording layer L.

In addition, even for reproducing of information recorded on the recording layer L of the multilayer recording medium 100, first, the seek using an address on the reference plane Ref is performed. Specifically, the seek operation by the servo laser light is performed by targeting a reproduction start address on the reference plane Ref specified based on a read command.

After the seek operation based on the above-described address of the reference plane Ref has been performed, tracking servo control on the objective lens 110 is switched from servo control based on reflected light of the servo laser light to servo control based on reflected light of the recording-layer laser light. Thereby, it is possible to cause a beam spot of the recording-layer laser light to follow a track in the vicinity of the reproduction start position on the recording layer L.

Then, by reading the address information recorded on the recording layer L, the movement to a predetermined reproduction start position is possible and data reproduction from the reproduction start position can be started.

Although the outline of the recording/reproducing operation on the multilayer recording medium 100 in which no position guide is formed on the recording layer L has been described above, in practice, the occurrence of a deviation in an information recording position due to a spot position deviation between the recording-layer laser light and the servo laser light as will be described below should be considered when the recording/reproducing operation is performed on the multilayer recording medium 100.

Here, when the above-described position control technique is adopted, the deviation in the information recording position in a tracking direction occurs due to a lens shift of the objective lens 110 caused due to the eccentricity of the multilayer recording medium 100, the backlash of a slide mechanism of the optical pickup, or the like.

The lens shift according to the backlash of the slide mechanism used here means that a position of the objective lens 110 during tracking servo control is shifted to absorb its displacement according to rapid (instantaneous) displacement of the position of the optical pickup due to the occurrence of mechanical mechanistic backlash in the slide mechanism during slide spot control.

FIGS. 36A, 36B, and 36C are diagrams illustrating a principle in which the deviation in the information recording position is caused by the lens shift of the objective lens 110.

In FIGS. 36A, 36B, and 36C, FIG. 36A illustrates an ideal state in which the eccentricity of the multilayer recording medium 100 or the backlash of the slide mechanism is absent and the lens shift of the objective lens 110 does not occur, FIG. 36B illustrates the case in which the lens shift of the left direction (for example, assumed to be an outer circumferential direction) of the drawing (referred to as the eccentricity of a positive (+) direction) has occurred, and FIG. 36C illustrates the case in which the lens shift of the right direction (for example, assumed to be an inner circumferential direction) of the drawing (referred to as the eccentricity of a negative (−) direction) has occurred.

Although the case in which the reference plane Ref is formed on an upper layer side of the recording layer L has been illustrated in FIGS. 36A, 36B, and 36C for convenience of illustration, the deviation in the information recording position in the same principle occurs even when the reference plane Ref is formed on a lower layer side of the recording layer L as in FIG. 35 described above.

First, a central axis c of the drawing is a central axis set in designing an optical system, and the center of the objective lens 110 is consistent with the central axis c in the ideal state illustrated in FIG. 36A.

On the other hand, when the lens shift of the + direction has occurred as illustrated in FIG. 36B, the center of the objective lens 110 is shifted in the + direction with respect to the central axis c of the optical system.

At this time, because the servo laser light (patterned light rays in the drawing) is incident by parallel light on the objective lens 110, even when the shift from the central axis c of the objective lens 110 as described above occurs, the position change in the tracking direction of the focus position does not occur.

On the other hand, because the recording-layer laser light (outlined light rays in the drawing) is incident by non-parallel light on the objective lens 110 so as to be focused on the recording layer L formed in a depth position different from the reference plane Ref, the focus position (the information recording position) of the recording-layer laser light is changed by an extent corresponding to a lens shift amount in the + direction (a deviation amount +d in the drawing) as illustrated in the drawing with respect to the shift of the objective lens 110 in the + direction as described above.

In addition, when the lens shift in the − direction has occurred as illustrated in FIG. 36C, the information recording position of the recording-layer laser light is changed by an extent corresponding to a lens shift amount in the − direction (a deviation amount − d in the drawing) as illustrated in the drawing.

The recording/reproducing apparatus for the multilayer recording medium 100 described above with reference to FIG. 35 has the following configuration.

The recording-layer laser light and the servo laser light are radiated via the common objective lens 110.

The focus position of the recording-layer laser light is different from the focus position of the servo laser light.

The tracking servo control of the objective lens 110 is performed to cause the focus position of the servo laser light to follow the position guide formed on the reference plane Ref.

In this configuration, there is a problem in that the deviation in the information recording position of the recording-layer laser light occurs in the tracking direction due to the eccentricity of the disc, the backlash of the slide mechanism, or the like.

At this time, there is also a problem in that the information recording position may overlap between the adjacent guide grooves according to the size of the eccentricity or the like or the setting of the track pitch (the guide groove formation interval). Therefore, it is difficult to correctly reproduce a recording signal.

In addition, although the lens shift of the objective lens 110 that occurs as a main cause of the deviation in the information recording position has been described above, the deviation in the information recording position may also similarly occur due to a disc tilt.

As one measure for avoiding the above-described problems of the information recording position deviation, the track pitch can be widened to be greater than or equal to the change in the information recording position.

However, in this measure, there may be a problem in that the recording capacity is decreased due to the widening of the track pitch.

In addition, as another measure, a technique of configuring a system in which the disc is not detachable can also be provided.

Here, as a cause of the eccentricity, there is an error between an inner diameter of a disc and a clamp diameter of a spindle motor. In processing, it is difficult to completely remove the error therebetween so as to be zero, and hence the eccentricity is inevitable. In addition, even when the error therebetween has been removed so as to be zero, the eccentricity also occurs on the surface because the recording signal center of the reference plane of the disc is not necessarily coincident with the spindle shaft center of the recording apparatus. According to the system in which the disc is not detachable, the influence of the eccentricity is the same and hence it is possible to avoid the problem that recording positions overlap. Thereby, the track pitch can be reduced and hence the recording capacity can be increased by the reduction.

However, of course, because it is difficult to replace the disc in this technique, it is difficult to replace only the disc, for example, when the disc is defective. Further, it is difficult for another recording apparatus to read data recorded on a given apparatus. In other words, in this sense, the convenience is lost.

Therefore, as an effective technique for avoiding this problem, a so-called adjacent track servo (ATS) may be adopted. Originally, the ATS has been studied for a self-servo track writer (SSTW) in a hard disk drive.

FIG. 37 is a diagram illustrating the ATS.

As illustrated in the drawing, in the ATS, a recording spot Swr and an ATS spot Sats are configured to be formed on the recording layer L. The spot Swr and the spot Sats are formed by radiating source light rays to the recording medium via the common objective lens. At this time, the distance between the spots is fixed at a predetermined length.

In the ATS, the tracking servo is applied according to the ATS spot Sats by setting the recording spot Swr as a preceding spot (that is, the outer circumference side when a traveling direction of recording is Inner Circumference→Outer Circumference), setting the ATS spot Sats as the following spot, and targeting a mark string formed by the recording spot Swr. As a result, the tracking servo control of the objective lens causes the ATS spot Sats to follow a track one track before formed by the recording spot Swr.

According to the above-described ATS, because the track pitch can be constant at a distance between spots S, there is no problem of the tracks overlapping (the information recording positions overlapping) due to the influence of the eccentricity or the like. That is, it is not necessary to widen the track pitch marginally or configure the system in which the disc is not detachable by considering the deviation in the information recording position caused by the eccentricity or the like as described above.

SUMMARY

Incidentally, when recording is performed on the recording medium, twofold or more spirals may be simultaneously recorded to improve a recording rate.

Here, under the assumption that the recording is performed by the above-described ATS, an example of a technique for implementing simultaneous recording by two spirals will be described with reference to FIG. 38.

First, as the assumption, when the two spirals are simultaneously recorded according to the ATS, two recording spots Swr and two ATS spots Sats are necessary as illustrated in the drawing, and hence a total of four beams are radiated to the recording layer L.

A recording spot Swr responsible for recording of one of the two spirals serves as a first recording spot Swr#1 and a recording spot Swr responsible for recording of the other spiral serves as a second recording spot Swr#0. In addition, an ATS spot Sats for use in tracking position control for the first recording spot Swr#1 serves as a first ATS spot Sats#1, and an ATS spot Sats for use in tracking position control for the second recording spot Swr#0 serves as a second ATS spot Sats#0.

In the technique illustrated in FIG. 38, it is assumed that a pre-recording spiral is formed on the recording layer L in advance. Specifically, as the pre-recording spiral, a spiral with a pitch of 3×TP is formed when a track pitch set on the recording layer L is set as TP.

This pre-recording spiral can be recorded by radiating recording-layer laser light to the recording layer L while a drive apparatus performs servo control using the above-described reference plane Ref. However, in this case, an accurate spiral is unlikely to be drawn due to the occurrence of the above-described spot position deviation. The pre-recording spiral is recorded by a manufacturing side in advance using a highly precise writer or the like.

In the example of FIG. 38, the tracking servo is applied to the pre-recording spiral according to the ATS spot Sats#1 and recording by the recording spot Swr#1 is started.

The tracking servo by the ATS spot Sats#0 is applied with respect to a track (serving as the first spiral) recorded by the recording servo Swr#1, and hence recording by the recording spot Swr#0 is performed. Thereby, the second spiral running in parallel with the first spiral is simultaneously formed.

For example, according to the above-described technique, it is possible to simultaneously record twofold spirals based on the ATS.

In the above-described technique, because the second ATS spot Sats#0 traces the first spiral, its verification can be performed without interrupting recording. However, because there is no beam for tracing the first spiral at the second spiral side, the verification can be performed only when recording is interrupted.

It is desirable to perform verification without interrupting recording on any spirals when simultaneous recording of twofold or more spirals is performed for improving a recording rate under the assumption of recording by an ATS.

In the present application, the following configuration is provided as a recording apparatus.

That is, the recording apparatus of the present application includes a light irradiation unit configured to have two objective lenses by which a reference-plane beam to be radiated to a reference plane and a recording beam and a servo beam to be radiated to a recording layer are incident as optical beams to be radiated to a recording medium having the reference plane on which a position guide is formed and the recording layer formed in a planar shape, and radiate the reference-plane beam, the recording beam, and the servo beam to the recording medium using the objective lenses.

In addition, the recording apparatus of the present application includes a reference-plane tracking control unit configured to perform tracking control of a first objective lens based on reflected light of a first reference-plane beam and tracking control of a second objective lens based on reflected light of a second reference-plane beam when the reference-plane beam radiated by the first objective lens in the light irradiation unit is designated as the first reference-plane beam and the reference-plane beam radiated by the second objective lens in the light irradiation unit is designated as the second reference-plane beam.

In addition, the recording apparatus of the present application includes a recording unit configured to execute recording on the recording medium by independently modulating a first recording beam and a second recording beam when the recording beam radiated by the first objective lens is designated as the first recording beam and the recording beam radiated by the second objective lens is designated as the second recording beam.

In addition, the recording apparatus of the present application includes a recording-layer tracking control unit configured to perform tracking control of the first objective lens based on reflected light of a first servo beam and tracking control of the second objective lens based on reflected light of a second servo beam when the servo beam radiated by the first objective lens is designated as the first servo beam and the servo beam radiated by the second objective lens is designated as the second servo beam.

In addition, a control unit configured to control the tracking control units and the recording unit is provided.

The control unit executes a tracking servo by the second servo beam targeting a latest revolution part on a first spiral recorded by the first recording beam after recording by the first recording beam has been started while the first recording beam is moved by the tracking control of the first objective lens based on the reflected light of the first reference-plane beam so that a spiral with a pitch of at least twice a track pitch recorded on the recording layer is drawn, starts recording by the second recording beam in a state in which the tracking servo by the second servo beam has been applied to the latest revolution part, and executes tracking servo pull-in by the first servo beam targeting a second spiral after the first servo beam has been trued up to the second spiral according to control of the first objective lens.

According to the above-described recording apparatus of the present application, the tracking servo pull-in to the second spiral by the first servo beam succeeds and hence recording in which ATSs are mutually applied is started.

The recording in which the ATSs are mutually applied is implemented as described above, and hence it is possible to perform verification without interrupting recording on any spirals while a recording rate by simultaneous recording of twofold or more spirals is improved.

In addition, in the present application, the following configuration is also provided as a recording apparatus.

That is, the recording apparatus includes a light irradiation unit configured to have three objective lenses by which a reference-plane beam to be radiated to a reference plane and a recording beam and a servo beam to be radiated to a recording layer are incident as optical beams to be radiated to a recording medium having the reference plane on which a position guide is formed and the recording layer formed in a planar shape, and radiate the reference-plane beam, the recording beam, and the servo beam to the recording medium using the objective lenses.

In addition, the recording apparatus includes a reference-plane tracking control unit configured to perform tracking control on the objective lens radiating a received reference-plane beam based on a result obtained by receiving reflected light of the reference-plane beam radiated by each objective lens in the light irradiation unit.

In addition, the recording apparatus includes a recording unit configured to execute recording on the recording medium by independently modulating the recording beams radiated by the objective lenses.

In addition, the recording apparatus includes a recording-layer tracking control unit configured to perform tracking control on the objective lens radiating a received servo beam based on a result obtained by receiving reflected light of the servo beam radiated by each objective lens.

In addition, the recording apparatus includes a control unit configured to control the reference-plane tracking control unit, the recording-layer tracking control unit, and the recording unit.

When one set among sets of recording beams, servo beams, and reference-plane beams to be radiated via the objective lenses is a first set, another set is a second set, and still another set is an $m^{th}$ set, the control unit starts recording of a guide track at a pitch that is greater than or equal to at least a product of a track pitch set on the recording layer and the number of simultaneous recording spirals according to the first set, then starts recording by the recording beam after applying a tracking servo by the servo beam to a latest revolution track of the guide track according to the second set, starts recording by the recording beam by applying the tracking servo to a latest revolution track of recording tracks by a set with which recording has been started by applying the tracking servo to a latest revolution track of recorded tracks just before according to the servo beam for all sets when there are sets other than the first, second, and $m^{th}$ sets, starts recording by the recording beam by applying the tracking servo by the servo beam to a latest revolution track of recording tracks of a set with which the recording has been started by applying the tracking servo to a latest revolution track of immediately previously recorded tracks according to the $m^{th}$ set, and performs pull-in of the tracking servo using a servo beam of the first set by targeting a recording track of the $m^{th}$ set after the servo beam of the first set has been trued up to a recording track side by the $m^{th}$ set according to control of an objective lens of the first set after the start of the recording by the $m^{th}$ set.

According to the above-described configuration, the pull-in of the tracking servo by the servo beam of the first set is executed, so that it is possible to obtain a state in which the tracking servo has been applied to recording tracks by recording beams of separate sets using servo beams of all the sets without redundancy. That is, it is possible to obtain a state in which one servo beam necessarily traces each spiral with respect to all spirals to be simultaneously recorded.

As a result, it is possible to perform verification without interrupting recording for all spirals to be simultaneously recorded. In addition, of course, it is possible to improve the recording rate by simultaneous recording using a plurality of beams.

In addition, in the present application, the following configuration is provided as a reproducing apparatus.

That is, the reproducing apparatus of the present application includes a light irradiation unit configured to radiate a reference-plane beam to be radiated to a reference plane and n (n is a natural number greater than or equal to 2) recording-layer beams to be radiated to a recording layer to a recording medium on which data recording has been performed using n or more spirals as one set on the recording layer via a common objective lens, wherein the recording medium has the reference plane on which a position guide is formed and the recording layer formed in a planar shape.

In addition, the reproducing apparatus includes a reference-plane position control unit configured to control a spot position of the reference-plane beam on the reference plane by performing at least position control of the objective lens based on a result obtained by receiving reflected light of the reference-plane beam.

In addition, the reproducing apparatus includes a recording-layer position control unit configured to control a spot position of the recording-layer beam on the recording layer by performing at least position control of the objective lens based on a result obtained by receiving reflected light of at least one recording-layer beam among the recording-layer beams.

In addition, the reproducing apparatus includes a control unit configured to control the reference-plane position control unit and the recording-layer position control unit so that a seek operation is performed by targeting a position at which one of the n recording-layer beams is placed on one corresponding spiral in the n-spiral set on which data serving as a reproduction target has been recorded.

According to the above-described reproducing apparatus of the present application, when reproduction is performed on a recording medium on which data recording has been performed using n or more (n is a natural number greater than or equal to 2) spirals as one set, it is possible to prevent a seek operation from being performed at a position at which some of n recording-layer beams are placed on spirals other than a reproduction target and consequently to effectively prevent an ineffective read part from occurring.

In accordance with the present application as described above, it is possible to perform verification without interrupting recording on any spirals when simultaneous recording of twofold or more spirals is performed for improving a recording rate under the assumption of recording by an ATS.

In addition, according to a reproducing apparatus (reproducing method) of the present application, it is possible to effectively prevent an ineffective read part from occurring in a seek operation at a position at which some of n (n is a natural number greater than or equal to 2) recording-layer beams are placed on spirals other than a reproduction target when reproduction is performed from a recording medium on which data recording is performed on n or more spirals serving as one set.

Additional features and advantages are described herein, and will be apparent from the following Detailed Description and the figures.

BRIEF DESCRIPTION OF THE FIGURES

FIGS. 5A and 5B are diagrams illustrating an outline of a configuration for implementing simultaneous recording of twofold spirals;

FIGS. 17A, 17B, and 17C are diagrams illustrating a specific example in which address information is recorded on the reference plane;

DETAILED DESCRIPTION

Figure 1:
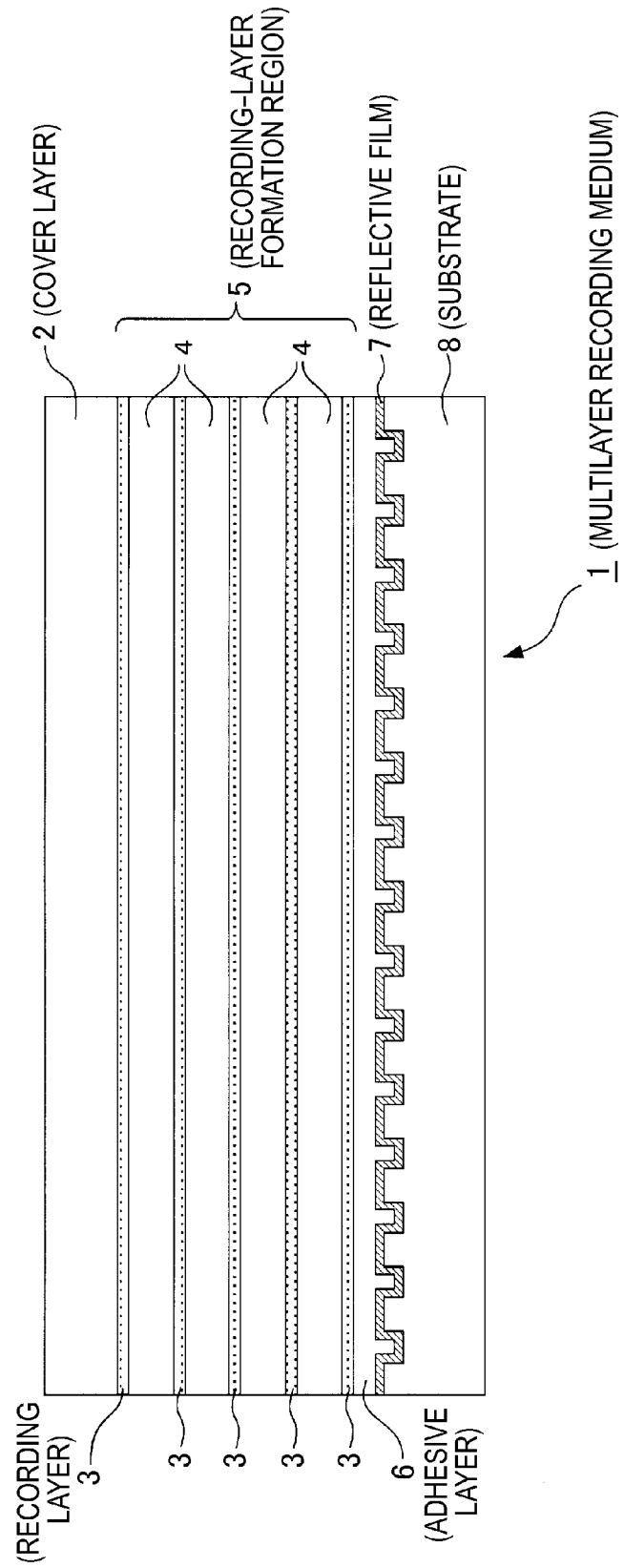
FIG. 1 is a diagram illustrating a cross-sectional structure of a recording medium of an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments in accordance with the present application will be described.

Description will be given in the following order.
<1. Recording Medium of Embodiment>
<2. Position Control Technique>
<3. Recording Technique of Embodiment>
<4. Arbitrary Pitch Spiral Movement Control>
<5. Reproducing Technique of Embodiment>
<6. Configuration of Recording/Reproducing Apparatus of Embodiment>
<7. Processing Procedure>
<8. Modified Example>

1. Recording Medium of Embodiment

FIG. 1 is a diagram illustrating a cross-sectional structure of a multilayer recording medium 1 serving as a recording medium of an embodiment.

As illustrated in FIG. 1, a cover layer 2, a recording-layer formation region 5 in which a plurality of recording layers 3 are formed, an adhesive layer 6, a reflective film 7, and a substrate 8 are formed in order from the upper layer side in the multilayer recording medium 1.

Here, in the specification, the "upper layer side" refers to an upper layer side when a surface on which laser light from a recording apparatus (recording/reproducing apparatus 10) to be described later is incident is assumed to be an upper surface.

In the multilayer recording medium 1, the cover layer 2, for example, is formed of resin, and functions as a protective layer of the recording-layer formation region 5 formed on the lower layer side thereof.

As illustrated in the drawing, the recording-layer formation region 5 includes the plurality of recording layers 3 and intermediate layers 4 therebetween. In other words, in this case, the recording-layer formation region 5 is formed by iterative lamination of Recording Layer 3→Intermediate Layer 4→Recording Layer 3→Intermediate Layer 4 . . . →Recording Layer 3.

The recording layer 3 is formed by a semi-transparent recording film. The intermediate layer 4, for example, is formed of a resin material such as a thermoplastic resin or ultraviolet curable resin.

Although five recording layers 3 are formed within the recording-layer formation region 5 for convenience of illustration in this drawing, this is only exemplary. The number of recording layers may be a number other than "5."

Here, in the recording-layer formation region 5, a position guide associated with formation of a groove or pit string or the like is not formed on each recording layer 3 as is apparent from the drawing. That is, each recording layer 3 is formed in a planar shape.

When the above-described recording-layer formation region 5 is created, a process of forming a position guide for every recording layer necessary for manufacturing a current multilayer disc is unnecessary and consequently manufacturing costs and mass production costs of the multilayer recording medium 1 can be effectively reduced.

On the lower layer side of the recording-layer formation region 5, the reflective film 7 is formed via the adhesive layer (intermediate layer) 6 formed of a necessary adhesive material.

On the reflective film 7, a position guide for guiding a recording/reproducing position is formed. As described above, when the position guide is formed in the reflective film, this means that the reflective film is formed on an interface on which the position guide is formed.

Specifically, in this case, a concave/convex cross-sectional shape as illustrated in the drawing is provided by forming the position guide on one side of the substrate 8 of the drawing, and the position guide is formed on the reflective film 7 by forming the reflective film 7 on a surface on which the concave/convex cross-sectional shape of the substrate 8 is provided.

The substrate 8, for example, is formed of a resin such as polycarbonate. The substrate 8 can be generated by injection molding or the like using a stamper for providing the concave/convex cross-sectional shape as the above-described position guide.

Here, it is possible to record address information (absolute position information: radial position information and rotation angle information) representing an absolute position in a direction parallel to a recording in-plane direction of the multilayer recording medium 1 by forming the above-described position guide as in a current recordable optical disc. For example, this absolute position information can be recorded by modulation of a meandering (wobble) cycle of the groove when the position guide is formed using the groove, and recorded by modulation of a pit length or formation interval or the like when the position guide is formed using the pit string.

As will be described later, in this example, the position guide is formed by the pit string.

In a state in which no position guide is formed on each recording layer 3 as described above, the recording position on the recording layer 3 is controlled based on reflected light from the reflective film 7 on which the position guide is formed as will be described later.

In this sense, hereinafter, the reflective film 7 (reflective surface) on which the position guide is formed is referred to as a "reference plane Ref."

2. Position Control Technique

Figure 2:
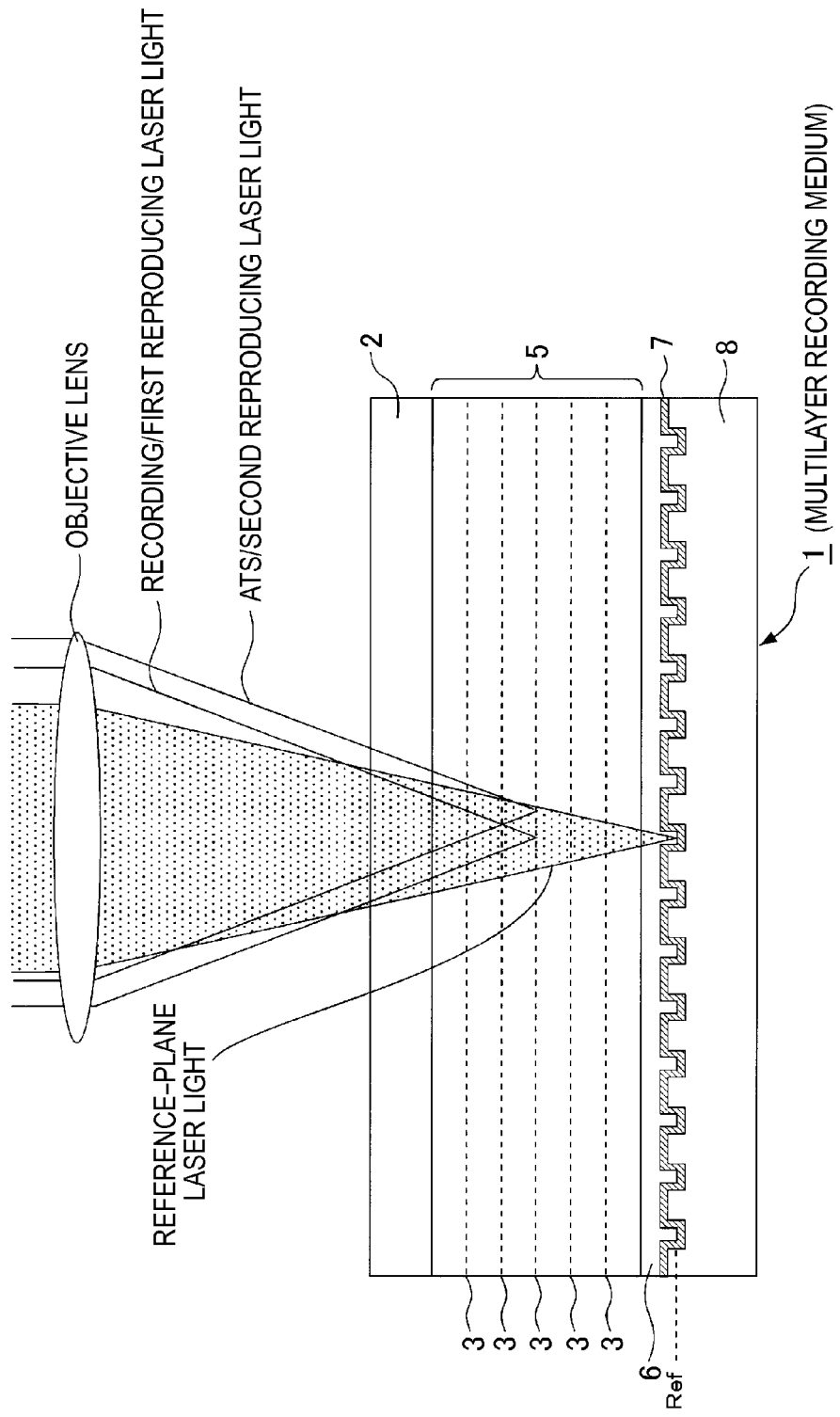
FIG. 2 is an explanatory diagram of a position control technique using a position guide formed on a reference plane.

FIG. 2 is an explanatory diagram of the position control technique using the position guide formed on the reference plane Ref.

First, in this embodiment, a servo technique based on an ATS is adopted for tracking servo control during recording on the recording layer 3. In this case, as recording-layer laser light to be radiated by targeting the recording layer 3, recording/first reproducing laser light and ATS/second reproducing laser light are radiated as illustrated.

Figure 37:
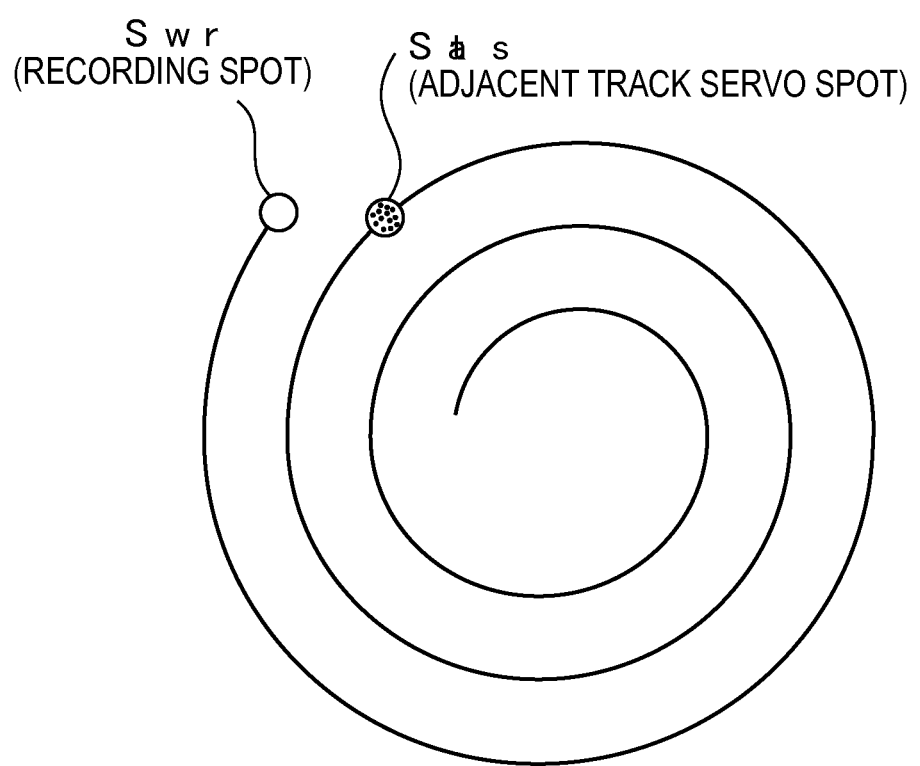
FIG. 37 is a diagram illustrating an ATS.

Giving a description for confirmation, the ATS refers to a technique of constantly keeping a spiral pitch by applying a tracking servo according to an ATS spot Sats by targeting a mark string (spiral) formed by a recording spot Swr as described above with reference to FIG. 37.

In this example, two pieces of recording-layer laser light radiated during recording are also used as reproducing laser light during reproduction. In this sense, the recording-layer laser light (that is, the same as a light source is used) radiated as the recording-layer laser light during recording is referred to as the recording/first reproducing laser light as described above, and the recording-layer laser light radiated as ATS laser light (hereinafter also simply referred to as ATS light) during recording is referred to as the ATS/second reproducing laser light.

Figure 35:
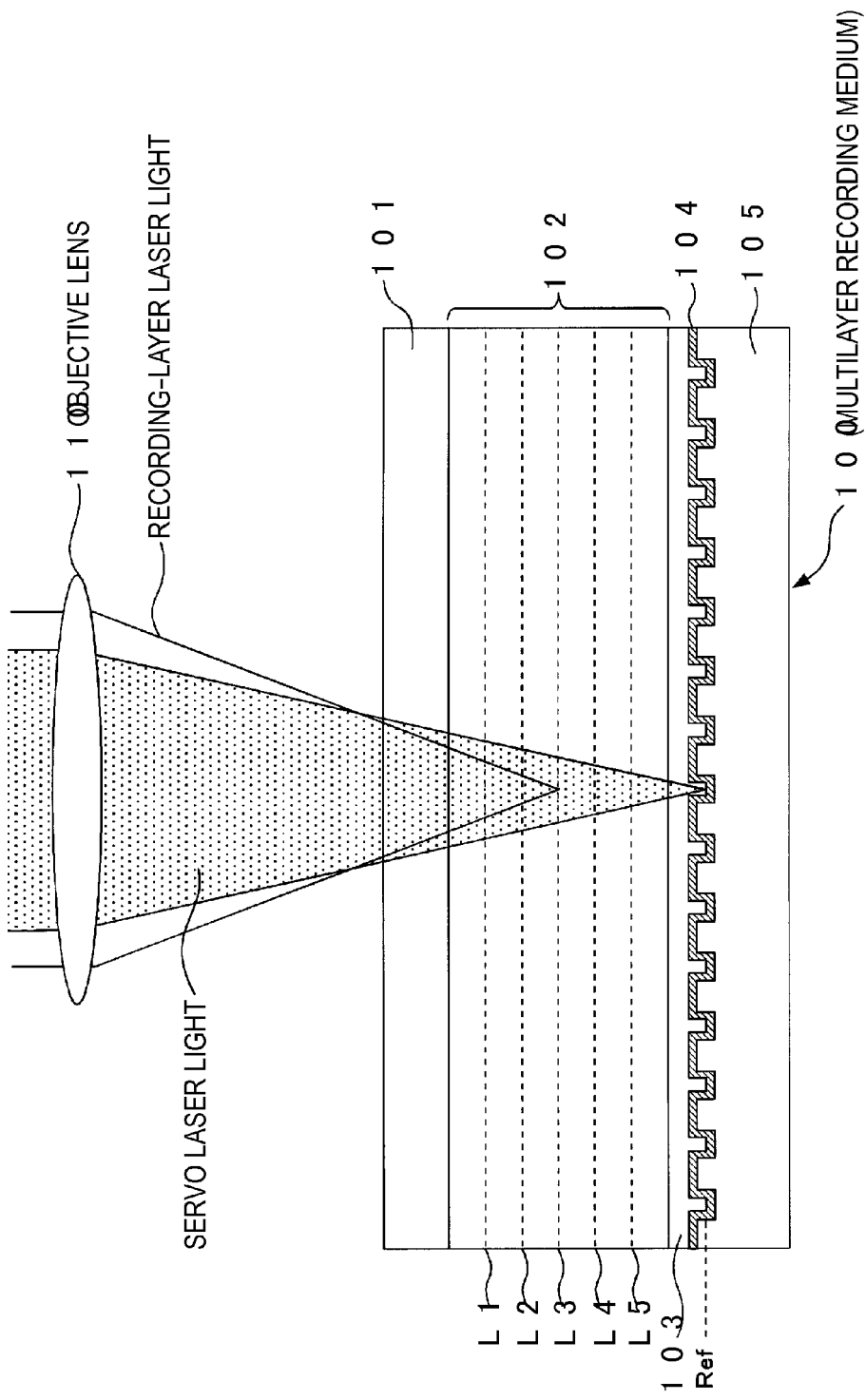
FIG. 35 is an explanatory diagram of a multilayer recording medium in which no position guide is formed on a recording layer.

In addition, in this case, reference-plane laser light (corresponding to servo laser light of FIG. 35) is also radiated to implement servo control based on the position guide of the reference plane Ref.

The multilayer recording medium 1 is irradiated with the reference-plane laser light, the recording/first reproducing laser light, and the ATS/second reproducing laser light via a common objective lens (an objective lens 20 to be described later) as illustrated in the drawing.

In this example, a set of the reference-plane laser light, the recording/first reproducing laser light, and the ATS/second reproducing laser light is radiated via each of two objective lenses from a relationship that twofold spirals are simultaneously recorded. This will be described later.

As understood from the above description, because pre-address assignment for only the reference plane Ref can be performed on the multilayer recording medium 1, a seek operation based on address information recorded on the reference plane Ref is first performed when recording is started from a necessary address on the recording layer 3. That is, the seek operation is performed at a recording start address on the reference plane Ref specified based on a write command according to the reference-plane laser light.

Here, in order to implement recording by the ATS, a recorded track for applying the ATS should be formed on the recording layer 3.

Figure 38:
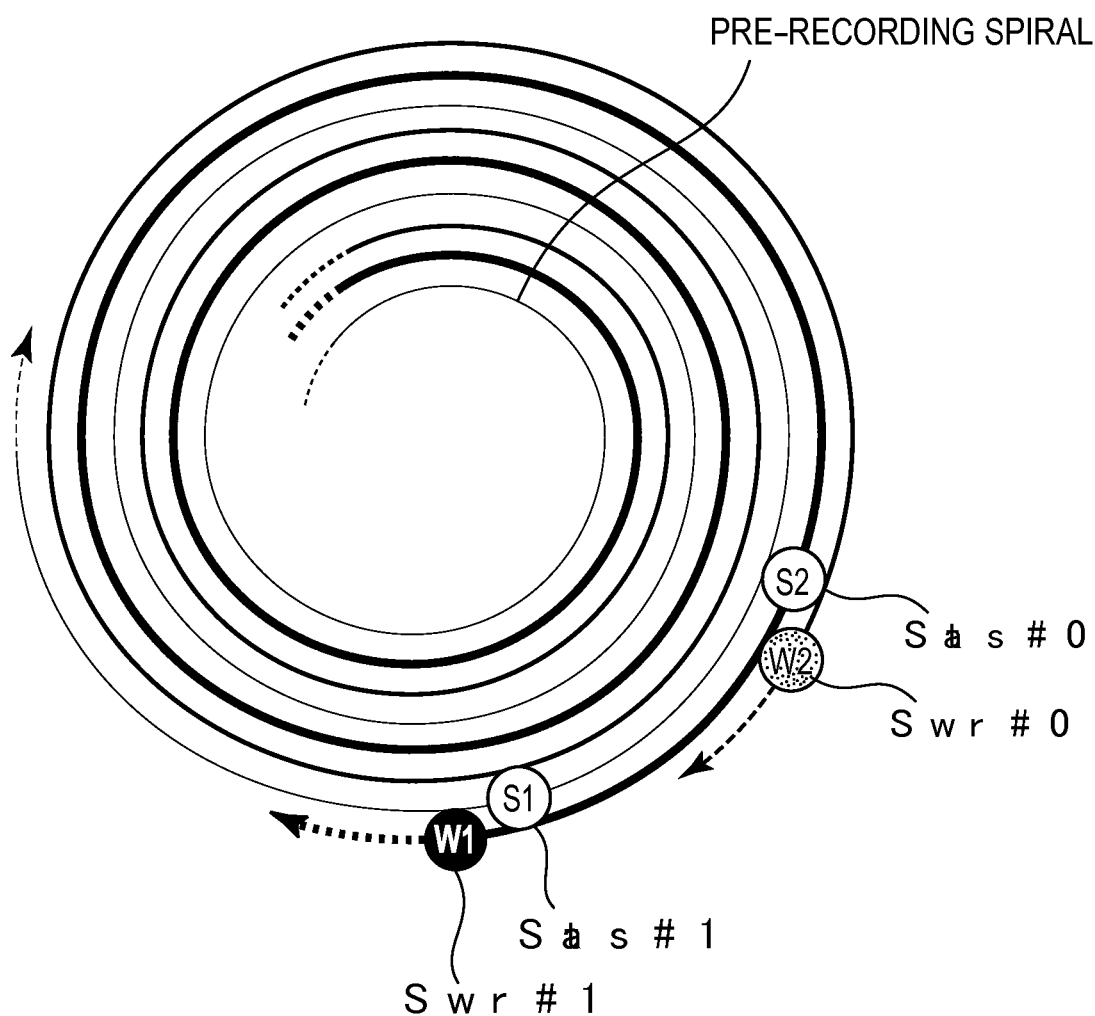
FIG. 38 is an explanatory diagram of a technique of the related art in which twofold spirals are simultaneously recorded when recording by the ATS is performed.

Although a pre-recording spiral as described above with reference to FIG. 38 may be formed as the recorded track in advance, it is not desirable to record the above-described pre-recording spiral for every recording layer 3 in advance in terms of manufacturing costs of the multilayer recording medium 1.

In consideration of this point, it is assumed that no pre-recording track is formed on the recording layer 3. However, under this assumption, a guide track for applying the ATS to the recording layer 3 (hereinafter referred to as an ATS guide track or simply a guide track) is formed after the seek using the above-described reference plane Ref, except for when the recorded spiral is continuously appended, that is, when recording is initially started in a non-recording region.

Because the formation of the guide track is related to a recording technique of this embodiment, this point will be described later.

If the ATS guide track is formed, the tracking servo by the ATS/second reproducing laser light is applied thereto, and hence it is possible to start the ATS for causing the ATS spot Sats to follow the track on which the recording spot Swr has been formed.

In addition, position control during reproduction can be implemented as follows.

Because a mark string is formed on the recording layer 3 during reproduction, it is possible to apply the tracking servo with only the ATS/second reproducing laser light by targeting the mark string.

Specifically, during reproduction of information recorded to a predetermined region of the recording layer 3, the seek operation is first performed based on address information of the reference plane Ref according to reference-plane laser light simultaneously when recording is performed. At a position at which the seek operation has been completed, tracking servo control for the objective lens is switched from servo control based on only the reference-plane laser light to servo control based on the ATS/second reproducing laser light. Thereafter, it is possible to perform the seek operation (correction seek operation) at a reproduction start position by referring to the address information recorded on the recording layer 3.

Here, in a technique using the reference-plane laser light separate from the recording-layer laser light at position control as described above, when light having the same wavelength band as the recording-layer laser light is used as the reference-plane laser light, the reflectance of the recording-layer laser light is forced to be increased on the reference plane Ref from which reflected light of the reference-plane laser light should be obtained. That is, there is a concern in that the number of stray light components is increased and reproduction performance is significantly deteriorated.

Thus, the reference-plane laser light and the recording-layer laser light have different wavelengths, and a reflective film having wavelength selectivity is used as the reflective film 7 forming the reference plane Ref.

Specifically, in the case of this example, the wavelength of the recording-layer laser light (recording/first reproducing laser light and ATS/second reproducing laser light) is about 405 nm as in the case of the BD, and the wavelength of the reference-plane laser light is about 650 nm as in the case of the DVD. As the reflective film 7, a wavelength-selective reflective film that selectively reflects light of the same wavelength band as that of the reference-plane laser light and transmits or absorbs light by the other wavelengths is used.

According to the above-described configuration, it is possible to prevent an unnecessary reflected light component of the recording-layer laser light from being generated from the reference plane Ref and secure a good S/N.

Here, as described above, according to the ATS, it is possible to prevent the occurrence of a state in which intersection of a track or the like occurs and hence the reproduction of recording information is disabled because a track pitch of the recording layer 3 can be constant.

Figure 3:
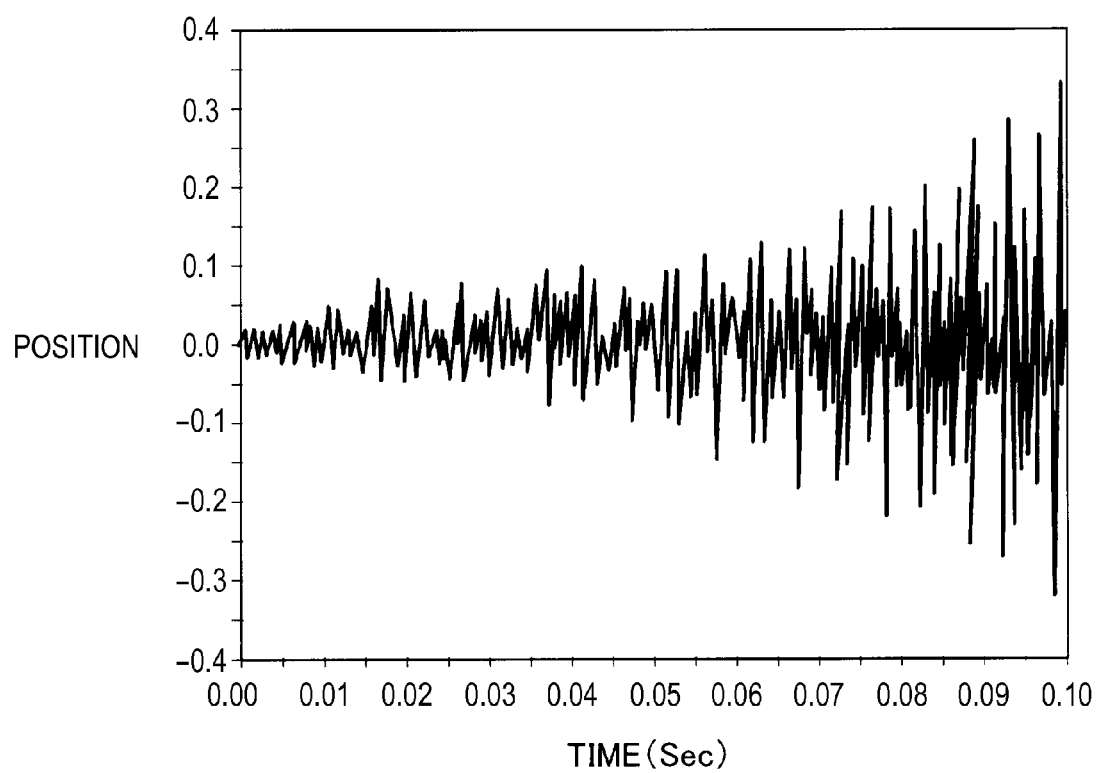
FIG. 3 is an explanatory diagram of a problem occurring in a single ATS.

However, this is the case in which the ATS ideally functions. In an actual system, the number of tracking error components is increased with the passage of time (that is, every time the revolution is iterated) as illustrated in FIG. 3 due to the remaining tracking error in a tracking servo system by the ATS spot Sats and consequently it is difficult for the tracking servo to stably operate.

In this embodiment, a technique of a so-called ATS+ is adopted as a position control technique for recording laser light.

Figure 4:
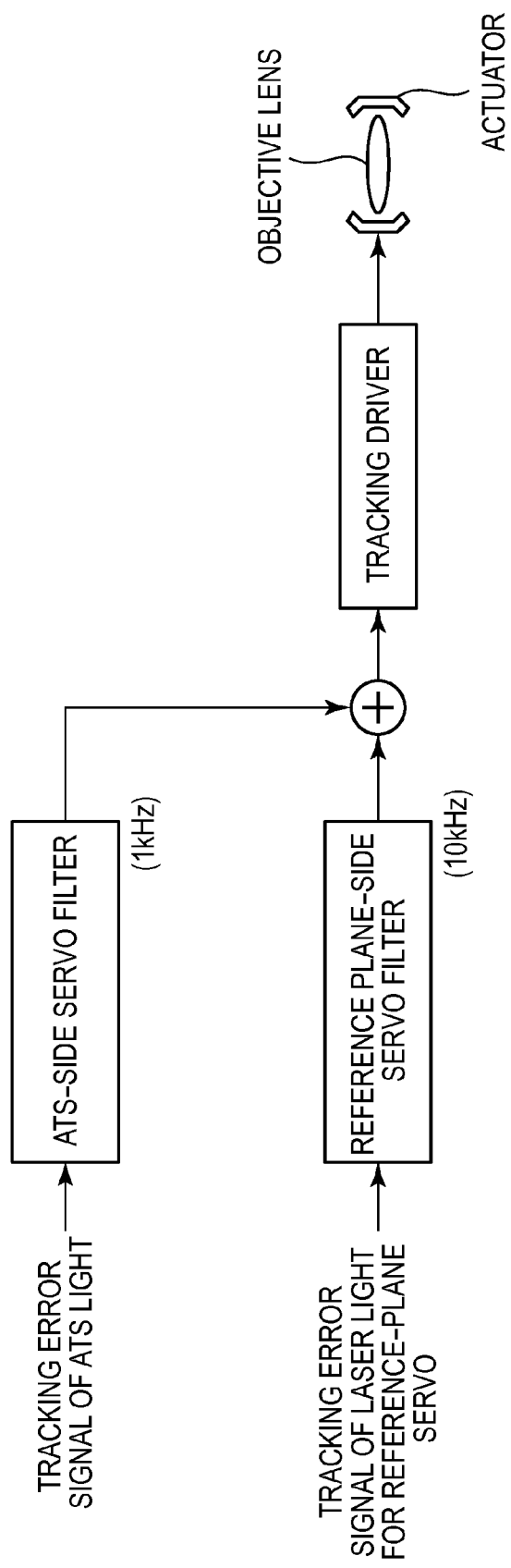
FIG. 4 is a diagram illustrating a concept of an ATS plus (ATS+)

FIG. 4 is a diagram illustrating a concept of the ATS+.

As illustrated in FIG. 4, in the ATS+, first, a reference plane-side servo filter for performing a filtering process for tracking servo control on a tracking error signal of the reference-plane laser light (written as laser light for a reference-plane servo in the drawing) and a tracking driver for driving an actuator that holds the objective lens to be displaceable in a tracking direction based on an output of the reference plane-side servo filter are provided.

That is, in the ATS+, a tracking servo loop (serving as a reference plane-side servo control system) that performs tracking servo control of the objective lens based on the tracking error signal of the reference-plane laser light is formed.

Then, in the ATS+, the service control system by the ATS is configured along with the above-described reference plane-side service control system. Specifically, an ATS-side servo filter, which performs a filtering process on a tracking error signal of the ATS/second reproducing laser light (written as ATS light in the drawing), and an addition unit, which provides a tracking servo signal generated by the ATS-side servo filter to the above-described reference plane-side tracking servo loop, are provided.

In other words, the tracking servo signal by the ATS-side servo filter can be configured to be provided as a target value (control target value) of the above-described reference plane-side servo control system. Alternatively, it is also possible to represent that the tracking servo loop serving as the reference plane-side servo control system is set as a minor loop and the tracking servo signal by the ATS-side servo filter is input as a target value of the minor loop.

Figure 36:
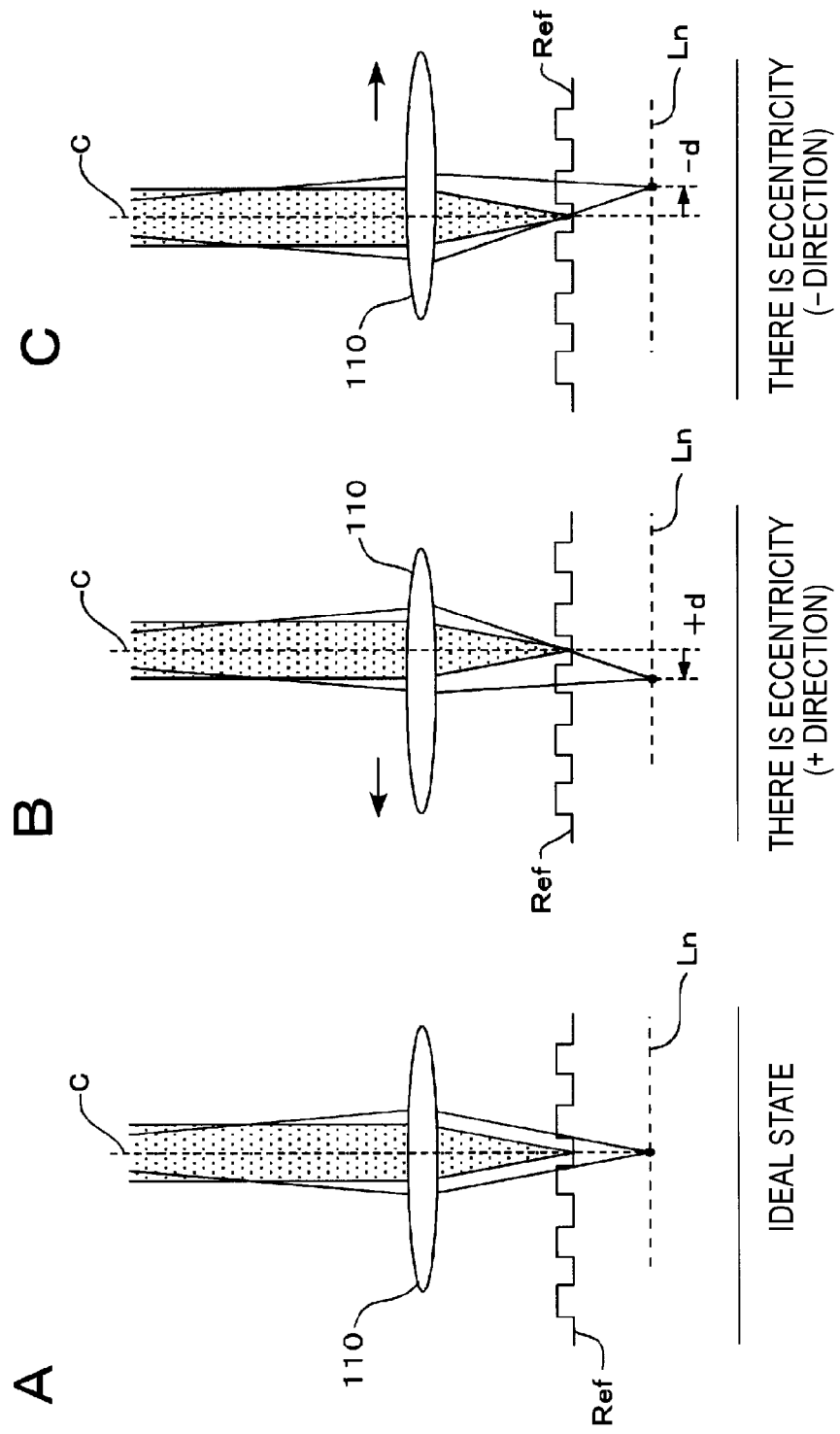
FIGS. 36A, 36B, and 36C are diagrams illustrating a principal in which a deviation in an information recording position is caused by a lens shift of an objective lens.

In the case of the above-described configuration, a tracking error of the ATS control system mainly occurs due to a spot position deviation (see FIG. 36 described above) caused by a lens shift, a tilt, or the like of the objective lens.

The above-described tracking error information of the ATS is provided as the control target value of the reference plane-side servo control system, and hence the objective lens is driven so that the spot Sats of the ATS/second reproducing laser light follows the track on the recording layer 3.

As understood from this, even in the ATS+, as in the single ATS, it is possible to prevent the occurrence of a state in which a track on the recording layer 3 overlaps or intersects an adjacent track.

Here, as understood from the above description, the reference plane-side servo control system including the reference plane-side servo filter undertakes a function of mainly following a normal disturbance component (that is, a disturbance component with a frequency higher than a disc eccentricity component or the like which is a cause of the spot position deviation associated with the above-described lens shift).

In this sense, the control band of the reference plane-side servo control system is set to the same control band as that of a normal servo control system. Specifically, in this example, the control band of the reference plane-side servo control system is set to about 10 kHz.

On the other hand, because the ATS control system including the ATS-side filter should not follow the above-described normal disturbance component, the control band is set to at least a frequency band lower than the control band of the reference plane-side servo control system. Specifically, in this example, about 1 kHz is set as the control band (the cutoff frequency of the ATS-side servo filter) of the ATS control system.

According to the ATS+ that provides the control signal of the ATS control system to the tracking servo loop (minor loop) serving as the reference plane-side servo control system as described above, it is possible to prevent a divergence state as described above with reference to FIG. 3 occurring in the single ATS of the related art. That is, the tracking servo control of preventing the overlap or intersection of the recording track from occurring can be stably implemented as compared with the case of the single ATS of the related art.

3. Recording Technique of Embodiment

Next, the recording technique serving as the embodiment will be described with reference to FIGS. 5 to 14.

First, in this embodiment, a recording rate is improved and two spirals are simultaneously recorded on the recording layer 3.

FIGS. 5A and 5B are diagrams illustrating an outline of a configuration for implementing simultaneous recording of two spirals.

As illustrated in the drawing, in this embodiment, two optical pickups OP#0 and OP#1, which function as recording/reproducing heads, are provided. The optical pickups OP#0 and OP#1 are configured so that the multilayer recording medium 1 is irradiated with the above-described reference-plane laser light, recording/first reproducing laser light, and ATS/second reproducing laser light.

Although arrangement states of the optical pickups OP#0 and OP#1 in a cross-section direction and a planar direction of the multilayer recording medium 1 are illustrated in FIGS. 5A and 5B, respectively, the optical pickups OP#0 and OP#1 are arranged at rotation angle positions between which there is a difference of 180 degrees with respect to the center of the multilayer recording medium 1 (opposing arrangement) in this example as illustrated in the drawing.

Here, in description of the following recording technique, a beam spot of the recording/first reproducing laser light radiated by the optical pickup OP#1 is referred to as a first recording spot Swr#1.

In addition, a beam spot of the ATS/second reproducing laser light radiated by the optical pickup OP#1 is referred to as a first ATS spot Sats#1.

In addition, a beam spot of the recording/first reproducing laser light radiated by the optical pickup OP#0 is referred to as a second recording spot Swr#0, and a beam spot of the ATS/second reproducing laser light radiated by the optical pickup OP#0 is referred to as a second ATS spot Sats#0.

Figure 6:
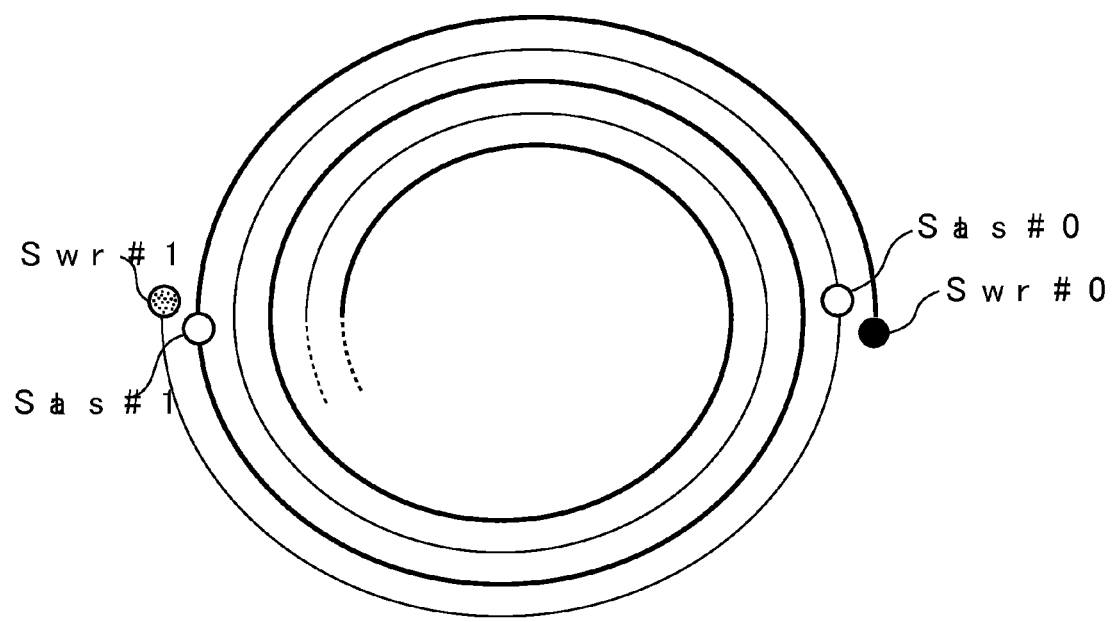
FIG. 6 is an explanatory diagram of a recording technique to be implemented in this embodiment.

FIG. 6 is an explanatory diagram of a recording technique to be implemented in this embodiment.

First, as described above, in this example, recording on the recording layer 3 is performed under tracking control based on the ATS (the ATS+ in the case of this example).

Under the above-described tracking control, two spirals are simultaneously recorded.

Here, in the technique of the related art described above with reference to FIG. 38, although two spirals can be simultaneously recorded under the assumption of the ATS control, verification for the two spirals to be simultaneously recorded can be implemented only when recording is interrupted.

A problem to be solved in this embodiment is to perform verification without interrupting recording for any spirals when simultaneous recording of twofold or more spirals is performed for improving a recording rate under the assumption of recording based on the ATS.

To solve the above-described problem, in this embodiment, as illustrated in FIG. 6, in a state in which the tracking servo by the second ATS spot Sats#0 is applied by targeting a first spiral (the black line in the drawing) recorded by the first recording spot Swr#1, and the tracking servo by the first ATS spot Sats#1 is applied by targeting a second spiral (the gray line in the drawing) recorded by the second recording spot Swr#0, the recording of user data by the first recording spot Swr#1 and the second recording spot Swr#0 is executed.

According to this, at sides #1 and #0, a state in which the tracking servos are mutually applied to spirals recorded by the other side (hereinafter referred to as applying ATSs) is obtained. Thereby, it is possible to continuously maintain pitches of the first and second spirals.

In addition, in a state in which the ATSs are mutually applied as described above, while user data is recorded by two recording spots Swr, the second ATS spot Sats#0 traces user data written by the first recording spot Swr#1, and the first ATS spot Sats#1 traces user data written by the second recording spot Swr#0. That is, as a result, for all of the first and second spirals to be simultaneously recorded, it is possible to perform verification without interrupting recording.

Here, in this embodiment as described above, it is assumed that no pre-recording spiral is formed on the recording layer 3 of the multilayer recording medium 1.

In association with this, when recording by the ATS is started, the above-mentioned ATS guide track is formed as a write operation.

Under the rotary drive of the multilayer recording medium 1, the guide track is recorded by the recording spot Swr while a tracking position of the objective lens is controlled according to the tracking servo by the reference-plane laser light, that is, the tracking servo based on the position guide of the reference plane Ref.

Specifically, one optical pickup OP records the guide track.

The one optical pickup OP forms the guide track, and hence the tracking servo by the ATS spot Sats of the other optical pickup OP can be applied by targeting the guide track. That is, thereby, a state in which the ATS has been applied for the other optical pickup OP is achieved.

If the ATS is applied to a track (spiral) recorded by the one optical pickup OP as described above, the other optical pickup OP starts recording by the recording spot Swr and hence a track to be recorded can keep a constant pitch with respect to the guide track recorded by the one optical pickup OP.

By forming the guide track according to the one optical pickup OP as described, the other optical pickup OP can apply the ATS to the guide track and a track (second spiral) keeping a constant interval can be formed with respect to the guide track.

From this state, for the transition to a state in which the ATSs are mutually applied as described above, it is only necessary for the one optical pickup OP to perform the pull-in of the tracking servo to the second spiral side to be formed by the other optical pickup OP. If the pull-in of the tracking servo can be performed, it is possible to cause the ATS spot Sats of the one optical pickup OP to follow the second spiral recorded by the other optical pickup OP. Thereafter, the recording track (first spiral) by the one optical pickup OP is formed to keep a constant interval with respect to the second spiral. That is, two spirals (a spiral set of first and second spirals) with a constant pitch can be formed at the constant pitch. In addition, because a state in which the ATS spot Sats of the other optical pickup OP follows the first spiral and the ATS spot Sats of the one optical pickup OP follows the second spiral is obtained, verification is possible when recording using reflected light of the ATS spots Sats is in progress.

However, it should be noted that there is an influence of the spot position deviation as described above with reference to FIG. 36 because the guide track is formed under reference-plane servo control. That is, there is a concern in that, for the guide track formed under the above-described reference-plane servo control, the intersection of a track is caused by the occurrence of the backlash of thread or the like.

In addition, one spiral set simultaneously recorded may be simultaneously reproduced using two beams for improving a reproducing rate. However, in view of this point, it is desirable to align a recording start position of user data or a boundary position (angle) of a minimum unit of recording between two spirals.

In this embodiment, as a specific writing technique for obtaining a state in which the ATSs are mutually applied in consideration of these points, the following technique as described with reference to FIGS. 7 to 14 is proposed.

First, in this embodiment, preconditions related to recording will be described.

First, in this embodiment, a minimum unit of recording is assumed to be a recording unit block (RUB). The RUB includes 32 sectors.

In addition, in this embodiment, an address of the recording layer 3 is assigned for every sector. Hereinafter, the address of the recording layer 3 is also written as a physical sector number (PSN).

In addition, the address of the recording layer 3 is alternately allocated to the first spiral and the second spiral. That is, for example, if PSN_0 to PSN_5 are provided, there is a relationship that PSN_0→PSN_2→PSN_4 are continuously arranged on the first spiral, PSN_1→PSN_3→PSN_5 are continuously arranged on the second spiral, and a set of PSN_0 and PSN_1, a set of PSN_2 and PSN_3, and a set of PSN_4 and PSN_5 are arranged adjacent to one another.

The above-described address arrangement may be considered so that continuous data is obtained by reading a spiral set using two beams during reproduction.

Figure 7:
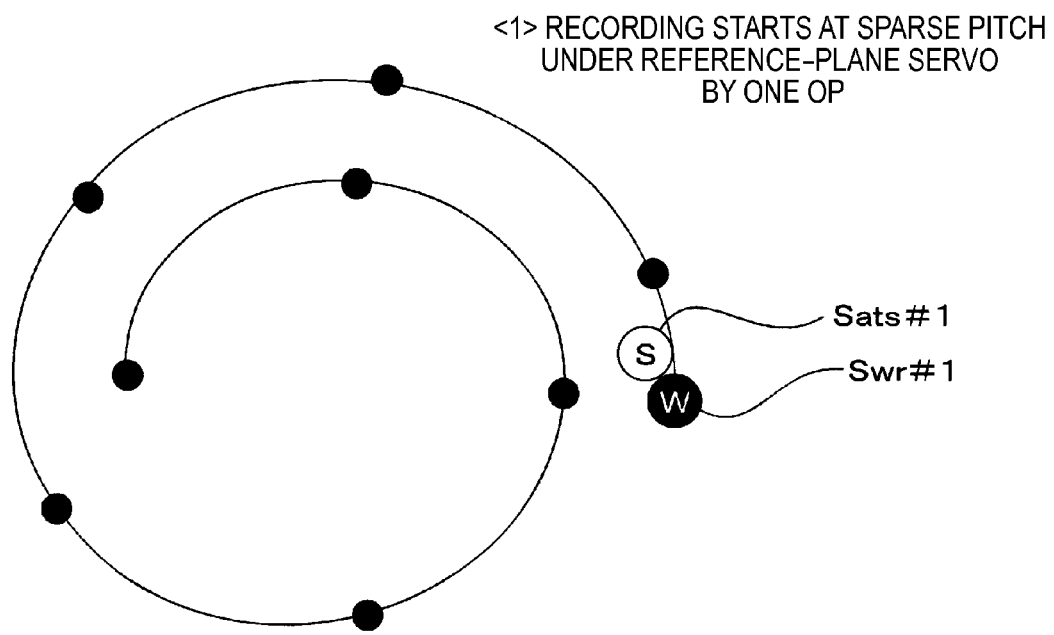
FIG. 7 is an explanatory diagram of a specific writing technique for obtaining a state in which ATSs are mutually applied.

Based on the above-described preconditions, first, during writing, as illustrated in FIG. 7, recording is started at a sparse pitch under reference-plane servo control according to the one optical pickup OP (<1>). This corresponds to a formation start of the above-described guide track.

Specifically, in the one optical pickup OP, data recording is started according to the recording spot Swr while tracking servo control of the objective lens by the reference-plane laser light is executed.

At this time, in order to prevent the intersection of a recording track or the like associated with a spot position deviation, a pitch of the guide track is sufficiently larger than a track pitch TP set on the recording layer 3 (a sparse pitch).

As described above, because the guide track is recorded while the tracking servo is applied to a track (position guide) formed on the reference plane Ref according to the reference-plane laser light, the pitch of the guide track depends upon the track pitch of the reference plane Ref. An example of a specific technique to be performed to make the pitch of the guide track sparse in consideration of the spot position deviation will be described again later.

At this time, user data is no recorded on the guide track. Dummy data is recorded on the guide track. Here, during recording of the dummy data, address information (the above-described PSN) is assumed to be added.

A small black circle illustrated in FIGS. 8 to 14 as well as FIG. 7 represents an RUB boundary.

Here, in this example, the optical pickup OP that records the guide track is assumed to be the optical pickup OP#1 as illustrated in the drawing. That is, the optical pickup OP#1 undertakes recording of the first spiral, and the optical pickup OP#0 undertakes recording of the second spiral.

Figure 8:
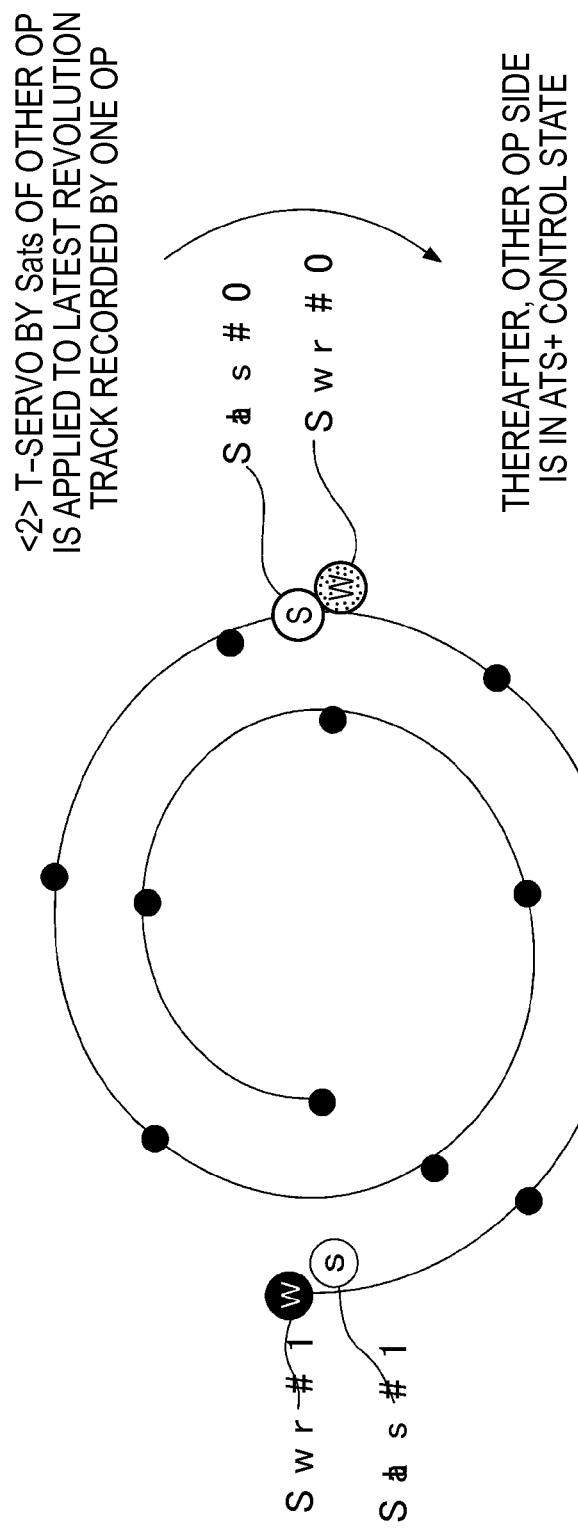
FIG. 8 is an explanatory diagram of the above-described writing technique.

After the recording of the guide track has been started on one optical pickup OP according to the above-described <1>, the tracking servo (hereinafter also simply referred to as T-servo) by the ATS spot Sats of the other optical pickup OP (#0) is applied to a latest revolution track recorded by the one optical pickup OP (#1) as illustrated in FIG. 8. That is, in the case of this example, the T-servo serving as ATS+ described above with reference to FIG. 4 is applied.

Here, because the guide track is recorded under reference-plane servo control as described above, it is possible to obtain address information (at least radial position information) of the reference plane Ref while the guide track is recorded. It is possible to specify the latest revolution position (radial position) of the guide track by referring to the address information of the reference plane Ref and to position the second ATS spot Sats formed by the optical pickup OP#0 in the vicinity of the latest revolution position of the guide track by a seek operation performed by the optical pickup OP#0 using the specified radial position (reference-plane address) as a target address.

When the pull-in of the tracking servo to the guide track is performed, a tracking servo control state for the objective lens (a tracking servo control state based on reflected light of the reference-plane laser light) of the objective lens is released in the optical pickup OP#0 according to the completion of the above-described reference-plane seek.

When a tracking error signal generated based on reflected light of the second ATS spot Sats#0 is monitored by turning off the reference-plane servo as described above, an amplitude corresponding to when the guide track crosses the second ATS spot Sats under the influence of disc eccentricity or the like is obtained. It is possible to apply the tracking servo to the latest revolution track or a track in the vicinity thereof by capturing a timing at which the above-described amplitude has been obtained and performing the pull-in of the tracking servo.

If the tracking servo by the second ATS spot Sats#0 is applied as described above, it is possible to determine whether or not a track is the latest revolution track by reading the address information on the guide track. If the track is not the latest revolution track, the movement to the latest revolution track is performed by performing the track jump.

For example, according to the above-described technique, it is possible to obtain a state in which the T-servo serving as the ATS+ has been applied to the latest revolution track of the guide tracks.

The tracking servo pull-in of the ATS+ is performed by switching the tracking servo control of the objective lens to servo control based on a composite output of the reference plane-side servo filter and the ATS-side servo filter illustrated in FIG. 4.

Here, for example, assuming that the servo pull-in to the guide track by the above-described second ATS spot Sats#0 is performed, there is a concern in that the second ATS spot Sats#0 does not find the guide track and the pull-in of the tracking servo is not performed if recording of the guide track is only performed in less than one round (less than a half round in the case of the opposing arrangement as in this example).

Thus, the recording of the guide track is performed in at least one round (a half round or more in the case of the opposing arrangement). Specifically, in this example, recording of a predetermined number of revolutions is assumed to be performed. If a number of guide tracks are recorded, one of the guide tracks is more likely to cross the second ATS spot Sats#0. Consequently, by taking the transition to an operation of <2> after the guide tracks are recorded in a sufficient number of revolutions (a predetermined number of revolutions), it is possible to more reliably pull the second ATS spot Sats#0 into the guide track.

Before a process of applying the tracking servo according to the second ATS spot Sats#0 is executed, it is only necessary to actually determine the number of guide tracks to be recorded based on experimentation results or the like.

As described above, if a state in which the tracking servo has been applied to the latest revolution track of guide tracks recorded by the optical pickup OP#1 is obtained, it is possible to form the second spiral having a constant pitch with respect to the guide track (the first spiral) as described above by starting recording by the second recording spot Swr#0 in the above-described state.

Figure 9:
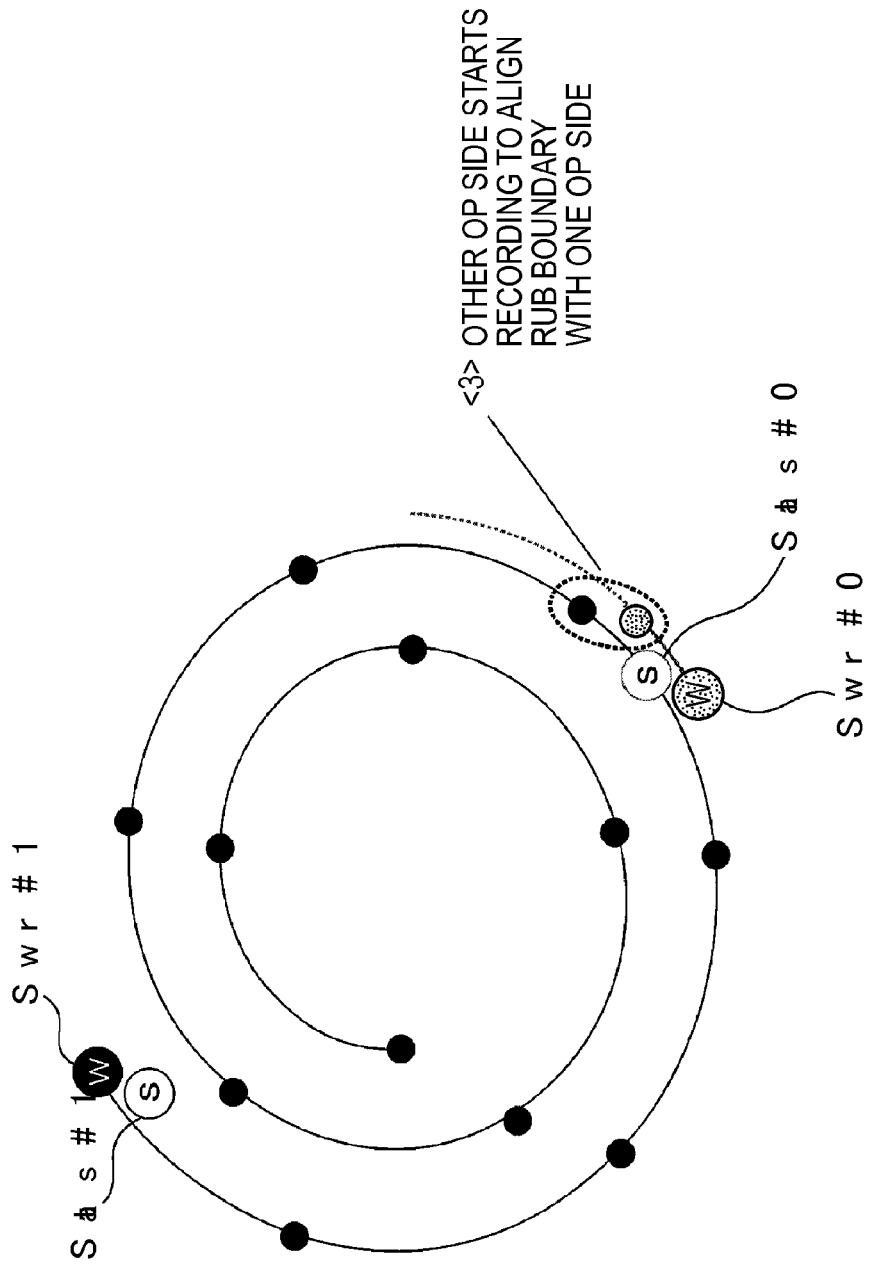
FIG. 9 is an explanatory diagram of the above-described writing technique.

However, in this example, in consideration of the above-described assumption, the recording of the second spiral is started by aligning the RUB boundary with the first spiral side as in FIG. 9 (<3>).

Specifically, because the second ATS spot Sats#0 traces the guide track according to the above-described <2>, it is possible to detect the RUB boundary on the guide track based on a reproduction signal of the second ATS spot Sats#0. According to the timing of the RUB boundary of the guide track detected as described above, recording by the second recording spot Swr#0 is started.

Figure 10:
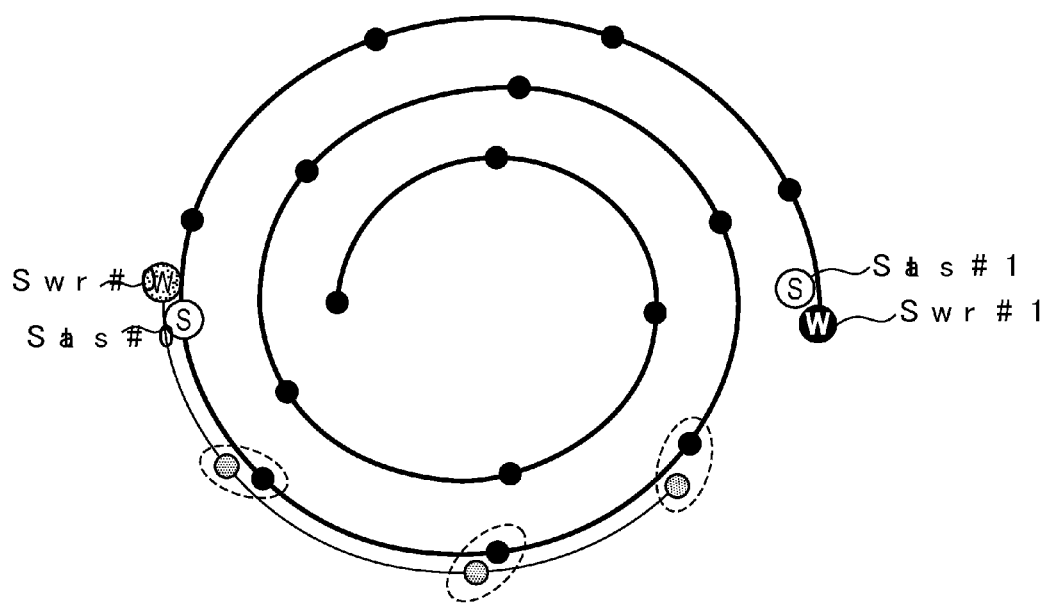
FIG. 10 is an explanatory diagram of the above-described writing technique.

Thereby, thereafter, it is possible to align the RUB boundary between the first spiral and the second spiral as illustrated in FIG. 10.

Here, even in recording of the second spiral started at the timing of <3>, dummy data is recorded. Even in the recording of the dummy data of the second spiral, the addition of address information is assumed to be associated.

Figure 11:
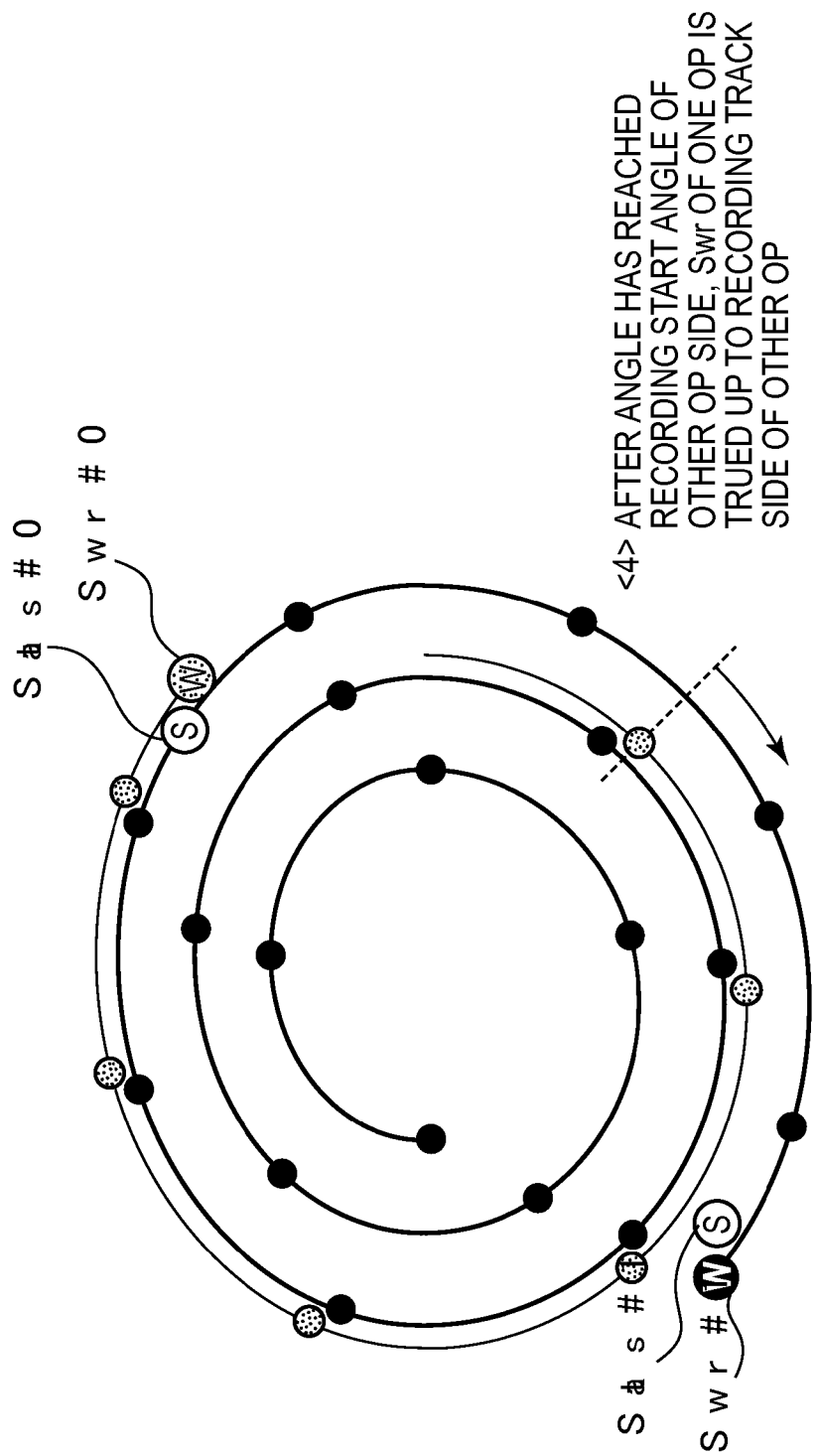
FIG. 11 is an explanatory diagram of the above-described writing technique.

According to the above-described <3>, after the recording of the second spiral has been started, as illustrated in FIG. 11, after the same angle as a recording start angle of the other optical pickup OP (OP#0) has been reached, the recording spot Swr (Swr#1) of the one optical pickup OP (OP#1) is trued up to a recording track side of the other optical pickup OP (OP#0) (<4>).

Here, as described above, absolute position information (radial position information and rotation angle information) serving as the address information is recorded on the reference plane Ref. When the operation of the above-described <4> is implemented, first, as the assumption, an address (at least rotation angle information) of the reference plane Ref when the recording of the second spiral according to the above <3> has been started is acquired. Giving a description for confirmation, because the ATS+ is performed in this example, it is possible to read the address information on the reference plane Ref according to the reference-plane laser light even during recording.

The address information of the reference plane Ref detected by receiving reflected light of the reference-plane laser light of the optical pickup OP#1 is referred to and the true-up is started after a rotation angle specified from the detected reference-plane address is coincident with the rotation angle of the recording start position of the second spiral acquired by <3>.

Giving a description for confirmation, because the optical pickup OP#1 continues a reference-plane servo state from the above <1>, the reference-plane address can be read as described above.

Here, the above-described "true-up" can be implemented by forcibly moving the objective lens to the side opposite to a radial direction for recording progress (a direction in which recording progresses in the radial direction), for example, by applying an offset to a servo loop related to the tracking servo control to be performed based on reflected light of the reference-plane laser light, or the like, in the optical pickup OP#1.

However, when the pitch of the guide track is increased in consideration of a spot position deviation, a movement amount may be greater than or equal to half the track pitch of the reference plane Ref so as to true up the first ATS spot Sats#1 to the second spiral. In this case, the tracking servo of the reference plane Ref turns away.

In this example, although a structure on the reference plane Ref is designed so that the true-up can be stably performed, this will be described again later.

Here, an operation of starting the true-up after a recording start angle of the second spiral has been reached is used to reliably prevent the intersection of a track with the second spiral, which occurs when the true-up is started before the recording start angle is reached.

Figure 12:
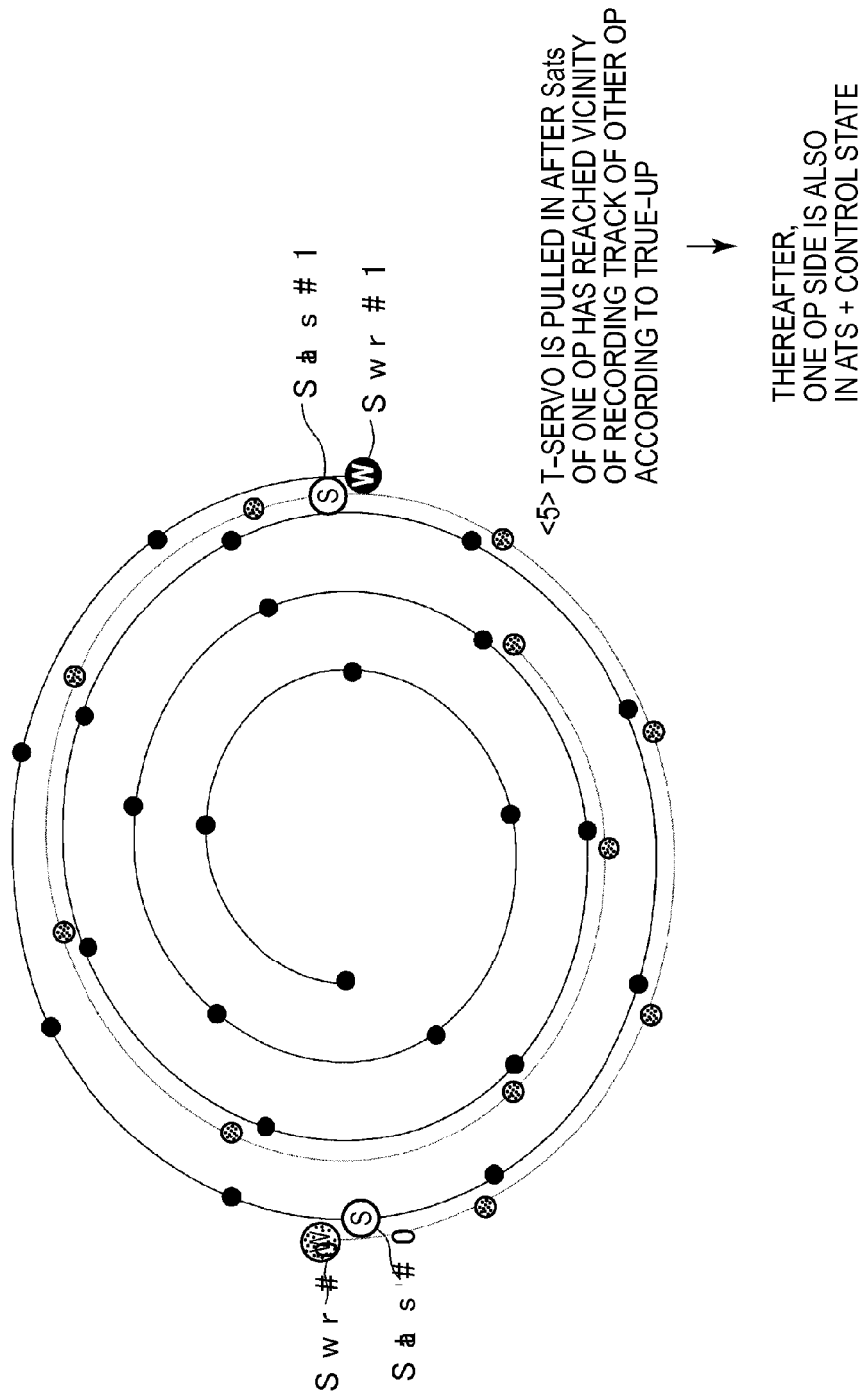
FIG. 12 is an explanatory diagram of the above-described writing technique.

According to the true-up started according to the above-described <4>, when the ATS spot Sats (Sats#1) of the one optical pickup OP (OP#1) reaches the vicinity of the recording track of the other optical pickup OP (OP#0), the T-servo pull-in is executed as illustrated in FIG. 12 (<5>).

That is, in the optical pickup OP#1, an amplitude of a tracking error signal obtained by receiving reflected light of the first ATS spot Sats#1 is monitored, and the tracking servo control of the objective lens is switched from previous servo control based on single reference-plane laser light to servo control serving as the above-described ATS+ according to the amplitude obtained in a predetermined form (for example, a zero-cross or the like) in which the pull-in of the tracking servo is possible.

Thereby, thereafter, the transition to the ATS+ control state even in the optical pickup OP#1 is taken.

That is, thereafter, a spiral set of first and second spirals formed at a constant pitch can be formed at a constant pitch, and mutually recorded data can be verified without mutually interrupting recording.

Figure 13:
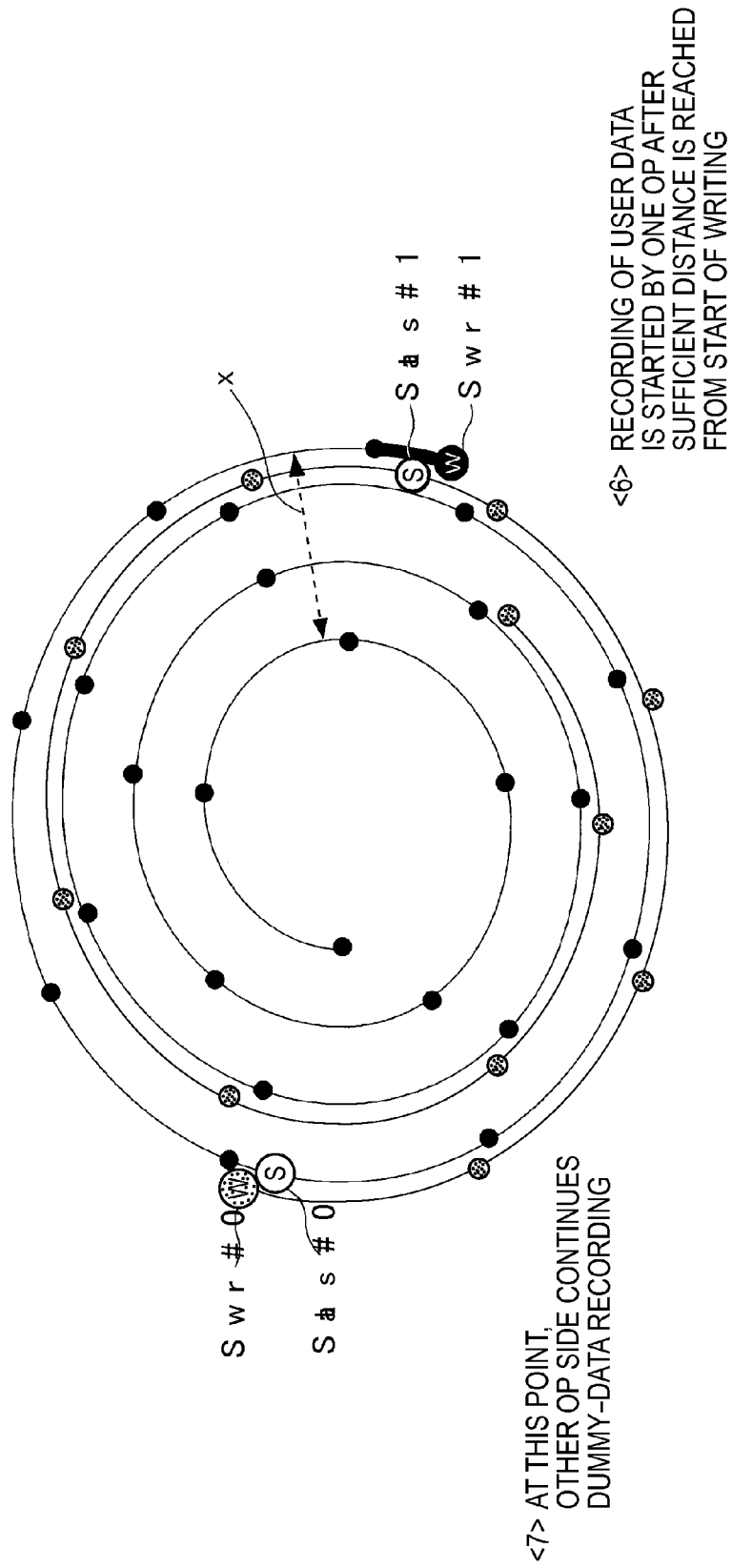
FIG. 13 is an explanatory diagram of the above-described writing technique.

After a state in which the T-servo pull-in of the above-described <7> is completed and the ATSs are mutually applied is obtained, the two optical pickups OP start recording of user data so as to align the start position (see FIG. 13).

That is, after the completion of the pull-in of the T-servo of <7>, one optical pickup OP first starts the recording of the user data.

The other optical pickup OP starts the recording of the user data according to a timing at which a user-data recording start position (a beginning part of a user-data recording start address) by the above-described one optical pickup OP has been reached by referring to the address information (that is, the address information of the track recorded by one OP side) detected according to its own ATS spot Sats.

However, when a position at which the recording of the user data has been started is a position of less than a sufficient distance from a writing start position, there is a concern in that it is difficult to access the user-data recording start position during reproduction due to the above-described spot position deviation. Although a reason for this is also described in Japanese Patent Application No. 2010-248433, which is a patent application of this applicant, specific particulars are generally as follows.

First, although the spot position deviation mainly occurs due to a lens shift associated with disc eccentricity, a disc replacement may be interposed while a recording position is reproduced after recording has been performed. In this case, an eccentricity generation form may be different between a recording time and a reproduction time and a spot position deviation direction during recording may be a direction reverse to a spot position deviation direction during reproduction.

When the spot position deviation direction during recording is the direction reverse to the spot position deviation direction during reproduction as described above, there is a concern in that the spot of the recording-layer laser light is positioned in a region in which no track is formed even when a seek operation is performed at a recording start position of user data specified on the reference plane Ref during reproduction. In this case, it is difficult to perform the tracking servo pull-in to the track on the recording layer 3, and it is difficult to reach the user-data recording start position on the recording layer 3.

In view of this point, in this embodiment, as indicated by <6> of FIG. 13, after a sufficient distance from the start of writing is reached, recording of user data by the one optical pickup OP (serving as OP#1 in this example) is started.

Here, as apparent from the above-described Japanese Patent Application No. 2010-248433, it is only necessary to set a distance X from the start of writing at which recording of user data is started to at least a maximum spot deviation amount D_max between the recording time and the reproducing time in preventing the spot of the recording-layer laser light from being positioned in a non-formation region of a track when a reference-plane seek has been performed at least during reproduction.

In this example, based on this point, after the distance X from the start of writing is greater than or equal to the maximum spot deviation amount D_max, the recording of the user data by the optical pickup OP#1 is assumed to be started.

As indicated by <7> in the drawing, at a point in time at which the optical pickup OP#1 has started the recording of the user data, the other optical pickup OP#0 continues recording of dummy data. As will be described below, this is because a recording start position of the user data is aligned.

Figure 14:
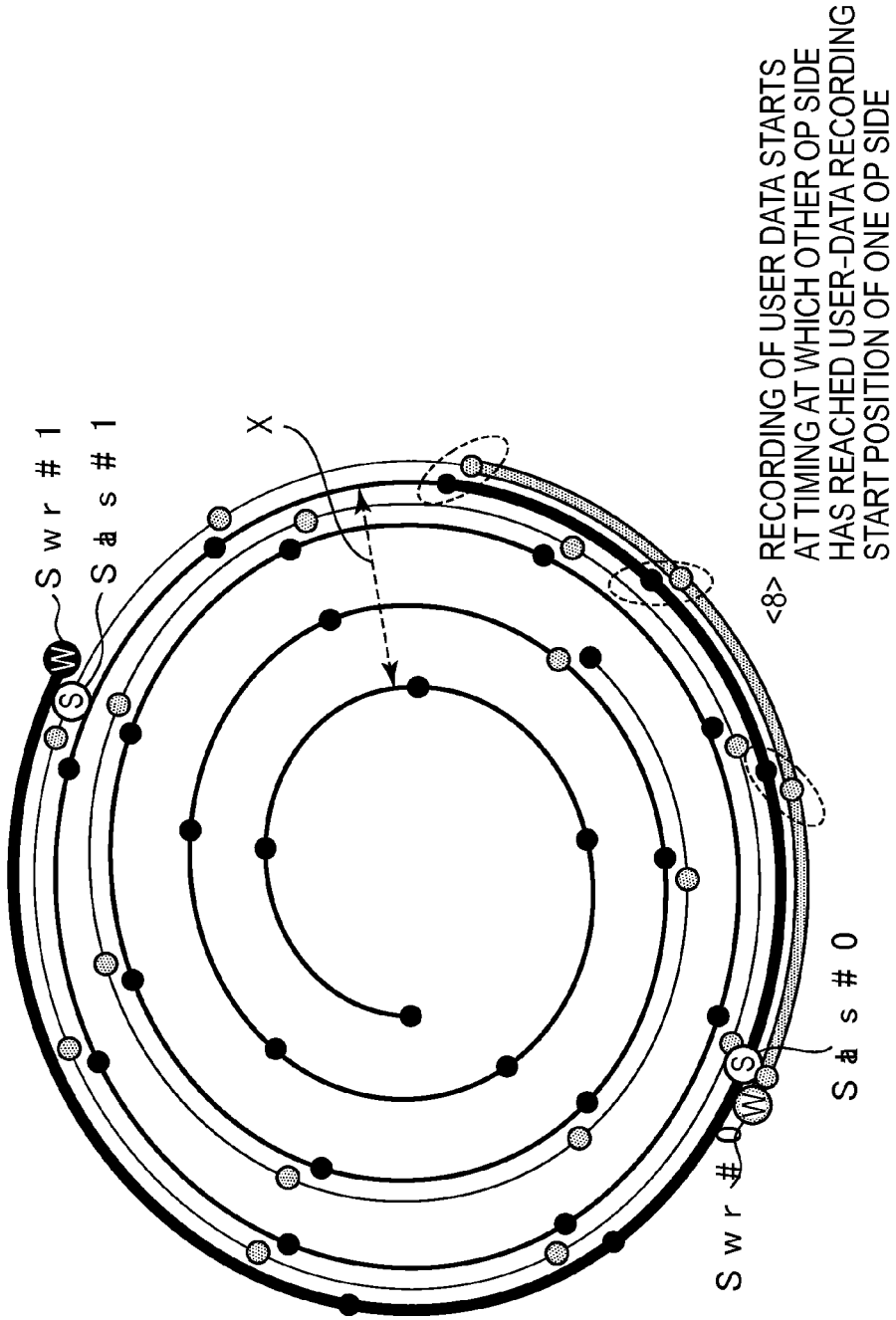
FIG. 14 is an explanatory diagram of the above-described writing technique.

As described above, after the one optical pickup OP (OP#1) has started the recording of the user data, the other optical pickup OP (OP#0) starts the recording of the user data at a timing at which the user-data recording start position of the one optical pickup OP has been reached as indicated by <8> of FIG. 14.

Thereby, the user-data recording start position can be aligned in the first and second spirals. In other words, continuous data can be obtained by reading a spiral set of the first and second spirals using two beams during reproduction.

Here, in this embodiment as described above, it is assumed that addresses are alternately allocated to the first and second spirals. That is, a series of continuous recording data is recorded to be alternately arranged on the first and second spirals in units of RUBs.

To implement the above-described recording, in this embodiment, a series of user data to be recorded is appropriately divided into recording data for the first spiral and recording data for the second spiral in units of RUBs.

The recording data for the first spiral obtained by the above-described division is recorded according to the first recording spot Swr#1 and the recording data for the second spiral is recorded according to the second recording spot Swr#0. Thereby, the user data is recorded to be alternately arranged on the first and second spirals in units of RUBs.

Because the recording start positions for the first and second spirals are aligned as described above, a time lag of about a half round occurs in the progress of the recording data for the first spiral and the progress of the recording data for the second spiral in the case of this example in which the optical pickups OP are arranged to face each other. In other words, the second spiral side performs recording after recording data for at least about a half round has been accumulated.

4. Arbitrary Pitch Spiral Movement Control

Here, when a writing technique of the above-described embodiment is implemented, it is desirable to implement movement control regardless of a track pitch of the reference plane Ref during formation of the above-described guide track, and to implement forcible movement of the objective lens while maintaining a tracking servo control state of the reference plane Ref during the above-described "true-up."

For example, in view of these points, in this example, while the tracking servo control state on the reference plane Ref by the reference-plane laser light is maintained, structures, for example, as disclosed in Japanese Patent Application Publication Nos. 2010-225237 and 2011-198425, are applied as a structure of the reference plane Ref so as to make movement of a spiral shape at an arbitrary pitch (hereinafter also referred to as arbitrary pitch spiral movement control or variable track pitch control) possible.

Hereinafter, the structure of the reference plane Ref for making the arbitrary pitch spiral movement control possible and a specific technique of spiral movement control based on the structure of the reference plane Ref will be described with reference to FIGS. 15 to 20.

Figure 15:
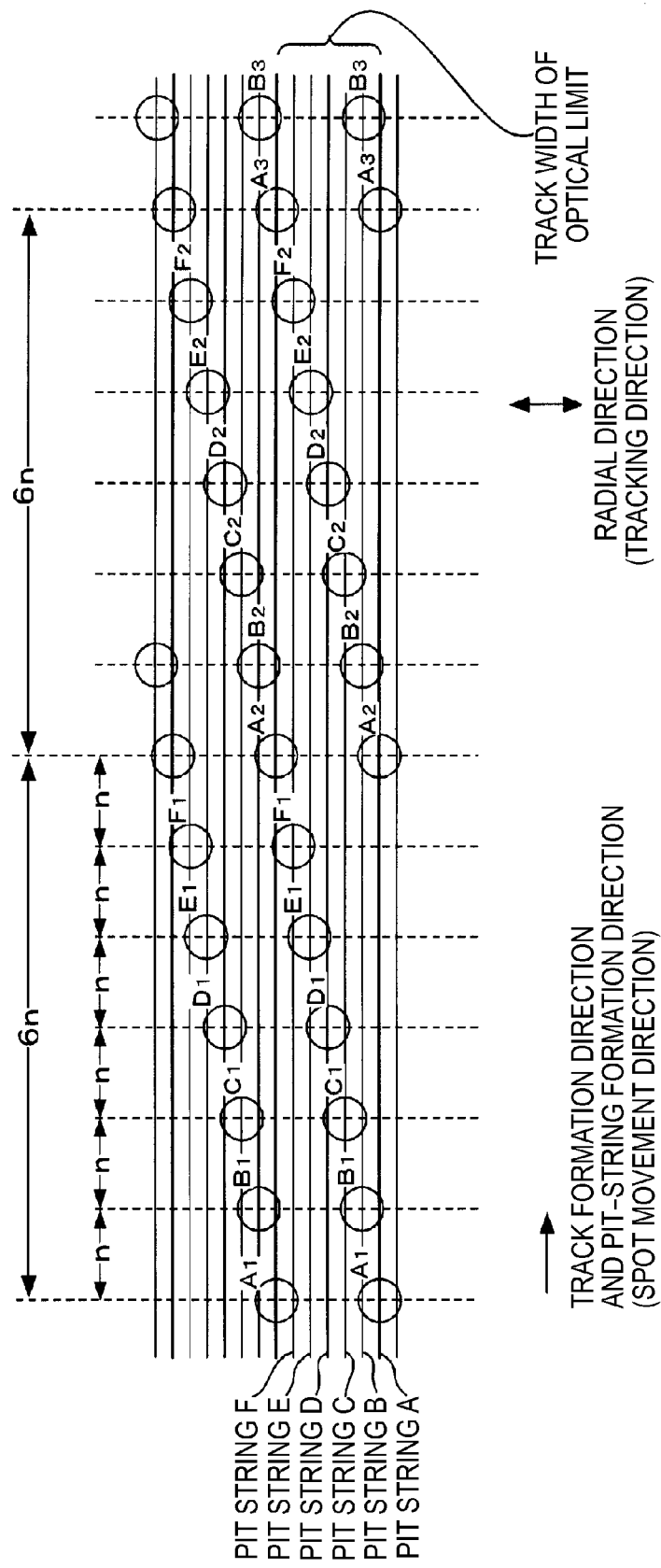
FIG. 15 is a diagram (plan view) in which the surface of a reference plane provided in a recording medium of an embodiment is partially enlarged.

FIG. 15 is a diagram (plan view) in which the reference surface Ref provided in the multilayer recording medium 1 of the embodiment is partially enlarged.

First, in FIG. 15, a direction oriented from the left side to the right side of the drawing is used as a pit-string formation direction, that is, a track formation direction. A beam spot of the servo laser light is assumed to move from the left side to the right side of the drawing according to rotation of the multilayer recording medium 1.

In addition, a direction (vertical direction in the drawing) perpendicular to the pit-string formation direction is a radial direction of the multilayer recording medium 1.

In addition, in FIG. 15, A to F indicated by white circles of the drawing refer to pit formable positions. That is, pits on the reference plane Ref are formed only at the pit formable positions and are not formed at positions other than the pit formable positions.

In addition, the signs of A to F in the drawing are used to distinguish the pit strings (distinguish the pit strings arranged in the radial direction). The numerals annexed to the signs of A to F are used to distinguish the pit formable positions on the pit strings.

Here, an interval (a track width of an optical limit) indicated by a thick black line in the drawing represents a minimum track pitch (a track pitch by an optical limit value) set from optical conditions of the reference plane Ref. As understood from this description, in this case, a total of six pit strings A to F are formed on the reference plane Ref, and arranged at a pitch exceeding the optical limit value in the radial direction.

However, when the plurality of pit strings are simply arranged at the pitch exceeding the optical limit value, there is a concern in that the pit formation positions overlap each other in the pit-string formation direction, that is, there is a concern in that a pit interval in the pit-string formation direction exceeds the optical limit.

In addition, as is apparent from the following description, it is necessary to separately obtain tracking error signals for pit strings A to F so as to implement arbitrary pitch spiral movement control.

That is, even in this point, it is necessary to design the layout of each pit string.

In view of these points, in this case, the following conditions are imposed on pit strings A to F in the reference plane Ref.

That is, 1) the interval of the pit formable positions is restricted to a predetermined first interval in pit strings A to F; and 2) pit strings A to F in which the intervals of the pit formable positions are restricted are arranged so that the pit formable positions are deviated by a predetermined second interval in the pit-string formation direction (that is, the phases of the pit strings are deviated by the second interval).

Here, an interval (second interval) n is set in the pit-string formation direction at the respective pit formable positions in pit strings A to F arranged in the radial direction. At this time, by arranging the pit strings A to F so as to satisfy the condition 2), the intervals between the pit formable positions of pit strings A and B, pit strings B and C, pit strings C and D, pit strings D and E, pit strings E and F, and pit strings F and A all become n as illustrated in the drawing.

In addition, the interval (the first interval) between the pit formable positions in pit strings A to F becomes 6n because the phases of the total of six pit strings A to F are implemented.

As understood from the above, in reference plane Ref of the above-described case, a plurality of pit strings A to F having different pit-string phases are formed so that the basic cycle is the above-described 6n and each phase is deviated by the above-described n.

Thereby, in a technique of implementing spiral movement at an arbitrary pitch as will be described later, it is possible to separately obtain tracking error signals in pit strings A to F.

In addition, simultaneously, when pit strings A to F are arranged in the radial direction at a pitch exceeding the optical limit value of the reference plane Ref as in the case of this example, it is possible to prevent a pit interval from exceeding the optical limit in the pit-string formation direction.

Here, in this example as described above, the optical conditions on the reference plane Ref are wavelength λ=about 650 nm, and numerical aperture NA=about 0.65 as in the case of a Digital Versatile Disc (DVD). In order to correspond thereto, a section length of each pit formable position is 3T that is the same as that of the shortest mark in the DVD, and an interval between edges of the pit formable position in each of pit strings A to F in the pit-string formation direction is also set to the length of the same 3T.

As a result, the above-described conditions 1) and 2) are satisfied.

Subsequently, in order to understand a form in which pits are formed on the entire reference plane Ref, a more detailed formation technique of pit strings will be described with reference to FIG. 16.

Figure 16:
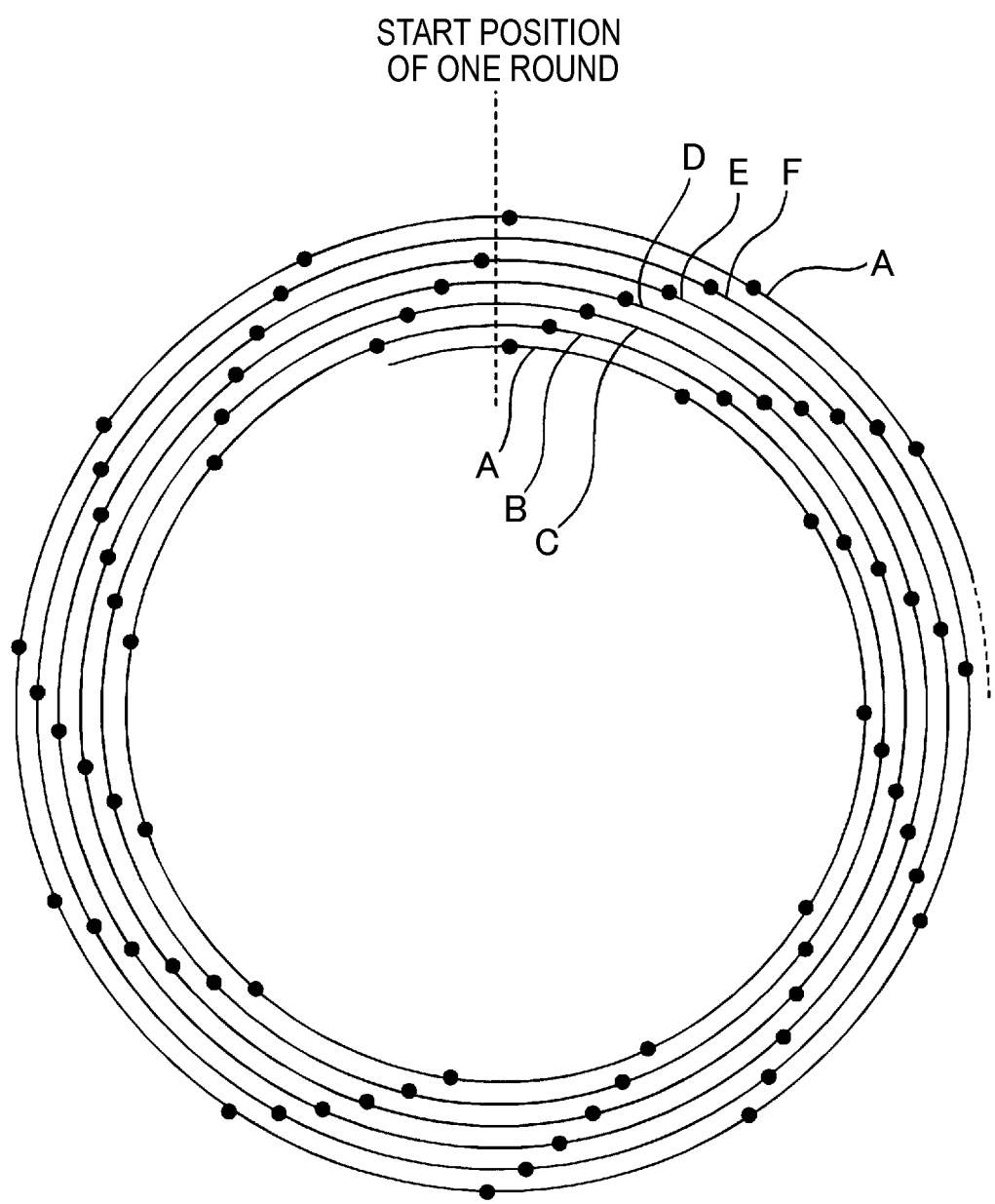
FIG. 16 is an explanatory diagram of a specific technique of forming pits in the entire reference plane.

In FIG. 16, some of the pit strings (seven pit strings) formed on the reference plane Ref are schematically illustrated. In the drawing, the black circles indicate pit formable positions.

As can be seen with reference to FIG. 16, on the reference plane Ref of the above-described case, the pit strings are formed in a spiral shape.

The above-mentioned conditions 1) and 2) are satisfied in relation to the pit strings arranged in the radial direction by setting the pit formable position so that the pit-string phase is deviated by the above-described second interval "n" for every round of the pit string.

For example, in the example illustrated in FIG. 16, in a first round of the pit string, the pit formable position is set so that the pit-string phase of pit string A is obtained. In a second round of the pit string based on a start position of one round (predetermined angle position) of the drawing, the pit formable position is set so that the pit-string phase of pit string B is obtained. Thereafter, likewise, the pit formable positions are set so that the pit-string phase of pit string C is obtained in a third round. The pit formable positions of the rounds of the pit string are set so that the pit-string phases are deviated by a second interval n in the rounds of the pit strings, such as a pit string D in a fourth round, a pit string E in a fifth round, a pit string F in a sixth round, and a pit string A again in a seventh round.

FIGS. 17A, 17B, and 17C are diagrams illustrating an example of recording of specific address information for the reference plane Ref. The following description up to FIG. 20 will be made under the assumption that a signal based on a P/P signal is generated as a tracking error signal (individual tracking error signal) for convenience.

As apparent from the following description, a signal based on the SUM signal (sum signal) is generated as the tracking error signal in the actual configuration.

In FIGS. 17A, 17B, and 17C, first, FIG. 17A is a diagram schematically illustrating a relationship of the pit formable positions of the pit strings (A to F) configured to have different pit-string phases from each other. In FIG. 17A, a mark "*" indicates the pit formable position.

Here, as will be described later, in this example, one pit string is selected from among pit strings A to F and the tracking servo is applied by targeting the selected one pit string.

However, there is a problem in that pit strings A to F are each arranged at the pitch exceeding the optical limit in the radial direction. That is, in this case, because a signal in which all of pit strings A to F are reflected is used as the tracking error signal (P/P signal) obtained by moving (scanning) the beam spot of the reference-plane laser light on the track, it is difficult to follow the selected pit string even when the tracking servo is applied based on the tracking error signal.

Thus, a basic concept in the embodiment is that the tracking error signal is sampled at a timing of the pit formable position in the selected pit string and the tracking servo is applied (in other words, intermittently) based on a value of the sampled tracking error signal.

Likewise, a technique of sampling the sum signal at the timing of the pit formable position of the selected pit string so that only information recorded on the selected pit string is selectively read even when address information is read and detecting the address information based on the value is adopted.

In order to cope with the above-described information detection technique, in this example, a format that represents "0" and "1" of channel bits (recording codes) is assumed to be adopted according to whether or not the pits are formed at the pit formable positions. That is, one pit formable position has information corresponding to one channel bit.

Further, it is assumed that one bit of data bits is represented by a data pattern of "0" and "1" using the plurality of channel bits.

Specifically, in this example, as illustrated in FIG. 17B, when "0" and "1" of the data bits for four channel bits are represented, for example, a pattern "1011" of four channel bits indicates data bit "0" and a pattern "1101" of four channel bits indicates data bit "1."

At this time, the important point is that "0" does not continue. That is, because the fact that channel bit "0" continues means that a period in which an error signal is not obtained continues when the servo is basically performed intermittently using the tracking error signal as described above, it is very difficult to secure the precision of the tracking servo.

For this, in this example, for example, the condition that the channel bit "0" does not continue is set to be satisfied according to the above definition of the data bit. That is, the deterioration of the precision of the tracking servo is minimized according to the above definition of the data bit.

FIG. 17C is a diagram illustrating an example of a sync pattern.

For example, the sync pattern is represented by twelve channel bits as illustrated in the drawing. The former eight bits are set as a channel bit pattern "11111111," which is not suitable for the definition of the data bit, and a pattern of four channel bits subsequent thereto is configured to indicate a type of sync. Specifically, when the pattern of the four channel bits subsequent to the former eight bits is "1011," the pattern of the four channel bits is configured as Sync 1. When the pattern of the four channel bits is "1101," the pattern of the four channel bits is configured as Sync 2.

On the reference plane Ref, the address information is assumed to be recorded continuously after the above-described sync.

Here, as described above, at least absolute position information (radial position information and rotation angle information) on the disc is recorded as the address information of the reference plane Ref.

Giving a description for confirmation, in this example, as described above, the plurality of pit strings A to F are arranged within one limit track width of the related art. However, the address information is recorded so that individual information is assigned to each pit string so that the radial positions of the pit strings are individually represented (so that each pit string can be identified). That is, the same address information is not recorded in the pit strings A to F arranged within one limit track width of the related art.

As understood from the description of FIGS. 17A, 17B, and 17C, the pits are subjected to position recording on the reference plane Ref. The position recording refers to a recording technique in which a pit (or mark) formation part is designated as channel data "1" and other parts are designated as channel data "0."

Incidentally, as illustrated in FIG. 16 described above, in the case of this example, there is provided a structure in which a pit formable position is set so that the pit-string phases are switched in the order of A→B→C→D→E→F→A . . . , that is, so that the pit-string phase is deviation by the above-described second interval "n," for every round of the pit string, after a pit string in the reference plane Ref has been formed in one spiral shape.

According to this, if the tracking servo can be applied, for example, by targeting one pit string among A to F, spiral movement is implemented at a pitch of ⅙ of an optical limit value of the reference plane Ref.

Alternatively, each pit string on the reference plane Ref can be formed in a shape of six spirals of A to F or in a concentric shape instead of one spiral as illustrated in FIG. 16.

However, it is difficult to implement spiral movement at an arbitrary pitch only in an operation of simply applying the tracking servo by targeting one certain pit string even when one of the structures described above has been adopted.

In this embodiment, it is possible to apply the tracking servo by targeting an individual of the pit strings arranged at a pitch exceeding an optical limit value by imposing the above-described conditions 1) and 2) as formation conditions of the pit string of the reference plane Ref. Then, spiral movement at an arbitrary pitch is implemented by applying an offset, which rises with the passage of time, to the tracking error signal and sequentially crossing the pit strings A to F.

Here, in order to implement the spiral movement at the arbitrary pitch, it is necessary to sequentially switch a pit string serving as a servo target to a pit string adjacent to the outer periphery as in the order of pit string A→pit string B→pit string C . . . .

In order to implement an operation of sequentially switching the pit string serving as the servo target as described above, it is necessary that the tracking error signals in the pit strings by phases of A to F each be individually obtained. This is because it is difficult to originally switch the pit string serving as the servo target if it is difficult to discriminate the tracking error signals for pit strings A to F.

Figure 18:
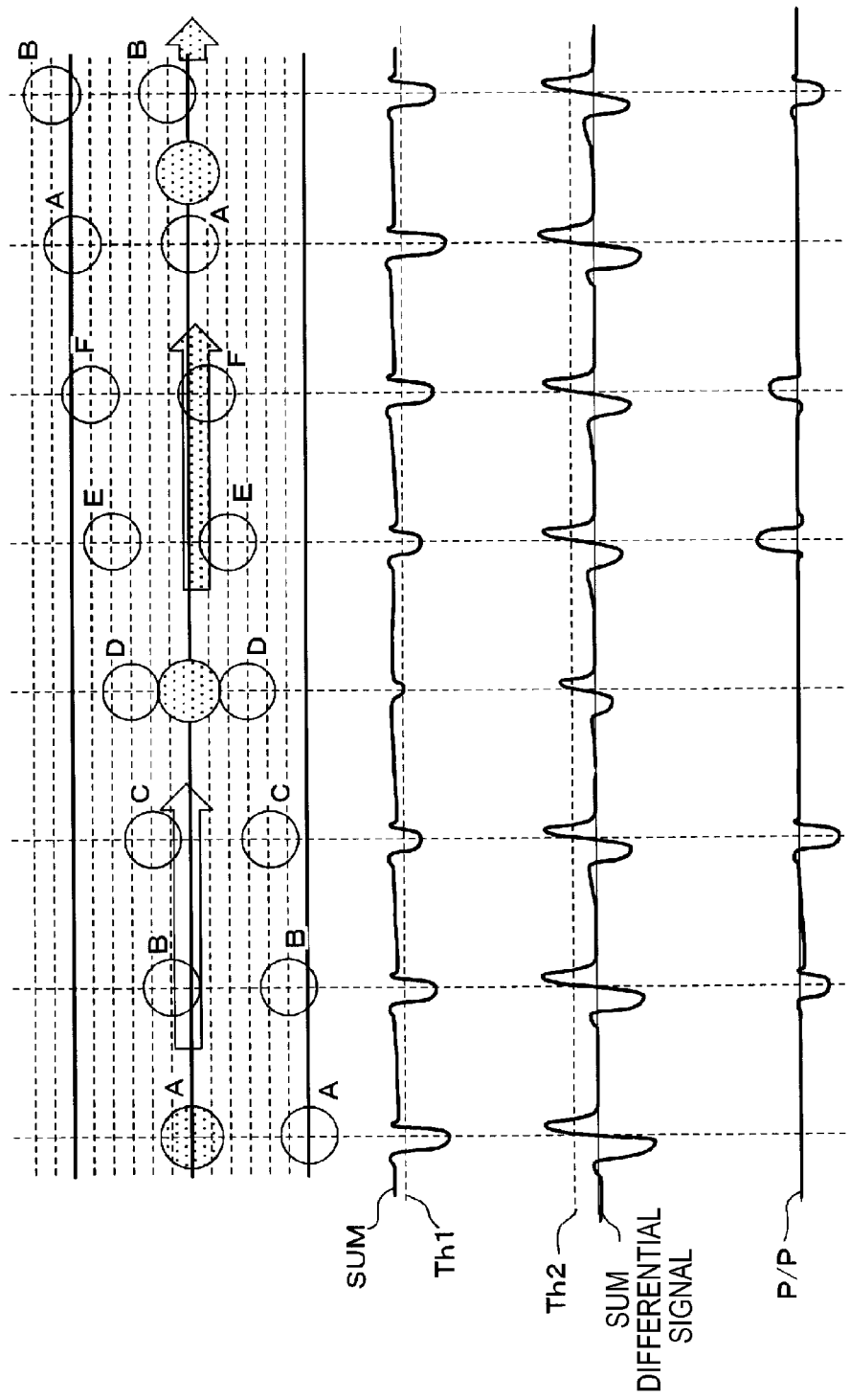
FIG. 18 is a diagram schematically illustrating a form in which a spot of laser light for the reference plane moves on the reference plane according to rotation of the recording medium and a relationship among waveforms of a SUM signal, a SUM differential signal, and a push/pull (P/P) signal obtained at that time.

FIG. 18 is a diagram schematically illustrating a movement form of the spots of the servo laser beam on the reference plane Ref according to rotation of the multilayer recording medium 1 and a relationship among the waveforms of a SUM signal, a SUM differential signal, and a P/P signal obtained at that time.

The SUM differential signal is a signal obtained by differentiating the SUM signal based on reflected light of the reference-plane laser light.

Here, for ease of description in FIG. 18, pits are formed at all pit formable positions in the drawing.

As illustrated in the drawing, in association with the movement of the beam spot of the beam servo according to the rotation of the multilayer recording medium 1, the SUM signal has a peak signal level in a cycle corresponding to the arrangement interval of pits A to F in the pit-string formation direction. That is, the SUM signal indicates the interval (formation cycle) in the pit-string formation direction of pits A to F.

Here, in the example of the drawing, because the beam spot is moved along pit string A, the SUM signal has a tendency in which its peak value is maximized when the beam spot passes through the formation position of pit A in the pit-string formation direction and its peak value is gradually decreased over the formation positions of pits B to D. Thereafter, the tendency changes so that the peak value turns toward an increase tendency in the order of formation position of pit E→formation position of pit F, and the peak value is maximized again at the formation position of pit A. That is, because the pits in pit strings E and F adjacent to the outer periphery side have an influence on the formation positions of pits E and F in the pit string formation direction, the peak value of the SUM signal increases sequentially at pits E and F.

In addition, as the SUM differential signal and the P/P signal serving as the tracking error signal, waveforms as illustrated in the drawing are obtained.

Here, it should be noted that the P/P signal serving as the tracking error signal is obtained to represent a relative positional relationship between the beam spot and the pit string at each of the pit formable positions of A to F separated by the predetermined interval n.

In addition, the SUM differential signal represents an interval in the pit-string formation direction of the pit formation positions (pit formable positions in a precise sense) of pit strings A to F.

Accordingly, it is possible to obtain a clock CLK representing an interval of the pit formable positions of pit strings A to F in the pit string formation direction based on the SUM differential signal.

Specifically, in this case, the clock CLK becomes a signal designating a position (timing) corresponding to a center position (peak position) of each pit as a rising position (timing).

Figure 19:
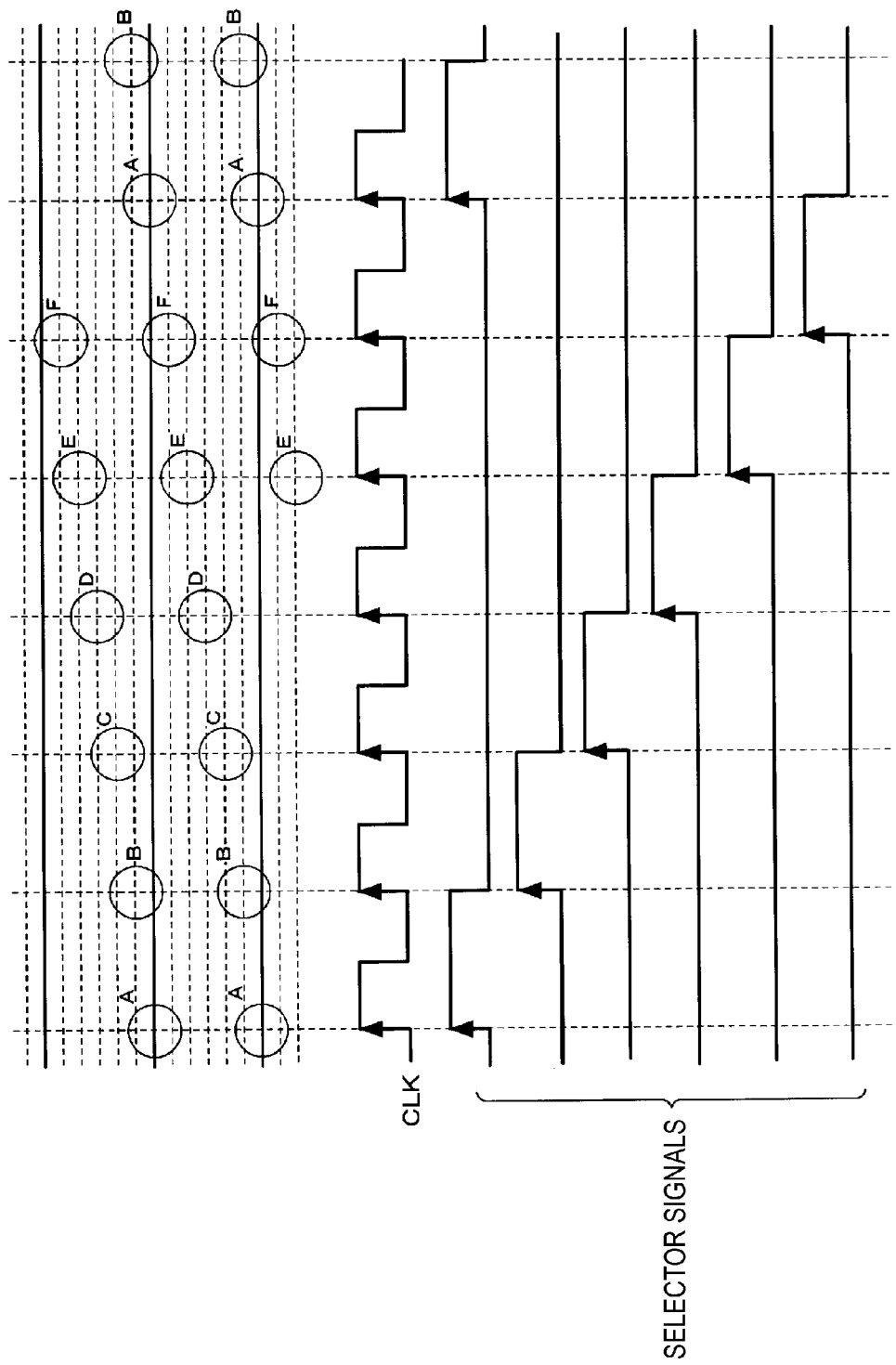
FIG. 19 is a diagram schematically illustrating a relationship among a clock generated from the SUM differential signal, a waveform of each selector signal generated based on the clock, and (some of) pit strings formed on the reference plane.

FIG. 19 schematically illustrates the relationship among the clock CLK, the waveforms of selector signals generated based on the clock CLK, and (some of) the pit strings formed on the reference plane Ref.

As illustrated in the drawing, the clock CLK becomes a signal that rises at the timing corresponding to the peak position of each pit (pit formable position) and falls at an intermediate point between rising positions.

Such a clock CLK can be generated by phase locked loop (PLL) processing using a timing signal (indicating a zero cross timing of the SUM differential signal) generated from the SUM differential signal as an input signal (reference signal).

Six types of selector signals representing timings of individual pit formable positions of A to F are generated from the clock CLK having a cycle corresponding to the formation interval of pits A to F as described above. Specifically, the selector signals are each generated by dividing the clock CLK into sixths, and the phases thereof are deviated from each other by ⅙ cycle. In other words, each of the selector signals is generated by dividing the clock CLK into sixths for each timing, so that the rising timings are deviated from each other by ⅙ cycle.

The selector signals are signals indicating timings of the pit formable positions of the corresponding pit strings A to F. In this example, an arbitrary selector signal is selected after the selector signals have been generated. The beam spot of the reference-plane laser light is traced on an arbitrary pit string among pit strings A to F by performing tracking servo control according to the P/P signal within a period indicated by the selected selector signal. That is, in this manner, it is possible to arbitrarily select a pit string serving as a servo target from among pit strings A to F.

As described above, the selector signals representing the timings of the pit formable positions of the corresponding pit strings A to F are generated, an arbitrary selector signal is selected therefrom, and the tracking servo control is performed based on the tracking error signal (P/P signal) within the period indicated by the selected selector signal. Accordingly, it is possible to implement tracking servo targeting an arbitrary pit string among pit strings A to F. That is, it is possible to switch the tracking error signal of the pit string serving as a servo target by the selection of the selector signal, thereby switching the pit string serving as the servo target.

Figure 20:
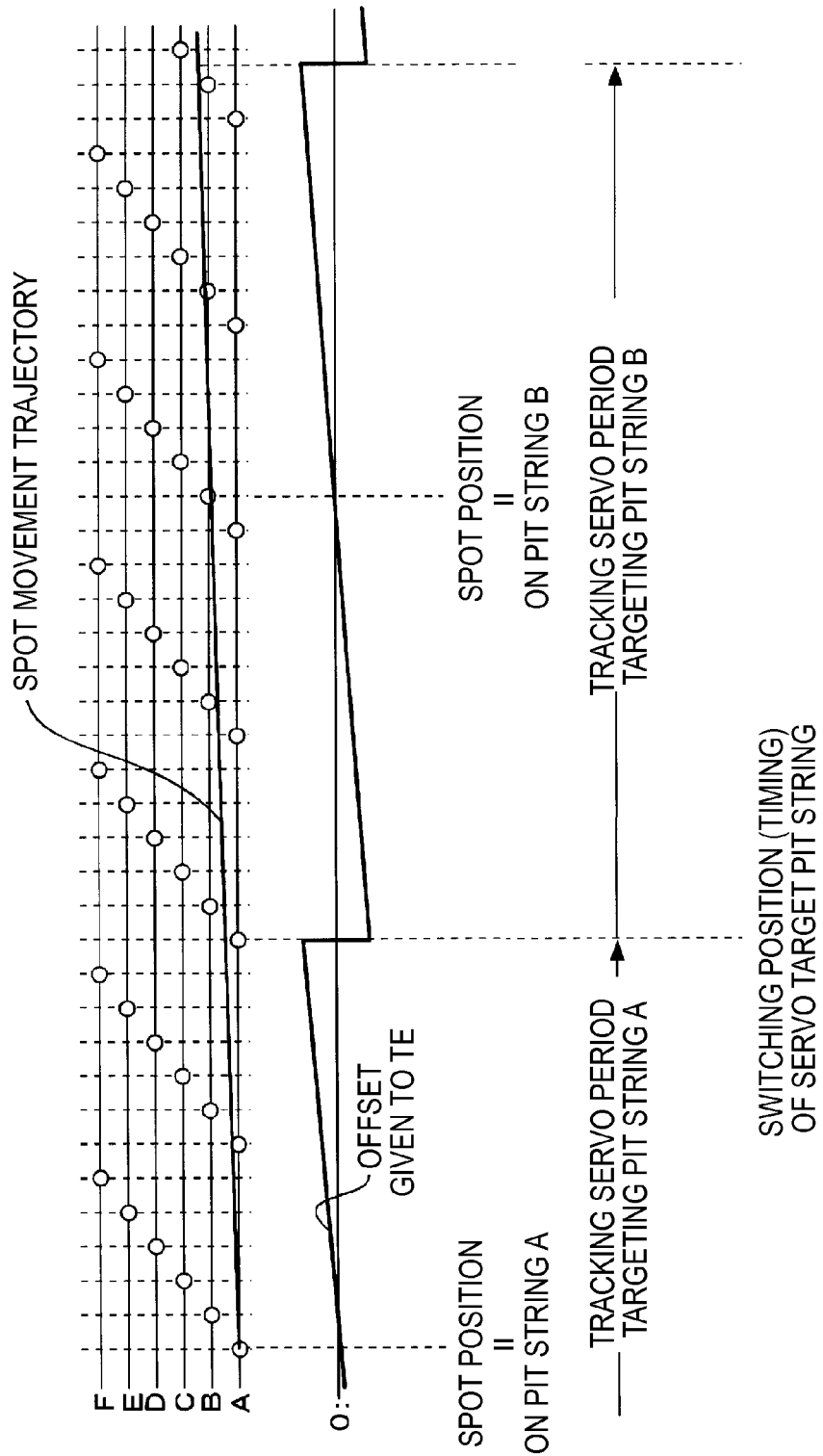
FIG. 20 is an explanatory diagram of a specific technique for spiral movement implementation at an arbitrary pitch.

As an explanatory diagram of a specific technique for implementing spiral movement at an arbitrary pitch, FIG. 20 illustrates a relationship between an offset applied to a tracking error signal TE-sv and a movement trajectory of a beam spot in the reference plane Ref.

The tracking error signal TE-sv used here is a signal obtained by sampling and holding the P/P signal based on the above-described selector signal. That is, the tracking error signal TE-sv is the P/P signal (tracking error signal) of the pit string serving as the servo target.

In FIG. 20, a form in which the beam spot crosses pit string A→pit string B by the assignment of the offset is illustrated.

First, when a technique of sequentially switching the pit string of a servo target in the implementation of spiral movement at an arbitrary track pitch is adopted, its switching position (timing) is set in advance. In the example of this drawing, the switching position of the servo-target pit string is set to a position (in the radial direction) which is an intermediate point between the adjacent pit strings.

Here, when a certain spiral pitch is implemented, a good position through which the beam spot passes on the disc so as to implement a certain spiral pitch can be obtained by pre-calculation from the format of the reference plane Ref. That is, as understood from the above, the position at which the beam spot reaches the intermediate point between adjacent pit strings may be obtained by pre-calculation.

As described above, according to the position (which clock of which address block) serving as the above-described intermediate point obtained by pre-calculation or the like, the pit string serving as the servo target is sequentially switched to a pit string adjacent to the outside of the pit string serving as the target up to that time.

On the other hand, to move the beam spot in the radial direction, an offset by a sawtooth wave as illustrated in the drawing is applied to the tracking error signal TE-sv. According to the setting of the slope of this offset, it is possible to set the spiral pitch to an arbitrary pitch.

The offset applied to implement an arbitrary spiral pitch has a waveform in which polarity changes for every intermediate point from a relationship that the servo-target pit string is sequentially switched at the timing when the beam spot reaches the intermediate point between the adjacent pit strings as described above. That is, because an offset amount necessary for moving the beam spot to the position serving as the intermediate point, for example, is "+α" when the servo is performed by targeting pit string A and is "−α" when the servo is performed by targeting the adjacent pit string B, it is necessary to invert the polarity of the offset at the switching timing of the servo-target pit string serving as the timing reaching the intermediate point. From this point, the waveform of the offset applied in this case becomes the waveform of the sawtooth wave as described above.

Giving a description for confirmation, the waveform of the offset is obtained based on information on the spiral pitch to be implemented and information on the format of the reference plane Ref by pre-calculation or the like.

While the offset of the predetermined sawtooth wave is applied to the tracking error signal TE-sv, for every timing at which the beam spot reaches a predetermined position between the adjacent pit strings previously determined to be the intermediate point, the pit string serving as the target of the tracking servo is switched to a pit string adjacent to the outside of the pit string serving as the target up to that time.

Thereby, it is possible to implement spiral movement at an arbitrary pitch.

An example in which the tracking error signal TE-sv in the pit string serving as the target of the tracking servo is generated based on the P/P signal has been described above. However, for example, as disclosed even in the above-described reference literatures, the tracking error signal TE-sv can be obtained by calculating a difference between SUM signals of two pit strings having the same phase difference for the pit strings serving as a tracking error detection target.

In addition, the phase of the pit string is not limited to six phases.

5. Reproducing Technique of Embodiment

According to the recording technique of the embodiment described above, user data can be recorded at a double recording rate according to simultaneous recording using the first recording spot Swr#1 and the second recording spot Swr#0.

During reproduction, the reproducing rate is improved by simultaneously reproducing data recorded on the first and second spirals using two beams according to the above-described simultaneous recording.

Here, giving a description for confirmation, if recording of one spiral (simple spiral recording) using one beam is performed during recording, it is difficult to improve the reproducing rate even when simultaneous reproduction using two beams is performed during reproduction.

Figure 21:
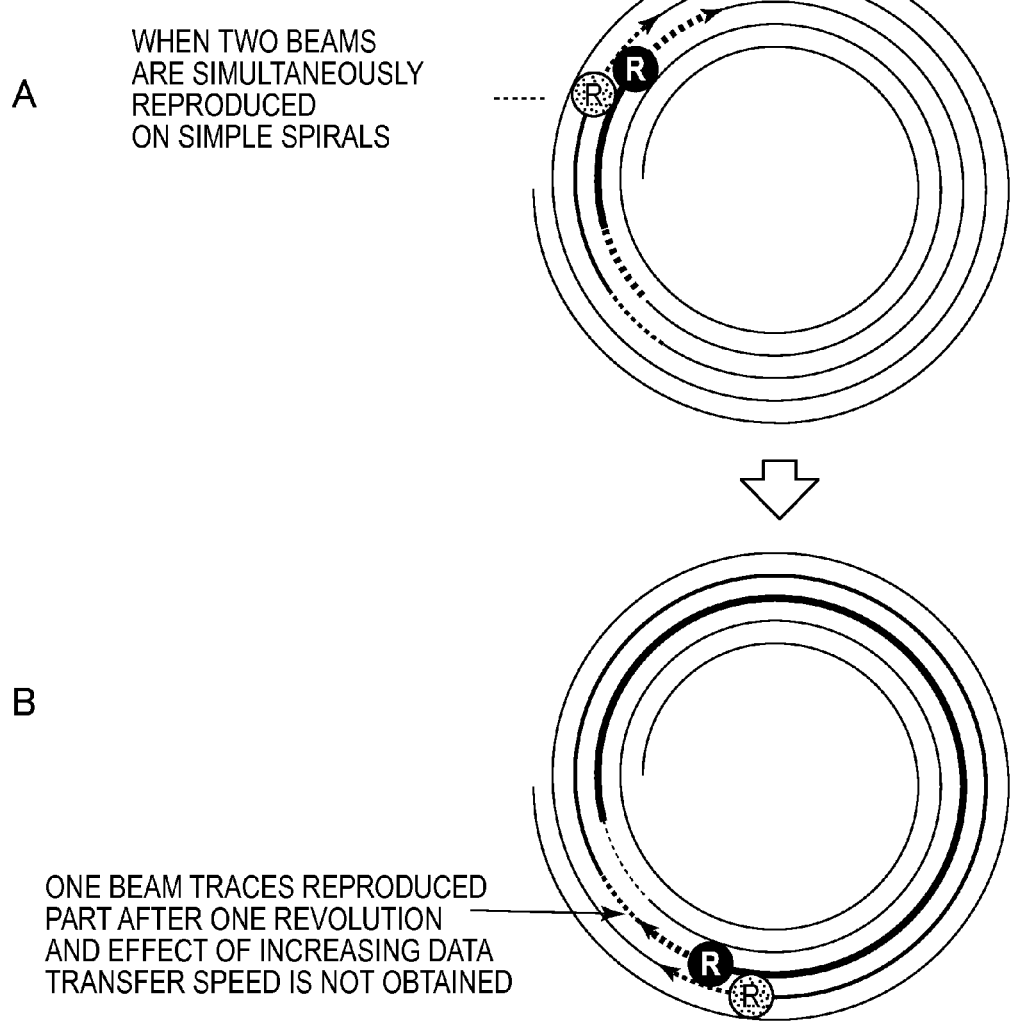
FIG. 21 is a diagram illustrating a point that an effect of increasing a reproducing rate is not obtainable in simple spiral recording.

FIG. 21 is a diagram illustrating the above-described point. Even when the simultaneous reproduction is performed using two beams when the simple spiral recording has been performed, the simultaneous reproduction is implemented in an initial round as illustrated in FIG. 21A. However, after reproduction for one round has been completed, one beam traces a part reproduced by the other beam and hence an effect of increasing the reproducing rate (reproduction-data transmission speed) is not obtained.

In this sense, it is necessary to simultaneously record at least two spirals during recording in the sense that the reproducing rate is improved using the two beams.

Conditions for obtaining the effect of increasing the reproducing rate, that is, conditions for continuously implementing simultaneous reproduction (over a plurality of revolutions)

using a plurality of beams for data simultaneously recorded by a plurality of beams, are as follows.

That is, when the number of spirals to be simultaneously recorded is S and a spot interval is P [tracks], the condition is that S/GCD(S, P) be an even number. Here, GCD(a, b) indicates the greatest common devisor of a and ab.

Here, in this embodiment, because there are provided two pickups OP, each of which radiates two pieces of recording-layer laser light, a total of four pieces of reproducing laser light can be simultaneously radiated. If these four pieces of reproducing laser light are used, it is possible to further improve the reproducing rate.

Figure 22:
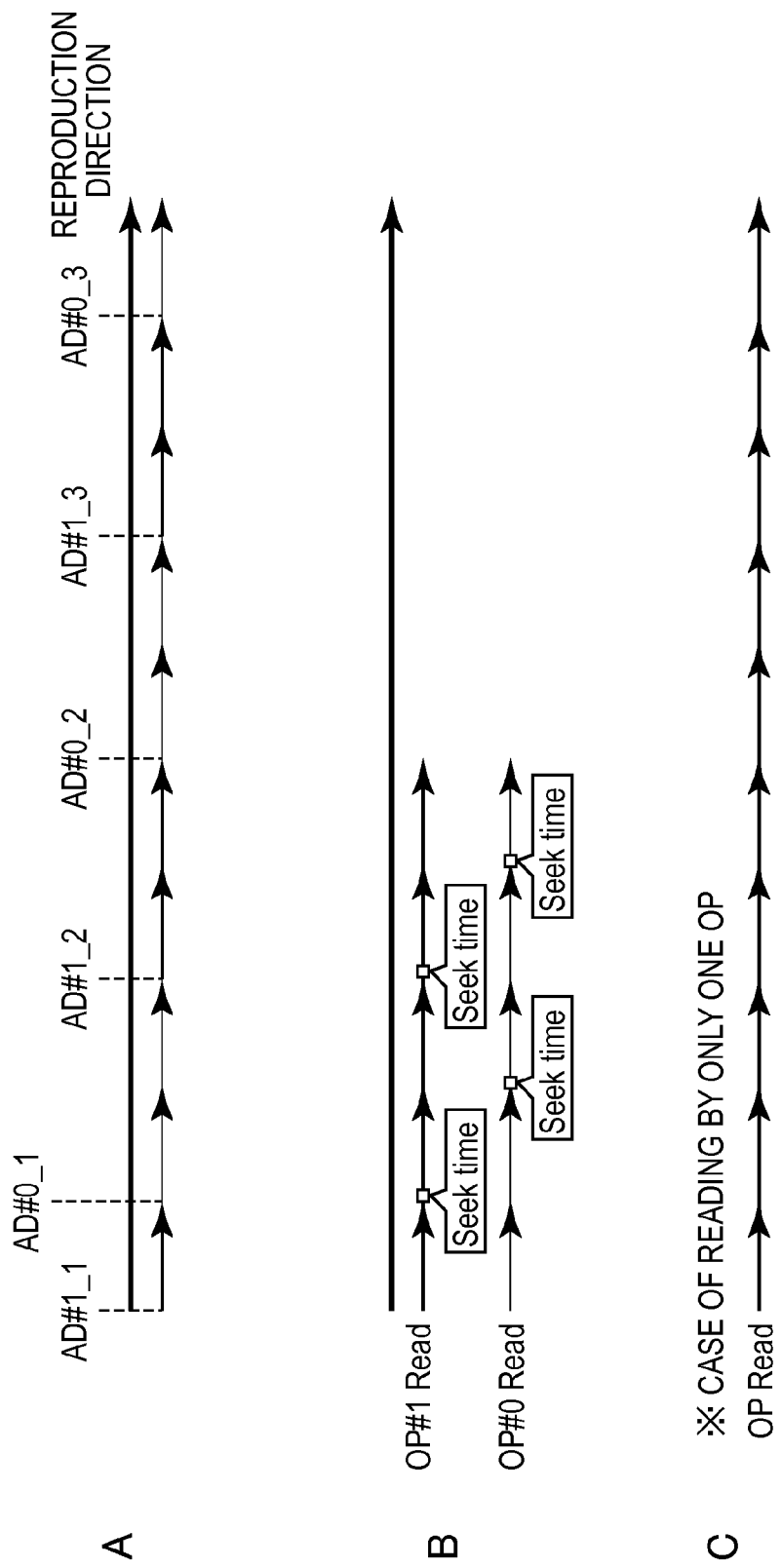
FIGS. 22A, 22B, and 22C are explanatory diagrams of a specific technique for further improving a reproducing rate according to simultaneous reproduction using four pieces of reproducing laser light.

FIGS. 22A, 22B, and 22C are explanatory diagrams of a specific technique for further improving a reproduction rate according to simultaneous reproduction using four pieces of reproducing laser light.

Here, in each optical pickup OP, a set of recording/first reproducing laser light and ATS/second reproducing laser light is radiated via each common objective lens. In other words, a set of reproducing beams of side #0 and a set of reproducing beams of side #1 can be independently subjected to position control.

When there are the set of reproducing beams of side #0 and the set of reproducing beams #1 capable of being independently subjected to the position control, it is possible to prevent one reproducing beam set from redundantly reading a reproduction section by the other reproducing beam set by performing reproduction so that one overtakes the reproduction section of each other. That is, when the redundancy is absent, the reproducing rate is improved.

In addition in order to maximize the effect of improving the reproducing rate, a total reproduction section length of the reproducing beam set of side #0 has to be equal to a total reproduction section length of the reproducing beam set of side #1.

There is a difference between these section lengths because there is a time in which reproduction is performed by only a single set, and consequently the effect of improving the reproducing rate is degraded.

In view of the above-described points, in this embodiment, a read section length by the reproducing beam set of side #0 and a read section length by the reproducing beam set of side #1 are set to be equally allocated and a reproducing operation is set to be executed so that each set overtakes the read section of the other side.

FIG. 22A illustrates an example of allocation of the read sections of the set of side #0 and the set of side #1.

Here, the following two terms are defined.

Total Read length . . . Total length of a read section indicated by a read command or the like Continuous Read Section . . . Section to be continuously read by the set of side #0 and the set of side #1

Here, for convenience of illustration, a length of one arrow of the drawing is assumed to be a length of one RUB.

In addition, in this case, the continuous read section length is assumed to be two RUBs.

In the example illustrated in FIG. 22A, an example in which the total read length is set to a length of 10 RUBs is illustrated.

As illustrated in the drawing, in this case, a section of one RUB from "Address AD#1_1" to "Address AD#0_1-1," a section of two RUBs (=Continuous Read Section Length) from "Address AD#1_2" to "Address AD#0_2-1," and a section of two RUBs from "Address AD#1_3" to "Address AD#0_3-1" are allocated as read sections of the set of side #1.

On the other hand, read sections of side #0 become a section of two RUBs from "Address AD#0_1" to "Address AD#1_2-1," a section of two RUBs from "Address AD#0_2" to "Address AD#1_3-1," and a section of one RUB from "Address AD#0_3."

According to the above-described allocation, the read section length by the reproducing beam set of side #0 and the read section length by the reproducing beam set of side #1 are set to be equal and the reproducing operation can be executed so that each set overtakes the read section of the other side.

When an allocation technique in which the read section length by the reproducing beam set of side #0 and the read section length by the reproducing beam set of side #1 are equal and the reproducing operation is executed so that each set overtakes the read section of the other side is generalized, the generalized technique, for example, is as follows.

First, (Total Read length÷Continuous Reproduction Section Length) is calculated.

The result of this calculation is divided into the case in which there is a remainder, the case in which a quotient is odd, and the case in which the quotient is even.

Specifically, when the result of the above-described calculation indicates that the quotient is even when there is no remainder, the read sections of sides #0 and #1 are simply alternately separated at the interval of the continuous read section length.

On the other hand, when the quotient is odd, the read sections of sides #0 and #1 are simply alternately separated using both an interval of "Continuous Read Section Length÷2" and an interval of the continuous read section length. The example illustrated in FIG. 22A corresponds to this case.

In addition, when the result of the above-described calculation indicates that the quotient is even when there is a remainder, the read sections of sides #0 and #1 are simply alternately separated using both an interval of "Remainder÷2" and an interval of the continuous read section length.

On the other hand, when the quotient is odd, the read sections of side #0 and #1 are simply alternately separated using both an interval of "Remainder÷2+Continuous Read Section Length÷2" and the interval of the continuous read section length.

For example, by separating the read sections of sides #0 and #1 according to the above-described technique, the read section length by the reproducing beam set of side #0 and the read section length by the reproducing beam set of side #1 can be set to be equal and the reproducing operation can be executed so that each set overtakes the read section of the other side.

That is, it is possible to further implement approximately a double reproducing rate using four reproducing beams.

In FIGS. 22B and 22C, the time necessary for reproduction of the total read length when the allocation of FIG. 22A is performed in the case in which the four reproducing beams are used (FIG. 22B) and the time necessary for reproducing the reproduction of the total read length when only one optical pickup OP (two reproducing beams) is used (FIG. 22C) are illustrated in contrast with each other.

As illustrated in FIG. 22B, when the allocation illustrated in FIG. 22A has been performed, side #1 performs reading for the continuous read section length from "Address AD#1_2" to "Address AD#0_2-1" by performing a seek operation after performing reading for one RUB (Continuous Read section Length÷2) from "Address AD#1_1" to "Address AD#0_1-1." After the completion of the reading, reading for the continuous read section length from "Address AD#1_3" to "Address AD#0_3-1" is performed by performing the seek operation again.

In addition, side #0 performs reading for the continuous read section length from "Address AD#0_2" to "Address AD#1_3-1" by performing the seek operation after performing reading for the continuous read section length from "Address AD#0_1" to "Address AD#1_2-1." After the completion of the reading, reading for one RUB from "Address AD#0_3" is performed by performing the seek operation again.

As can be seen by comparing FIGS. 22B and 22C, according to the reproducing technique of this embodiment described above, the time necessary for reproduction can be reduced to approximately ½ and the reproducing rate can be improved approximately twofold as compared with when one optical pickup OP performs reproduction using two beams.

Here, as understood from FIGS. 5A and 5B described above, in this example, the above-described division reproduction is performed using two optical pickups OP. Because broad overtaking is possible if the above-described division reproduction is performed using separate optical pickups OP, it is possible to set the continuous read section to be long. Thereby, it is possible to reduce the number of seek operations for overtaking and further improve the reproducing rate.

Incidentally, in the case in which recording data is simultaneously reproduced by two beams using two spirals as one set as in this embodiment, when the spiral set serving as a reproduction target is set to be accessed, the seek operation may be simply performed by targeting the spiral on the near side between the two spirals.

Figure 23:
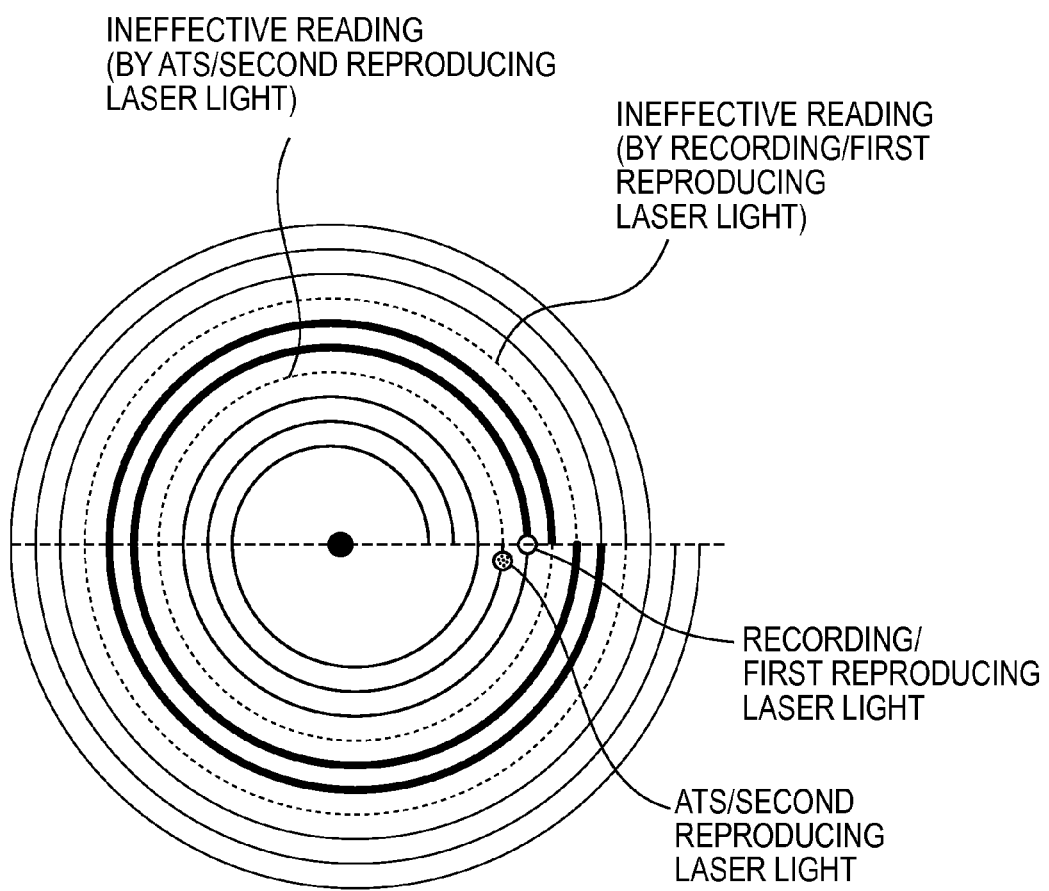
FIG. 23 is a diagram illustrating a form in which a seek operation is performed by targeting a position at which a preceding spot is placed on a spiral on the near side of a spiral set.

FIG. 23 illustrates a form in which the seek operation is performed by targeting the spiral on the near side of the spiral set as described above.

Specifically, in this case, the case in which the seek operation has been performed by targeting a position at which the beam spot of recording/first reproducing laser light forming a preceding spot is placed on the spiral on the near side of the spiral set is exemplified.

Although one side of the target spirals can be read by the recording/first reproducing laser light in a first round at the initiation of reproduction as illustrated in the drawing when the above-described seek is performed, the ATS/second reproducing laser light is not placed on any target spiral and ineffective reading for one round (indicated by the dotted line in the drawing) by the second reproducing laser light side occurs.

Further, on the reproduction end side, at a point in time at which the first reproducing laser light side has read all parts to be read, the second reproducing laser light side should further execute reading for one round. That is, in the last round section, ineffective reading (indicated by the dotted line) occurs on the first reproducing laser light side.

Figure 24:
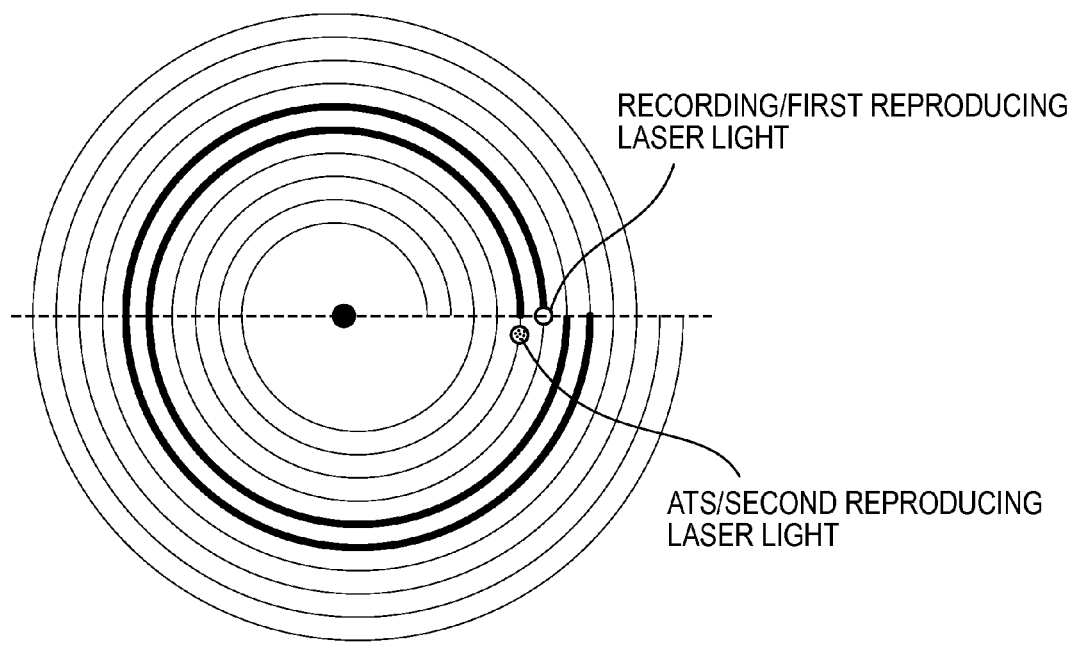
FIG. 24 is a diagram illustrating a form when the seek operation is performed by targeting a position at which each spiral is placed in a spiral set targeting all reproducing beams.

In order to prevent ineffective reading, in this embodiment, as illustrated in FIG. 24, the seek operation is performed by targeting a position at which all reproducing beams are placed on spirals in the spiral set. That is, the seek operation is performed by targeting a position at which one of the two reproducing beams is placed on one corresponding spiral in the spiral set on which data serving as a reproduction target has been recorded.

According to this, an ineffective reading part as illustrated in FIG. 23 can be prevented.

Here, in this embodiment, as will be described later, tracking position control on the recording layer 3 during reproduction is performed based on reflected light of the ATS/second reproducing laser light forming the following spot (see FIGS. 25 to 27). According to the above-described configuration, for the seek operation on the recording layer 3, the seek operation is simply performed by targeting the spiral on the near side of the spiral set serving as the target, and hence the seek operation targeting positions at which all reproducing beams are placed on spirals in the spiral set serving as the target is implemented.

6. Configuration of Recording/Reproducing Apparatus of Embodiment

Next, a configuration of the recording/reproducing apparatus 10 in accordance with the embodiment will be described with reference to FIGS. 25 to 27.

Figure 25:
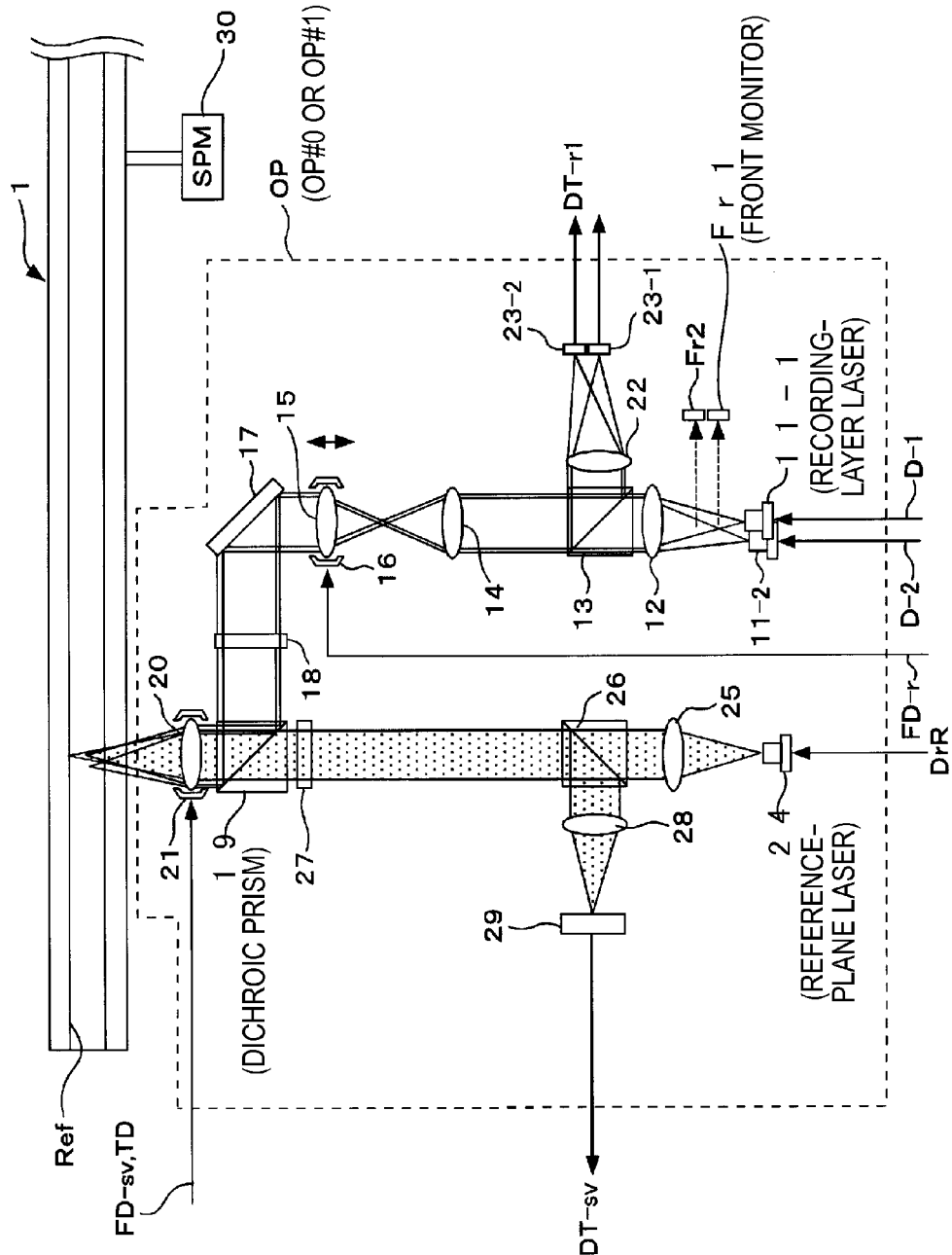
FIG. 25 is an explanatory diagram mainly illustrating a configuration of an optical system provided in a recording/reproducing apparatus of an embodiment.

FIG. 25 is an explanatory diagram mainly illustrating a configuration of an optical system provided in the recording/reproducing apparatus 10, and specifically illustrates only one of the optical pickups OP#0 and OP#1 (referred to as the "optical pickup OP" when it is not necessary to particularly distinguish them) provided in the recording/reproducing apparatus 10.

First, the multilayer recording medium 1 loaded to the recording/reproducing apparatus 10 is set so that its center hole is clamped at a predetermined position in the recording/reproducing apparatus 10, and can be rotatably driven by a spindle motor 30 in the drawing.

The optical pickup OP is arranged so that the multilayer recording medium 1 rotatably driven by the spindle motor 30 is irradiated with laser light from the cover layer 2.

Recording-layer lasers 11-1 and 11-2, which are light sources of recording-layer laser light, are provided within the optical pickup OP.

In addition, a reference-plane laser 24, which is a light source of reference-plane laser light that is light for performing position control using a position guide formed on the reference plane Ref and reading a reference-plane address, is provided.

In addition, an objective lens 20 serving as an output end of the recording-layer laser light and the reference-plane laser light to the multilayer recording medium 1 is provided in the optical pickup OP. Further, there are provided a recording-layer light-receiving unit 23 for receiving reflected light of the recording-layer laser light from the multilayer recording medium 1 and a reference-plane light-receiving unit 29 for receiving reflected light of the reference-plane laser light from the multilayer recording medium 1.

In the optical pickup OP, an optical system for guiding the recording-layer laser light to the objective lens 20, and guiding the reflected light from the multilayer recording medium 1 incident on the objective lens 20 to the recording-layer light-receiving unit 23 (23-1 and 23-2) is formed.

Recording-layer lasers 11-1 and 11-2 are driven to emit light according to laser drive signals Dr1 and Dr2.

The recording-layer laser 11-1 is the light source of the recording/first reproducing laser light, and the recording-layer laser 11-2 is the light source of the ATS/second reproducing laser light.

The "recording/first reproducing laser light" and the "ATS/second reproducing laser light" are collectively referred to as the "recording-layer laser light."

Recording-layer laser light of two systems emitted from the recording-layer lasers 11-1 and 11-2 is incident on a polarization beam splitter 13 after being converted into parallel light via a collimator lens 12 as illustrated in the drawing.

The polarization beam splitter 13 is configured to transmit the recording-layer laser light incident from the light source side as described above.

The recording-layer laser light of the two systems emitted from the recording-layer lasers 11-1 and 11-2 is branched and guided to front monitors Fr1 and Fr2 in the drawing according to a beam splitter (not illustrated) or the like.

The front monitors Fr1 and Fr2 are photo-detectors for a power monitor necessary for auto power control (APC).

The recording-layer laser light passing through the polarization beam splitter 13 is incident on a focus mechanism including a fixed lens 14, a movable lens 15, and a lens drive unit 16. The focus mechanism is provided to adjust a focus position for the recording-layer laser light, the side close to the recording-layer lasers 11-1 and 11-2 becomes the fixed lens 14, and the movable lens 15 is arranged on the side far away therefrom. The movable lens 15 is configured to be driven by the lens drive unit 16 in a direction parallel to a laser-light axis.

The recording-layer laser light via the fixed lens 14 and the movable lens 15, which forms the above-described focus mechanism, is incident on a dichroic prism 19 via a quarter-wavelength plate 18 after being reflected by a mirror 17.

The dichroic prism 19 is configured to have a selective reflection surface that reflects light in the same wavelength range as that of the recording/reproducing laser light and allow light of other wavelengths to pass therethrough. Accordingly, the recording/reproducing laser light incident as described above is reflected by the dichroic prism 19.

The recording/reproducing laser light reflected by the dichroic prism 19 is radiated (focused) onto the multilayer recording medium 1 (the necessary recording layer 3) via the objective lens 20 as illustrated in the drawing.

For the objective lens 20, there is provided a biaxial actuator 21 that holds the objective lens 20 to be displaceable in a focus direction (a direction of contacting/leaving the multilayer recording medium 1) and a tracking direction (a direction orthogonal to the focus direction: a radial direction of the disc).

The biaxial actuator 21 includes a focus coil and a tracking coil, which are each given driving signals (drive signals FD-sv and TD to be described later) to displace the objective lens 20 in the focus direction and the tracking direction, respectively.

Here, by radiating the recording-layer laser light to the multilayer recording medium 1 as described above, reflected light of the recording-layer laser light is obtained from the multilayer recording medium 1 (the recording layer 3 serving as a recording/reproduction target).

The reflected light of the recording/reproducing laser light obtained as described above is guided to the dichroic prism 19 via the objective lens 20, and reflected by the dichroic prism 19.

The reflected light of recording/reproducing laser light reflected by the dichroic prism 19 is incident on the polarization beam splitter 13 after passing through quarter-wavelength plate 18→mirror 17→focus mechanism (movable lens 15→fixed lens 14).

The reflected light of the recording-layer laser light incident on the polarization beam splitter 13 as described above passes through the quarter-wavelength plate 18 in an outward path and a return path twice, and hence its polarization direction is rotated 90 degrees in comparison with an outward-light path. As a result, the reflected light of the recording/reproducing laser light incident as described above is reflected by the polarization beam splitter 13.

The reflected light of the recording/reproducing laser light reflected by the polarization beam splitter 13 is focused on a light-receiving plane of the recording-layer light-receiving section 23 via a condenser lens 22. Specifically, as the recording-layer light-receiving unit 23, the recording-layer light-receiving units 23-1 and 23-2 are provided according to the recording-layer laser light of the two systems as illustrated in the drawing, reflected light of the recording/first reproducing laser light is focused on the light-receiving plane of the recording-layer light-receiving unit 23-1, and reflected light of the ATS/second reproducing laser light is focused on the light-receiving plane of the recording-layer light-receiving unit 23-2.

Light-receiving signals obtained by receiving light in the recording-layer light-receiving units 23-1 and 23-2 are referred to as light-receiving signals DT-r1 and DT-r2, respectively.

In addition, in the optical pickup OP, an optical system for guiding the reference-plane laser light emitted from the reference-plane laser 24 to the objective lens 20 and guiding reflected light of the reference-plane laser light from the multilayer recording medium 1 incident on the objective lens 20 to the reference-plane light-receiving unit 29 is formed.

The reference-plane laser 24 is driven to emit light according to the laser drive signal DrR.

As illustrated in the drawing, the reference-plane laser light emitted from the reference-plane laser 24 is converted into parallel light via a collimator lens 25 and then incident on a polarization beam splitter 26. The polarization beam splitter 26 is configured to allow the reference-plane laser light (outward-path light) incident from the reference-plane laser 24 to pass therethrough.

The reference-plane laser light passing through the polarization beam splitter 26 is incident on the dichroic prism 19 through a quarter-wavelength plate 27.

As described above, because the dichroic prism 19 is configured to reflect the light in the same wavelength range as that of the recording/reproducing laser beam and allow the light of other wavelengths to pass therethrough, the reference-plane laser light passes through the dichroic prism 19 and is radiated to the multilayer recording medium 1 (the reference plane Ref) via the objective lens 20.

In addition, the reflected light of the reference-plane laser light (the reflected light from the reference plane Ref) obtained according to irradiation of the reference-plane laser light to the multilayer recording medium 1 as described above passes through the dichroic prism 19 via the objective lens 20, and is incident on the polarization beam splitter 26 via the quarter-wavelength plate 27.

As described above, because the reflected light of the reference-plane laser light incident from the multilayer recording medium 1 passes through the quarter-wavelength plate 27 twice in an outward path and a return path, its polarization direction is rotated by 90 degrees as compared with outward-path light, and therefore the reflected light of the servo laser beam is reflected by the polarization beam splitter 26.

The reflected light of the reference-plane laser light reflected by the polarization beam splitter 26 is focused on the light-receiving plane of the reference-plane light-receiving unit 29 via a condenser lens 28.

Here, a light-receiving signal obtained by the reference-plane light-receiving unit 29 receiving reflected light of the reference-plane laser light is referred to as a light-receiving signal DT-sv.

Here, as illustrated in FIG. 1 described above, in the multilayer recording medium 1, the reference plane Ref is provided on a lower layer side of the recording-layer formation region 5. Therefore, during recording, focus servo control on the objective lens 20 is performed so that the reference-plane laser light is focused on the reference plane Ref provided on the lower layer side of the recording-layer formation region 5 as described above. Then, a collimation state of the recording-layer laser light incident on the objective lens 20 is adjusted so that the recording-layer laser light is focused on the recording layer 3 formed on an upper layer side above the reference plane Ref by driving the above-described focus mechanism (lens drive unit 16) according to focus servo control based on reflected light of the recording-layer laser light with respect to the recording-layer laser light.

In addition, the tracking servo control on the recording-layer laser light during reproduction is performed so that a spot of the recording-layer laser light follows a mark string formed on the recording layer 3 serving as a reproduction target. That is, tracking servo control on the recording-layer laser light during reproduction can be implemented by controlling a position of the objective lens 20 based on the reflected light of the recording-layer laser light. As is apparent from the following description, in the case of this example, the tracking servo control on the recording-layer laser light is performed based on reflected light of the ATS/second reproducing laser light.

Focus servo control during reproduction may be substantially the same as during recording.

Figure 26:
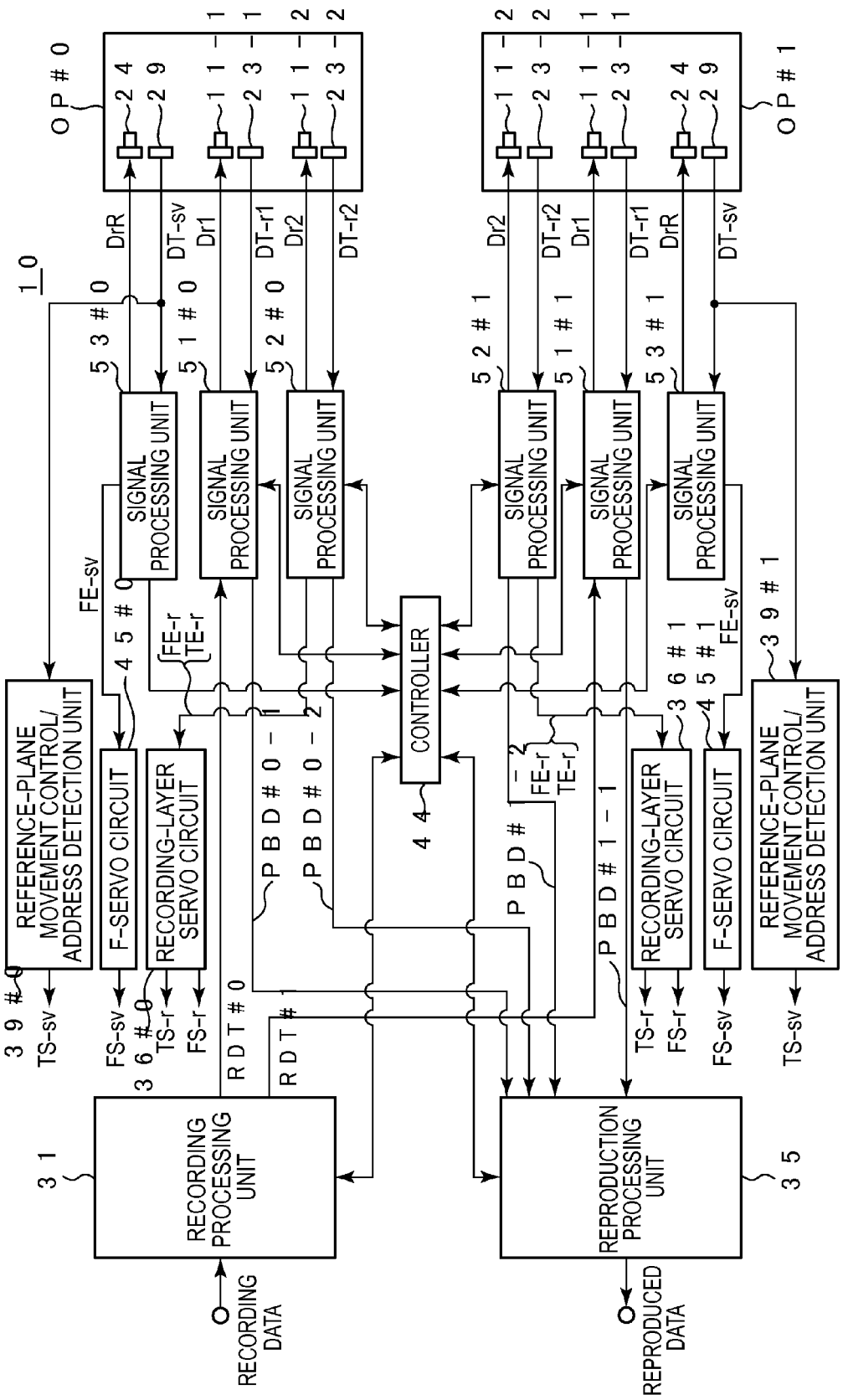
FIG. 26 is a block diagram of a recording/reproducing system of a recording/reproducing apparatus of an embodiment.

FIG. 26 illustrates an internal configuration (mainly a recording/reproduction processing system) of the recording/reproducing apparatus 10 of an embodiment.

In FIG. 26, in internal configurations of optical pickups OP (OP#0 and OP#1), only recording-layer lasers 11-1 and 11-2, a reference-plane laser 24, recording-layer light-receiving units 23-1 and 23-2, and a reference-plane light-receiving unit 29 among elements illustrated in FIG. 25 are illustrated.

First, in FIG. 26, signal processing units 51#0, 52#0, and 53#0 are provided in correspondence with the optical pickup OP#0.

The signal processing unit 51#0 causes recording/first reproducing laser light to be output by providing a laser drive signal Dr1 to the recording-layer laser 11-1 of the optical pickup OP#0. In addition, the signal processing units 51#0 receives a light-receiving signal DT-r1, which is a reflected-light detection signal, from the recording-layer light-receiving unit 23-1 and processes the received light-receiving signal DT-r1.

The signal processing unit 52#0 causes ATS/second reproducing laser light to be output by providing a laser drive signal Dr2 to the recording-layer laser 11-2 of the optical pickup OP#0. In addition, the signal processing unit 52#0 receives a light-receiving signal DT-r2, which is a reflected-light detection signal, from the recording-layer light-receiving unit 23-2 and processes the received light-receiving signal DT-r2.

The signal processing unit 53#0 causes reference-plane laser light to be output by providing a laser drive signal DrR to the reference-plane laser 24 of the optical pickup OP#0. In addition, the signal processing unit 53#0 receives a light-receiving signal DT-sv, which is a reflected-light detection signal, from the reference-plane light-receiving unit 29 and processes the received light-receiving signal DT-sv.

Likewise, signal processing units 51#1, 52#1, and 53#1 are provided in correspondence with the optical pickup OP#1.

The signal processing unit 51#1 causes recording/first reproducing laser light to be output by providing a laser drive signal Dr1 to the recording-layer laser 11-1 of the optical pickup OP#1. In addition, the signal processing unit 51#1 receives a light-receiving signal DT-r1, which is a reflected-light detection signal, from the recording-layer light-receiving unit 23-1 and processes the received light-receiving signal DT-r1.

The signal processing unit 52#1 causes ATS/second reproducing laser light to be output by providing a laser drive signal Dr2 to the recording-layer laser 11-2 of the optical pickup OP#1. In addition, the signal processing unit 52#1 receives a light-receiving signal DT-r2, which is a reflected-light detection signal, from the recording-layer light-receiving unit 23-2 and processes the received light-receiving signal DT-r2.

The signal processing unit 53#1 causes reference-plane laser light to be output by providing a laser drive signal DrR to the reference-plane laser 24 of the optical pickup OP#1. In addition, the signal processing unit 53#1 receives a light-receiving signal DT-sv, which is a reflected-light detection signal, from the reference-plane light-receiving unit 29 and processes the received light-receiving signal DT-sv.

The recording processing unit 31, for example, performs interleaving, addition of an error correction code, encoding for recording, and the like on recording data (user data) input from host equipment or the like, and generates a recording modulation code (recording data) of an RUB format.

Specifically, by adding an error correction code to input recording data, performing a predetermined recording modulation encoding process on the input recording data, and the like, the recording processing unit 31 obtains a recording modulation code string, which, for example, is a binary data string of "0" and "1" to be actually recorded by targeting the recording layer 3.

At this time, the recording processing unit 31 also adds address information (a recording-layer address) to recording data according to an instruction from a controller 44 to be described later.

In the case of this example, the recording processing unit 31 also performs a process of dividing the recording data into first spiral recording data and second spiral recording data in units of RUBs. The first spiral recording data obtained by the division is provided as recording data RDT#1 to the signal processing unit 51#1. In addition, the second spiral recording data is provided as recording data RDT#0 to the signal processing unit 51#0.

The order in which a recording-layer address is assigned is made to alternate between the first and second spirals as described above.

In addition, the recording processing unit 31 outputs dummy data in correspondence with a writing time described above with reference to FIGS. 7 to 14 according to an instruction from the controller 44.

During reproduction, the signal processing units 51#0 and 52#0 perform a data reproducing process in the optical pickup OP#0, and the signal processing units 51#1 and 52#1 perform a data reproducing process in the optical pickup OP#1.

Because each of sides #0 and #1 executes simultaneous reproduction using two beams in this example as described above, four systems of reproduction data PBD#0-1, PBD#0-2, PBD#1-1, and PBD#1-2 are obtained from the signal processing units 51#0 and 52#0 and the signal processing units 51#1 and 52#1, and supplied to the reproduction processing unit 35.

The reproduction processing unit 35 receives the reproduction data PBD#0-1, PBD#0-2, PBD#1-1, and PBD#1-2 from the signal processing units 51#0, 52#0, 51#1, and 52#1, and generates an original series of reproduction data by rearranging the reproduction data in order of PSN. The series of reproduction data is transmitted and output to host equipment (not illustrated) or the like.

As a servo control system in the optical pickup OP#0, a recording-layer servo circuit 36#0, a reference-plane movement control/address detection unit 39#0, and an F-servo circuit (F refers hereinafter to focus) 45#0 are provided.

A tracking error signal TE-r and a focus error signal FE-r from the signal processing unit 52#0 are supplied to the recording-layer servo circuit 36#0. The recording-layer servo circuit 36#0 performs an operation for servo control based on the error signals as will be described later.

In addition, a focus error signal FE-sv generated by the signal processing unit 53#0 is supplied to the F-servo circuit 45#0, and the F-servo circuit 45#0 performs an operation for focus servo control on reference-plane laser light of the optical pickup OP#0 based on the focus error signal FE-sv.

In addition, the light-receiving signal DT-r2, which is a reflected-light detection signal of the ATS/second reproducing laser light in the optical pickup OP#0, is input from the recording-layer light-receiving unit 23-2 of the optical pickup OP#0 to the reference-plane movement control/address detection unit 39#0.

The reference-plane movement control/address detection unit 39#0 controls movement of a spot position of the reference-plane laser light on the reference plane Ref and detects address information (a reference-plane address) recorded on the reference plane Ref as will be described later, based on the above-described light-receiving signal DT-r2.

In addition, as a servo control system in the optical pickup OP#1, a recording-layer servo circuit 36#1, a reference-plane movement control/address detection unit 39#1, and an F-servo circuit 45#1 are provided.

The tracking error signal TE-r and the focus error signal FE-r from the signal processing unit 52#1 are supplied to the recording-layer servo circuit 36#1. The recording-layer servo circuit 36#1 performs an operation for servo control based on the error signals as will be described later.

In addition, the focus error signal FE-sv generated by the signal processing unit 53#1 is supplied to the F-servo circuit 45#1, and the F-servo circuit 45#1 performs an operation for focus servo control on reference-plane laser light of the optical pickup OP#1 based on the focus error signal FE-sv.

The light-receiving signal DT-r2, which is a reflected-light detection signal of the ATS/second reproducing laser light in the optical pickup OP#1, is input from the recording-layer light-receiving unit 23-2 of the optical pickup OP#1 to the reference-plane movement control/address detection unit 39#1.

The reference-plane movement control/address detection unit 39#1 controls movement of a spot position of the reference-plane laser light on the reference plane Ref and detects a reference-plane address as will be described later, based on the above-described light-receiving signal DT-r2.

The controller 44, for example, includes a microcomputer equipped with a central processing unit (CPU) and memories (storage apparatuses) such as a read only memory (ROM) and a random access memory (RAM), and, for example, controls the entire recording/reproducing apparatus 10 by executing control and processing according to a program stored in the above-described ROM and the like. For this, a control signal CNT is output to each part.

For example, the controller 44 performs a recording operation, a reproducing operation, an access (seek) operation, and servo execution control therefor according to a write command and a read command from host equipment (not illustrated).

In addition, in addition to the instruction from the host equipment, for example, the controller 44 performs a recording operation, a reproducing operation, an access (seek) operation, and servo execution control therefor, when necessary, such as reading, update, or the like of management information in the multilayer recording medium 1.

Content of a specific process to be performed by the controller 44 will be described again later.

Details of the signal processing units 51#1, 52#1, and 53#1 corresponding to the optical pickup OP#1 and the servo system will be described with reference to FIG. 27.

The signal processing units 51#0, 52#0, and 53#0 corresponding to the optical pickup OP#0 are basically substantially the same as the signal processing units 51#1, 52#1, and 53#1. In addition, an operation of the servo system of the optical pickup OP#0 is also substantially the same as that of the optical pickup OP#1. In FIG. 27, only the optical pickup OP#1 is illustrated and described.

First, configurations of the signal processing units 51#1, 52#1, and 53#1 will be described.

The signal processing unit 51#1 performs signal processing corresponding to the recording-layer laser 11-1 that emits recording/first reproducing laser light and the recording-layer light-receiving unit 23-1 that receives reflected light of the recording/first reproducing laser light.

In the signal processing unit 51#1, a recording data processing unit 65, a laser driver 66, a signal generation unit 67, and a reproduction data processing unit 68 are provided.

During recording, the recording data processing unit 65 generates a laser drive waveform as a modulation waveform corresponding to recording data according to the recording data RDT#1 supplied from the recording processing unit 31 illustrated in FIG. 26. According to the laser drive waveform, the laser driver 66 drives laser light emission by providing the laser drive signal Dr1 to the recording-layer laser 11-1 according to the laser drive waveform. That is, laser modulation light emission is executed at recording power for mark formation for the recording layer 3.

In addition, the recording data processing unit 65 performs continuous light emission control on the laser based on control of the controller 44 during reproduction. According to the laser-light emission control of the recording data processing unit 65, the laser driver 66 causes the laser to execute continuous light emission at reproducing power by providing the laser drive signal Dr1 to the recording-layer laser 11-1.

The signal generation unit 67 receives a light-receiving signal DT-r1 from the recording-layer light-receiving unit 23-1. The signal generation unit 67 generates a radio frequency (RF) signal (reproduction signal) based on the light-receiving signal DT-r1.

The reproduction processing unit 68 obtains reproduction data PBD#1-1 by performing a binarization process, a decoding process, an error correction process, a de-interleaving process, and the like on the RF signal. The reproduction data PBD#1-1 is supplied to the reproduction processing unit 35 illustrated in FIG. 26.

In addition, the reproduction data processing unit 68 decodes a recording-layer address added to the reproduction data. The recording-layer address is supplied to the controller 44.

Although the configuration and operation of the signal processing unit 51#1 of the optical pickup OP#1 have been described above, the configuration and operation of the signal processing unit 51#0 of the optical pickup OP#0 are substantially the same as described above.

The signal processing unit 52#1 performs signal processing corresponding to the recording-layer laser 11-2 that emits the ATS/second reproducing laser light and the recording-layer light-receiving unit 23-2 that receives reflected light of the ATS/second reproducing laser light.

In the signal processing unit 52#1, a laser-light emission control unit 69, a laser driver 70, a signal generation unit 71, and a reproduction data processing unit 72 are provided.

The laser-light emission control unit 69 performs laser-light emission control based on control of the controller 44 during recording and reproduction. According to the laser-light emission control of the laser-light emission control unit 69, the laser driver 70 causes the laser to execute continuous light emission at reproducing power by providing the laser drive signal Dr2 to the recording-layer laser 11-2. As understood from the above description, there is a function in which the ATS/second reproducing laser light serves as ATS laser light during recording and serves as laser light for a servo and reproduction during the reproduction.

The signal generation unit 71 receives the light-receiving signal DT-t2 from the recording-layer light-receiving unit 23-2. The signal generation unit 71 generates an RF signal (reproduction signal), a focus error signal FE-r, and a tracking error signal TE-r based on the light-receiving signal DT-r2.

During recording and reproduction, the focus error signal FE-r and the tracking error signal TE-r are supplied to the recording-layer servo circuit 36#1.

In addition, the tracking error signal TE-r is also supplied to the controller 44 for a determination of the tracking servo pull-in.

In the reproduction data processing unit 72, the reproduction data PBD#1-2 is obtained by performing a binarization process, a decoding process, an error correction process, de-interleaving, and the like on an RF signal. During reproduction, the reproduction data PBD#1-2 is supplied to the reproduction processing unit 35 illustrated in FIG. 26.

In addition, the reproduction data processing unit 72 decodes a recording-layer address added to reproduction data. The recording-layer address is supplied to the controller 44.

Although the configuration and operation of the signal processing unit 52#1 of the optical pickup OP#1 have been described above, the configuration and operation of the signal processing unit 52#0 of the optical pickup OP#0 are substantially the same as described above.

The signal processing unit 53#1 performs signal processing corresponding to the reference-plane laser 24 and the reference-plane light-receiving unit 29.

In the signal processing unit 53#1, a laser-light emission control unit 61, a laser driver 62, and an F-error signal generation unit 63 are provided.

The laser-light emission control unit 61 performs laser-light emission control based on control of the controller 44 during recording and reproduction (a reproduction time is mainly a reference-plane seek time). According to the laser-light emission control of the laser-light emission control unit 61, the laser driver 62 causes the laser to execute continuous light emission at reproduction power by providing the laser drive signal DrR to the reference-plane laser 24.

In the case of this example in which the ATS+ is adopted, the reference-plane laser light becomes laser light for error signal generation or reference-plane address detection injected into an ATS servo system during recording and becomes laser light for a seek operation or reference-plane address detection during reproduction.

The signal generation unit 63 receives the light-receiving signal DT-sv from the reference-plane light-receiving unit 29. The signal generation unit 63 generates the focus error signal FE-sv based on the light-receiving signal DT-sv. That is, the focus error signal FE-sv indicating a focus error of reference-plane laser light for the reference plane Ref (the reflective film 7) is generated.

The focus error signal FE-sv is supplied to the F-servo circuit 45#1.

The reference-plane movement control/address detection unit 39#1 controls movement of a spot position of reference-plane laser light on the reference plane Ref and detects a reference-plane address recorded on the reference plane Ref, based on the light-receiving signal DT-sv and control of the controller 44.

A tracking servo signal TS-sv is generated by the reference-plane movement control/address detection unit 39#1 as will be described later, but the tracking servo signal TS-sv is supplied to an addition unit 46 and a selector SL.

In addition, a reference-plane address (address information ADR) detected by the reference-plane movement control/address detection unit 39#1 is supplied to the controller 44.

Although the configuration and operation of the signal processing unit 53#1 of the optical pickup OP#1 have been described above, the configuration and operation of the signal processing unit 53#0 of the optical pickup OP#0 are also basically substantially the same.

Next, a configuration and operation of the servo system will be described.

Figure 27:
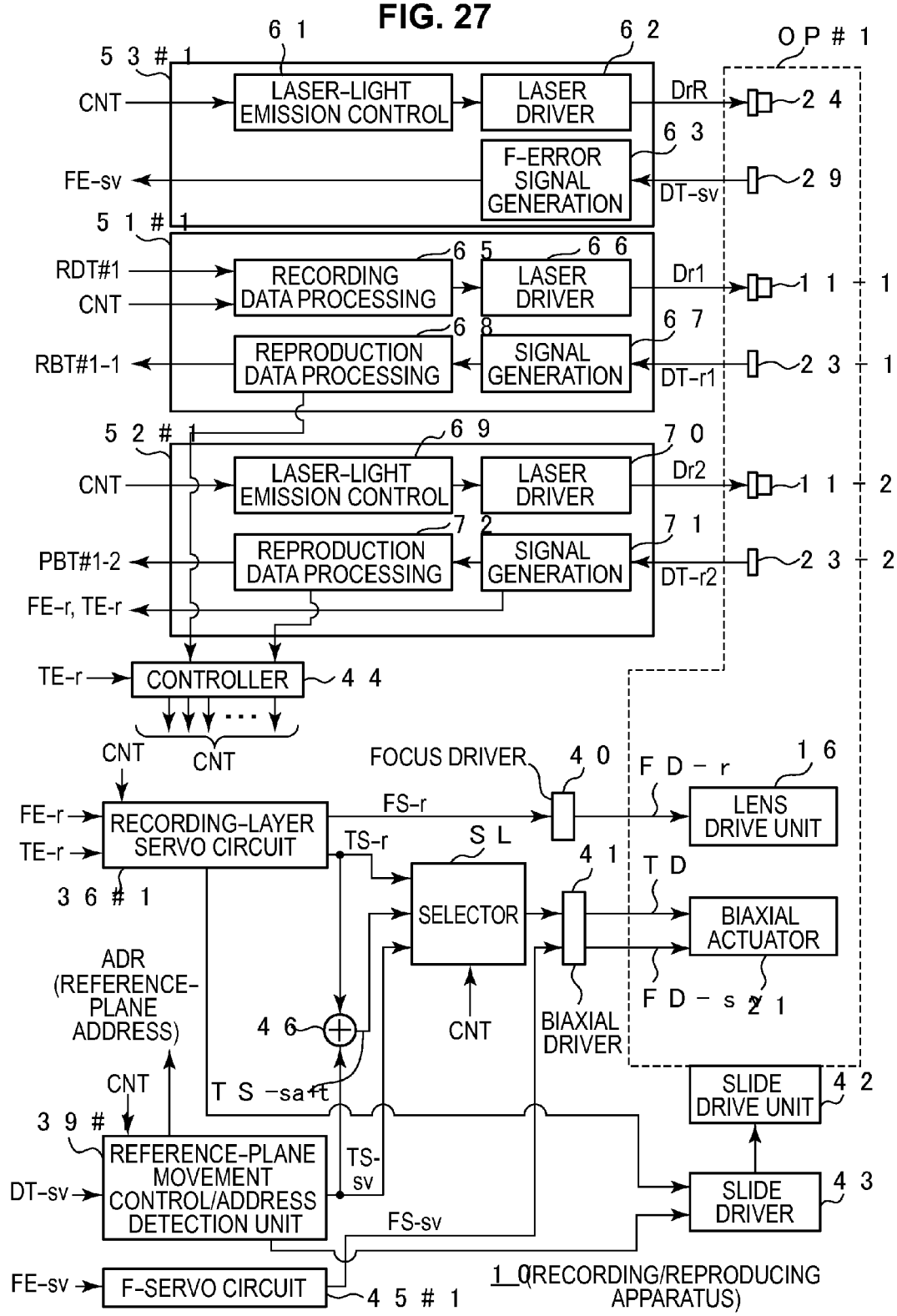
FIG. 27 is a block diagram of a signal processing system and a servo system of the recording/reproducing apparatus of an embodiment.

In FIG. 27, the recording-layer servo circuit 36#1, a focus driver 40, the reference-plane movement control/address detection unit 39#1, the F-servo circuit 45#1, a biaxial driver 41, a slide drive unit 42, a slide driver 43, the addition unit 46, and the selector SL are provided as elements for performing focusing/tracking in the optical pickup OP#1 in the recording/reproducing apparatus 10.

The focus error signal FE-r becomes a signal indicating a focus error of recording-layer laser light for the recording layer 3 serving as a recording/reproduction target. In addition, the tracking error signal TE-r becomes a signal indicating a position error in a radial direction of a spot position of recording-layer laser light for a track formed on the recording layer 3.

The recording-layer servo circuit 36#1 generates a focus servo signal FS-r and a tracking servo signal TS-r by performing a servo calculation process on the focus error signal FE-r and the tracking error signal TE-r.

Here, in this embodiment as described above, servo control by the ATS+ is performed as tracking servo control during recording on the recording layer 3.

As described above with reference to FIG. 4, in the ATS+, a lower frequency than in normal servo control should be set as a control band of an ATS control system including an ATS-side filter (that is, a cutoff frequency of a tracking servo filter provided in the recording-layer servo circuit 36#1). As described above, in this example, for example, the control band is assumed to be set to about 1 kHz.

On the other hand, in tracking servo control for causing recording-layer laser light to follow a track (spiral) of the recording layer 3, a control band (for example, about 10 kHz) should be set as in the case of normal servo control so that following for a disturbance component is possible.

From this, the recording-layer servo circuit 36#1 is configured so that the cutoff frequency can be switched in the tracking servo filter for performing the above-described servo calculation process on the tracking error signal TE-r.

The switching of the cutoff frequency is performed based on control of the controller 44.

The tracking servo signal TS-r is supplied to the addition unit 46 and the selector SL to be described later.

In addition, the focus servo signal FS-r is supplied to the focus driver 40 as illustrated in the drawing. The focus driver 40 generates a focus drive signal FD-r based on the focus servo signal FS-r, and drives the lens drive unit 16 based on the focus drive signal FD-r.

Thereby, focus servo control on the recording-layer laser light (focus servo control to be focused on the recording layer 3 by targeting the recording/first reproducing laser light and ATS/second reproducing laser light) is implemented.

In addition, the recording-layer servo circuit 36#1 is configured so that slide movement of the optical pickup OP#1 by the slide drive unit 42 can be controlled. The slide drive unit 42 holds the entire optical pickup OP#1 to be slidably driven in the tracking direction.

During reproduction, the recording-layer servo circuit 36#1 generates a spiral error signal by extracting a low-frequency component of the tracking error signal TE-r, and generates a slide servo signal based on the slide error signal. The slide drive unit 42 is driven by providing the slide servo signal to the slide driver 43, and hence slide servo control of the optical pickup OP#1 is implemented.

In addition, the recording-layer servo circuit 36#1 implements necessary slide movement of the optical pickup OP#1 by the slide drive unit 42 by providing a control signal generated according to control from the controller 44 to the slide driver 43.

In addition, according to control of the controller 44, the recording-layer servo circuit 36#1 also controls the execution of a track jump operation by causing a spot of the ATS/second reproducing laser light (further a spot of the recording/first reproducing laser light) to jump to another track by turning off the tracking servo.

In addition, in relation to a servo system of the reference plane Ref, the F-servo circuit 45#1 generates a focus servo signal FS-sv by performing a servo calculation process on a focus error signal FE-sv supplied from the F-error signal generation unit 63.

The focus servo signal FS-sv generated by the F-servo circuit 45#1 is supplied to the biaxial driver 41.

The biaxial driver 41 generates a focus drive signal FD based on the focus servo signal FS-sv, and drives a focus coil of the biaxial actuator 21 based on the focus drive signal FD. Thereby, focus servo control on reference-plane laser light (focus servo control that focuses the reference-plane laser light on the reference plane Ref) is implemented.

The reference-plane movement control/address detection unit 39#1 performs reference-plane movement control (movement control on a spot position of reference-plane laser light on the reference plane Ref) and detection of a reference-plane address (ADR) based on the light-receiving signal DT-sv.

Specifically, as the above-described reference-plane movement control, control of a seek operation on the reference plane Ref (a seek operation on reference-plane laser light) or arbitrary pitch spiral movement control described above is performed.

As understood from the above description, in the arbitrary pitch spiral movement control, generation of the P/P signal, the selector signal, and the clock CLK based on the light-receiving signal DT-sv or generation of the tracking error signal TE-sv based thereon is performed. In addition, an offset of a sawtooth wave shape as illustrated in the drawing is also applied to the tracking error signal TE-sv.

It is only necessary to adopt substantially the same configuration as disclosed in Japanese Patent Application Publication No. 2010-225237 or 2011-198425 described above for a specific configuration for implementing the arbitrary pitch spiral movement control, and description by illustration is omitted here.

In addition, as the above-described seek operation control, control for executing slide movement of the optical pickup OP#1 by providing a control signal to the slide driver 43 or executing a track jump operation for causing a spot of reference-plane laser light to jump to another track (serving as a pit string in this case) or the like is performed based on control from the controller 44.

The reference-plane movement control/address detection unit 39#1 generates the tracking servo signal TS-sv for causing a beam spot of the reference-plane laser light to follow a predetermined pit string (one of A to F) on the reference plane Ref by performing a servo calculation process on the tracking error signal TE-sv.

As understood from the above description of FIG. 4, a cutoff frequency of a tracking servo filter provided in the reference-plane movement control/address detection unit 39#1 is set to a frequency (about 10 kHz in this case) equivalent to that of normal servo control that makes following for disturbance or the like possible.

It is only necessary to detect a reference-plane address according to the technique described above with reference to FIGS. 17A, 17B, and 17C.

It is only necessary to adopt substantially the same configuration as disclosed in Japanese Patent Application Publication No. 2010-225237 or 2011-198425 described above for a configuration for detecting the reference-plane address, and description by illustration is omitted here.

The reference-plane address (ADR) detected by the reference-plane movement control/address detection unit 39#1 is supplied to the controller 44.

In addition, the tracking servo signal TS-sv generated by the reference-plane movement control/address detection unit 39#1 is supplied to the addition unit 46 and the selector SL.

Here, an output signal by the recording-layer servo circuit 36#1 and an output signal by the reference-plane movement control/address detection unit 39#1 are input to the selector SL. Further, a tracking servo signal TS-ats+ for implementing the ATS+ obtained by adding the tracking servo signal TS-r from the recording-layer servo circuit 36#1 and the tracking servo signal TS-sv from the reference-plane movement control/address detection unit 39#1 is also input to the selector SL.

The selector SL selects one of the input signals of the above-described three systems based on control from the controller 44, and outputs the selected input signal.

An output signal by the selector SL is supplied to the biaxial driver 41.

The biaxial driver 41 generates a tracking drive signal TS based on the output signal by the selector SL, and drives the tracking coil of the biaxial actuator 21 based on the tracking drive signal TD.

Here, as understood from the above description, a form of position control to be performed in correspondence with recording/reproducing to be performed on the multilayer recording medium 1 can be divided into four main classes.

Reference-Plane Seek Time
→Slide Movement Control or Track Jump (Pit String Jump) Control on Reference Plane Ref
Recording Time (During Recording: However, Recording of ATS Guide Track Is Excluded)
→ATS+
Recording-Layer Seek Time (When Seek Is Performed Using Recording-Layer Laser Light After Reference-Plane Seek)
→Track Jump Control on at Least Recording Layer 3
Reproduction Time (During Reproduction)
→Tracking Control by Single Tracking Servo Signal TS-r (Servo Control for Causing Recording-Layer Laser Light to Follow Track on Recording Layer 3)

The selector SL is provided to switch an output signal for the biaxial driver 41 according to these four states.

Specifically, the selector SL is configured to select an input signal (the tracking servo signal TS-ats+) from the addition unit 46 so that the ATS+ is executed based on the control from the controller 44 during recording.

In addition, during reproduction, the input signal (the tracking servo signal TS-r) from the recording-layer servo circuit 36#1 is selected based on the control of the controller 44.

In addition, during the reference-plane seek, the input signal from the reference-plane movement control/address detection unit 39#1 (serving as the track jump signal or the like) is selected based on the control from the controller 44.

Further, during the recording-layer seek, an input signal (serving as the track jump signal or the like) from the recording-layer servo circuit 36#1 is selected based on an instruction from the controller 44.

The above-described switching control is performed, so that position control by a state corresponding to each case of the above-described reference-plane seek time, recording time, and recording-layer seek time is implemented.

The controller 44 controls the above-described operation of the servo system as follows.

For example, the controller 44 performs seek operation control (reference-plane seek operation control) that causes a spot position of the reference-plane laser light to be moved to a predetermined reference-plane address by generating an instruction for the reference-plane movement control/address detection unit 39#1 based on a reference-plane address (ADR) input from the reference-plane movement control/address detection unit 39#1.

In addition, the controller 44 performs seek operation control (recording-layer seek operation control) that causes a spot position of the ATS/second reproducing laser light to be moved to a predetermined recording-layer address by generating an instruction for the recording-layer servo circuit 36#1 based on a recording-layer address input from the reproduction data processing unit 72.

As understood from the above description, the controller 44 causes the selector SL to select the input signal from the reference-plane movement control/address detection unit 39#1 during the above-described reference-plane seek operation control, and causes the selector SL to select the input signal from the recording-layer servo circuit 36#1 during the above-described recording-layer seek operation control.

In addition, the controller 44 causes the selector SL to select the tracking servo signal TS-ats+ from the addition unit 41 so that tracking servo control by the ATS+ is executed in correspondence with the recording time.

In addition, the controller 44 causes the selector SL to select the input signal from the recording-layer servo circuit 36#1 so that tracking servo control by the single tracking servo signal TS-r is executed in correspondence with the reproduction time.

At this time, the controller 44 also instructs the recording-layer servo circuit 36#1 to perform switching so that a servo control band is switched by the recording-layer servo circuit 36#1 in the recording time and the reproduction time.

Here, at the initiation of recording on the recording layer 3, when it is necessary to form a guide track as illustrated in FIGS. 7 to 10 and the like described above, the ATS+ is applied after the formation of the guide track after the reference-plane seek has been performed.

When it is necessary to form the guide track after the reference-plane seek as described above, the controller 44 causes recording of a spiral (recording of dummy data) at a predetermined pitch to be started by generating an instruction for the reference-plane movement control/address detection unit 39#1 and the recording processing unit 31 (FIG. 26) according to the completion of the reference-plane seek.

A procedure of a specific process to be performed to implement a recording technique of this embodiment including the formation of the guide track will be described again later.

In addition, when it is unnecessary to form the guide track at the initiation of recording (that is, when a continued part of an existing spiral is recorded), the controller 44 instructs the selector SL to perform switching from a previous selection state of the tracking servo signal TS-sv to the selection state of the tracking servo signal TS-ats+ so that servo switching to ATS+ is performed according to the completion of the reference-plane seek. After the pull-in of the tracking servo has been performed according to the above-described switching, if necessary, the recording-layer seek operation is performed by generating an instruction for the recording-layer servo circuit 36#1, and recording is started from a predetermined recording start position (continued position).

In addition, at the initiation of reproduction, the controller 44 instructs the selector SL to perform switching from a previous selection state of the tracking servo signal TS-sv to the selection state of the tracking servo signal TS-r so that switching to servo control by the single tracking servo signal TS-r is performed according to the completion of the reference-plane seek. After the pull-in of the tracking servo has been performed according to the above-described switching, if necessary, the recording-layer seek operation is performed by generating an instruction for the recording-layer servo circuit 36#1, and recording is started from a predetermined recording start position.

A procedure of a specific process to be performed in correspondence with the reproduction start time in the case of this example will be described again later.

Here, a configuration and operation of the servo system described above are also basically substantially the same as those of the optical pickup OP#0.

As understood from the above description, because an ATS spot Sats (ATS/second reproducing laser light) traces another recording spiral together in the optical pickup OP#0 and the optical pickup OP#1 during recording, verification can be performed using its reflected light.

This verification can be performed using RF signals generated by the signal generation units 71 of both the signal processing units 52#0 and 52#1 during recording.

7. Processing Procedure

Figure 28:
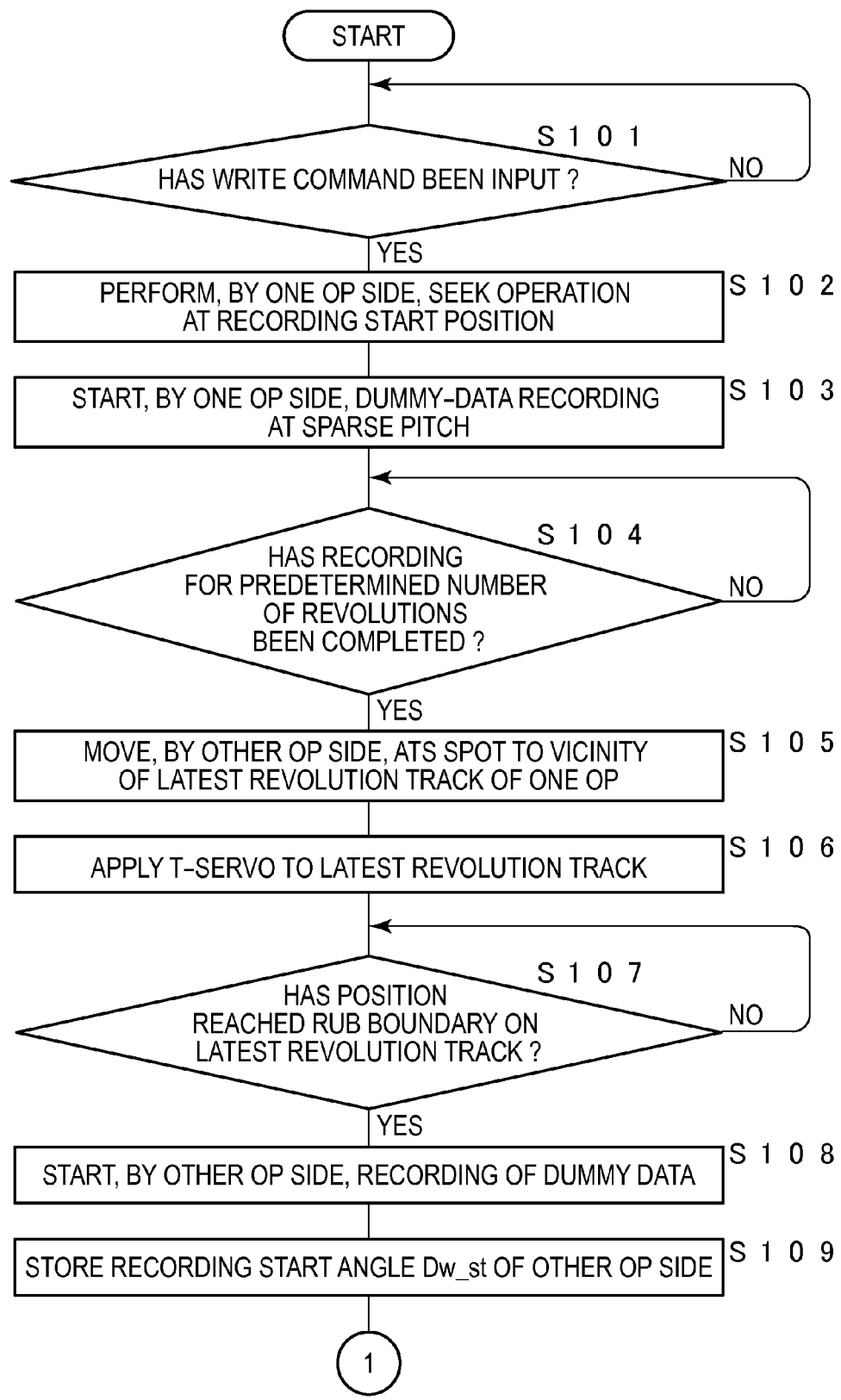
FIG. 28 is a flowchart illustrating a procedure of a specific process to be executed to implement a recording technique as an embodiment.
Figure 29:
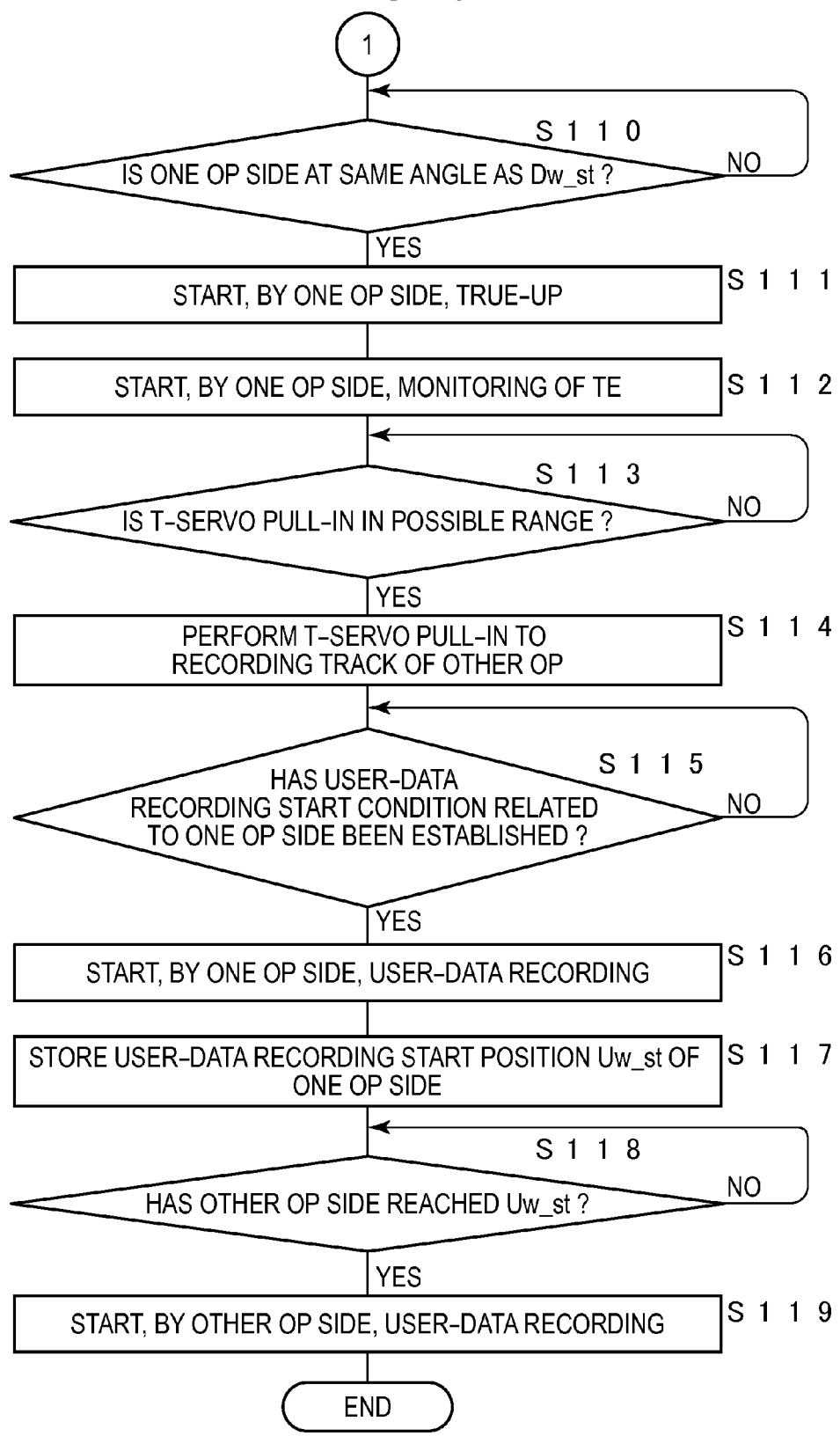
FIG. 29 is a flowchart illustrating a procedure of a specific process to be executed to implement a recording technique as an embodiment.

FIGS. 28 and 29 are a flowchart illustrating a procedure of a specific process to be executed to implement a recording technique of the above-described embodiment.

For the processing procedure illustrated in FIGS. 28 and 29, the controller 44 illustrated in FIG. 26 or 27 described above, for example, is executed according to a program stored in a memory such as an embedded ROM.

In FIG. 28, first, in step S101, input of a write command is awaited. That is, for example, input of the write command from the host equipment or the like described above is awaited.

When the write command has been input in step S101, the process proceeds to step S102, and one optical pickup OP performs a seek operation at a recording start position.

That is, in this example, a reference-plane seek is executed using a specified recording start address on the reference plane Ref based on the write command as a target address by performing control for the reference-plane movement control/address detection unit 39#1 provided in correspondence with the optical pickup OP#1.

After the reference-plane seek has been completed in step S102, the one optical pickup OP starts recording of dummy data at a sparse pitch in step S103. That is, after the completion of the reference-plane seek in step S102, the reference-plane movement control/address detection unit 39#1 and the recording processing unit 31 are controlled so that dummy-data recording by a recording spot Swr#1 (recording/first reproducing laser light) of the optical pickup OP#1 is started under a reference-plane servo state (the arbitrary pitch spiral movement control state described above).

As understood from the above description of <1>, at this time, a spiral pitch (track pitch) is set to be sufficiently greater than a track pitch TP set on the recording layer 3 for preventing intersection of a track or the like associated with a spot position deviation. The pitch setting can be implemented by indicating a slope of the above-described sawtooth wave offset applied by the reference-plane movement control/address detection unit 39#1 to the tracking error signal TE-sv.

After the dummy-data recording (corresponding to the above-described guide-track recording) at the sparse pitch has been started in step S103, completion of recording of a predetermined number of revolutions is awaited in step S104.

As understood from the above description, guide tracks are recorded to enable the other optical pickup OP to perform the pull-in of the ATS+. It is desirable that the other optical pickup OP easily find the guide tracks. Thus, the recording of the guide tracks started in step S103 is performed for a predetermined number of revolutions as described above.

When the recording of the guide tracks has been completed for a predetermined number of revolutions in step S104, the other optical pickup OP performs a process of moving its ATS spot Sats to the vicinity of a latest revolution track of the one optical pickup OP in step S105.

Here, because the guide tracks are recorded under reference-plane servo control as described above, a reference-plane address (ADR: at least radial position information) can be obtained while the guide tracks are recorded. The controller 44 can specify a latest revolution position (a radial position) by referring to the reference-plane address and cause the optical pickup OP#0 to perform a seek using the specified radial position (reference-plane address) as a target address. Specifically, the reference-plane seek using the specified reference-plane address as the target address can be executed by controlling the reference-plane movement control/address detection unit 39#0.

Thereby, a second ATS spot Sats#0 formed by the optical pickup OP#0 can be positioned in the vicinity of the latest revolution position of the guide track.

After the movement process has been executed in step S105, a T-servo (T is an abbreviation for "track") is applied on the latest revolution track in step S106. That is, a tracking servo by the second ATS spot Sats#0 of the optical pickup OP#0 is applied by targeting the latest revolution track.

Here, as a specific technique for a state in which the tracking servo by the second ATS servo Sats#0 has been applied to the latest revolution track of guide tracks, for example, as exemplified above, a technique of monitoring an amplitude of a tracking error signal TE-r after the tracking servo control state (a tracking servo control state based on reflected light of the servo laser light) of the objective lens 20 has been released in the optical pickup OP#0, and performing the pull-in of the tracking servo by detecting an amplitude change corresponding to when the guide track crosses the second ATS spot Sats#0 under the influence of disc eccentricity or the like can be provided.

In this case, the controller 44 starts monitoring of the amplitude of the tracking error signal TE-r input from the signal generation unit 71 within the signal processing unit 52#0 according to the completion of the reference-plane seek executed in step S105. As the result of the monitoring, when it is determined that the amplitude of the tracking error signal TE-r has been obtained in a predetermined form in which the pull-in of the tracking servo is regarded to be possible (for example, a zero-cross or the like), the selector SL is caused to select a tracking error signal TS-ats+.

Thereby, the optical pickup OP#0 can be set to an ATS+ control state.

As described above, when the above-described pull-in has not been performed on the latest revolution track, the track jump to the latest revolution track is performed.

After the T-servo for the latest revolution track has been applied in step S106, arrival of a position at an RUB boundary on the latest revolution track is awaited in step S107.

That is, it is determined whether or not the position has reached the RUB boundary on the latest revolution of the guide track until the positive result by the determination is obtained by referring to a recording-layer address (synchronization signal) obtained from the reproduction data processing unit 72 within the signal processing unit 52#0 based on reflected light of ATS/second reproducing laser light.

When the position has reached the RUB boundary on the latest revolution track in step S107, recording of dummy data is started in the other optical pickup OP in step S108.

That is, the recording processing unit 31 is controlled so that dummy-data recording by recording/first reproducing laser light is started in the optical pickup OP#0.

After the dummy-data recording of the other optical pickup OP has been started in step S108, a recording start angle Dw_st of the other optical pickup OP is stored in step S109. That is, an angle (rotation angle) at which the dummy-data recording has been started in step S108 is stored as the recording start angle Dw_st.

Here, information of the recording start angle of the dummy data can be specified from a reference-plane address (including radial position information and rotation angle information as described above) detected by the reference-plane movement control/address detection unit 39#0 under control by the ATS+.

After the process of step S109 has been executed, the process proceeds to step S110 illustrated in FIG. 29.

In FIG. 29, in step S110, arrival of the optical pickup OP at the same angle as the recording start angle Dw_st is awaited. That is, a time at which the rotation angle specified from the reference-plane address detected by the reference-plane movement control/address detection unit 39#1 is the same angle as the recording start angle Dw_st is awaited.

When the angle has reached the same angle as the recording start angle Dw_st in step S110, the true-up is started by the one optical pickup OP in step S111.

That is, in order to forcibly move the objective lens 20 of the optical pickup OP#1 to a second spiral side (in other words, in order to narrow a pitch of a spiral drawn by the reference-plane servo), an instruction for causing the reference-plane movement control/address detection unit 39#1 to change the slope of a sawtooth wave offset applied to the tracking error signal TE-sv is generated.

After the true-up in the above-described step S111 has been started, monitoring of the tracking error signal TE of the one optical pickup OP is started in step S112. That is, the monitoring of the tracking signal TE-r obtained by the signal generation unit 71 within the signal processing unit 52#1 is started.

In the subsequent step S113, arrival of the T-servo pull-in in a possible range is awaited. That is, it is determined whether or not the amplitude of the tracking error signal TE-r of which the monitoring has been started in step S112 has been obtained (for example, the amplitude is greater than or equal to a predetermined value) in a predetermined form in which the tracking servo is regarded to be in the pull-in range until the positive result by the determination is obtained.

When the T-servo pull-in is in the possible range in step S113, the T-servo pull-in for a recording track of the other optical pickup OP is executed in step S114. That is, switching control is performed to cause the selector SL provided in correspondence with the optical pickup OP#1 to select the tracking error signal TS-ats+.

Thereby, even in the optical pickup OP#1, the ATS+ control state is possible. That is, thereafter, a spiral set of first and second spirals formed at a constant pitch can be formed at a constant pitch, and mutually recorded data can be verified without mutually interrupting recording.

After the T-servo pull-in of the one optical pickup OP has been executed in step S114, establishment of a user-data recording start condition related to the one optical pickup OP is awaited in step S115.

As described above with reference to <6>, in the case of this example, the user-data recording start condition of the one optical pickup OP is that a distance X from the start of writing be greater than or equal to a maximum spot deviation amount D_max. As described above, this is to prevent a spot of recording-layer laser light when a reference-plane seek during reproduction has been performed from being positioned in a non-formation region of a track.

The distance X from the start of writing of the one optical pickup OP can be appropriately calculated from the reference-plane address serving as a seek target in the above-described step S102 and the reference-plane address detected by the reference-plane movement control/address detection unit 39#1 after the pull-in of the ATS+ has been performed in step S114.

When the distance X from the start of writing of the one optical pickup OP is greater than or equal to the maximum spot deviation amount D_max determined in advance and the above-described recording start condition has been established in step S115, user-data recording of the one optical pickup OP is started in step S116. That is, in step S116, the user-data recording of the one optical pickup OP is started. That is, by performing control for the recording processing unit 31, user-data recording by the recording/first reproducing laser light of the optical pickup OP#1 is started.

As described above, the signal processing unit 31 divides the user data into first spiral recording data and second spiral recording data in units of RUBs. In the above-described step S116, recording of the first spiral recording data is started. The second spiral recording data is accumulated by the recording processing unit 31 until its recording is started in the later step S119.

After a recording start process has been executed in step S116, a user-data recording start position Uw_st of the one optical pickup OP is stored in step S117. That is, information of a recording-layer address added when the recording has been started in step S116 is stored.

In the subsequent step S118, arrival of the other optical pickup OP at the user-data recording position Uw_st is awaited. That is, it is determined whether or not the spot position of the optical pickup OP#0 has reached the user-data recording start position Uw_st based on the recording-layer address added to the first spiral detected by the reproduction data processing unit 72 within the signal processing unit 52#0, and the positive result by the determination is awaited to be obtained.

When the spot position has reached the user-data recording start position Uw_st in step S118, recording of the user data by the other optical pickup OP is started in step S119. That is, by performing control for the recording processing unit 31, recording of the second spiral recording data by the recording/first reproducing laser light of the optical pickup OP#0 is started.

Thereby, it is possible to align a recording start position of user data in the first and second spirals. As a result, continuous data can be obtained by reading the spiral set of the first and second spirals using two beams during reproduction.

After execution of the above-described process of step S119, a series of processes illustrated in FIGS. 28 and 29 ends.

Figure 30:
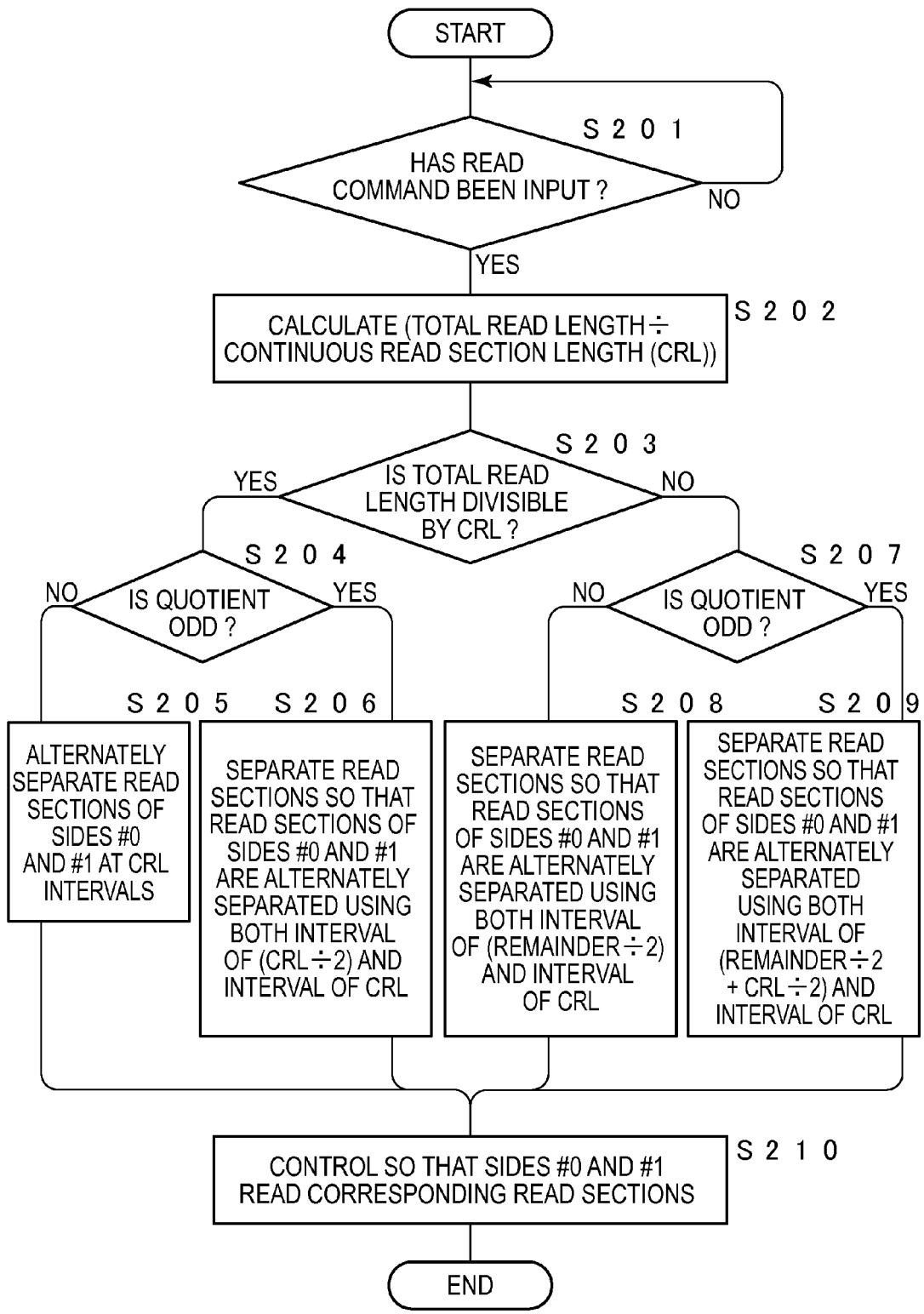
FIG. 30 is a flowchart illustrating a procedure of a specific process to be executed to implement a reproducing technique as an embodiment.

FIG. 30 is a flowchart illustrating a procedure of a specific process to be executed to implement a reproducing technique of the above-described embodiment.

Even for the processing procedure illustrated in FIG. 30, the controller 44 illustrated in FIG. 26 or 27 described above, for example, is executed according to a program stored in a memory such as an embedded ROM.

In FIG. 30, in step S201, input of a read command is awaited. That is, for example, input of the read command from the host equipment or the like described above is awaited.

When the read command has been input in step S201, the process proceeds to step S202 in which (Total Read Length÷Continuous Read Section Length (CRL)) is calculated. That is, a total read length indicated by the above-described read command is divided by a preset continuous read section length (CRL).

In the subsequent step S203, it is determined whether or not the calculation result in step S202 indicates that the total read length is divisible by CRL.

When the positive result has been obtained in step S203 because the calculation result in step S202 indicates that the total read length is divisible by CRL, the process proceeds to step S204.

In step S204, it is determined whether or not a quotient calculated in step S202 is odd.

When the negative result indicating that the quotient is not odd has been obtained in step S204, the process proceeds to step S205 in which read sections of sides #0 and #1 are alternately separated at the interval of the continuous read section length (CRL). In other words, in this case, the read sections of sides #0 and #1 are alternately set for every continuous read section length (CRL).

In addition, when the positive result indicating that the quotient is odd has been obtained in step S204, the process proceeds to step S206 in which the read sections of sides #0 and #1 are separated to be alternately arranged using both an interval of (Continuous Read Section Length (CRL)÷2) and an interval of the continuous read section length (CRL). Although the interval of (Continuous Read Section Length (CRL)÷2) is arranged in a beginning part and an end part in the entire read section in the above-described example of FIG. 22A, their arrangements are not limited to the beginning part and the end part as long as a condition that the read sections of sides #0 and #1 be alternately arranged is satisfied.

In addition, when the negative result has been obtained in the above-described step S203 because the calculation result of step S202 indicates that the total read length is indivisible by CRL, the process proceeds to step S207 in which it is determined whether or not the quotient is odd.

When the negative result indicating that the quotient is not odd has been obtained in step S207, the process proceeds to S208 in which the read sections are separated so that the read sections of sides #0 and #1 are alternately arranged using both an interval of (Remainder÷2) and an interval of the continuous read section length (CRL). In this case, in the read sections of sides #0 and #1 with a section length of (Remainder÷2), their arrangement positions are not limited to the beginning part and the end part in the entire read section as in the interval of (Continuous Read Section Length (CRL)÷2) in the above-described step S206.

In addition, when the positive result indicating that the quotient is odd has been obtained in step S208, the process proceeds to step S209 in which the read sections are separated so that the read sections of sides #0 and #1 are alternately arranged using both an interval of (Remainder÷2+Continuous Read Section Length (CRL)÷2) and an interval of the continuous read section length (CRL).

Even in this case, an arrangement position of the above-described interval of (Remainder÷2+Continuous Read Section Length (CRL)÷2) is not limited to the beginning part and the end part in the entire read section.

After any process of the above-described steps S205, S206, S208, and S209 has been executed, the process proceeds to step S210 in which control is performed so that a read section corresponding to each of sides #0 and #1 is read.

That is, in relation to a read section (serving as a read section of side #0) set for reading to be performed by the optical pickup OP#0 and a read section (serving as a read section of side #1) set for reading to be performed by the optical pickup OP#1, reference-plane seek operation control or tracking-servo switching control (switching from the tracking servo based on reflected light of the reference-plane laser light to the tracking servo based on the single tracking servo signal TS-r) and recording-layer seek operation control are performed so that the read section of side #0 is read using two beams of the optical pickup OP#0 and the read section of side #1 is read using two beams of the optical pickup OP#1.

Here, as understood from the above description, in this embodiment, in relation to the seek operation to be performed in step S210, it is possible to access a position at which a reproducing beam is placed in each spiral of the spiral set serving as a read target by executing a seek operation using a spiral on the near side of the spiral set serving as the read target, and consequently ineffective reading as illustrated in FIG. 23 described above is prevented.

After the execution of the above-described process of step S210, a series of processes illustrated in the drawing ends.

8. Modified Example

Although the embodiment of the present application has been described above, the present application is not limited to the specific examples described above For example, although an example of a configuration in which two beams for forming a recording spot Swr and an ATS spot Sats are radiated by separate optical pickups OP has been described above, it is not necessary to radiate the two beams for forming the recording spot Swr and the ATS spot Sats by the separate optical pickups OP when the recording technique in accordance with the present application is implemented.

Figure 31:
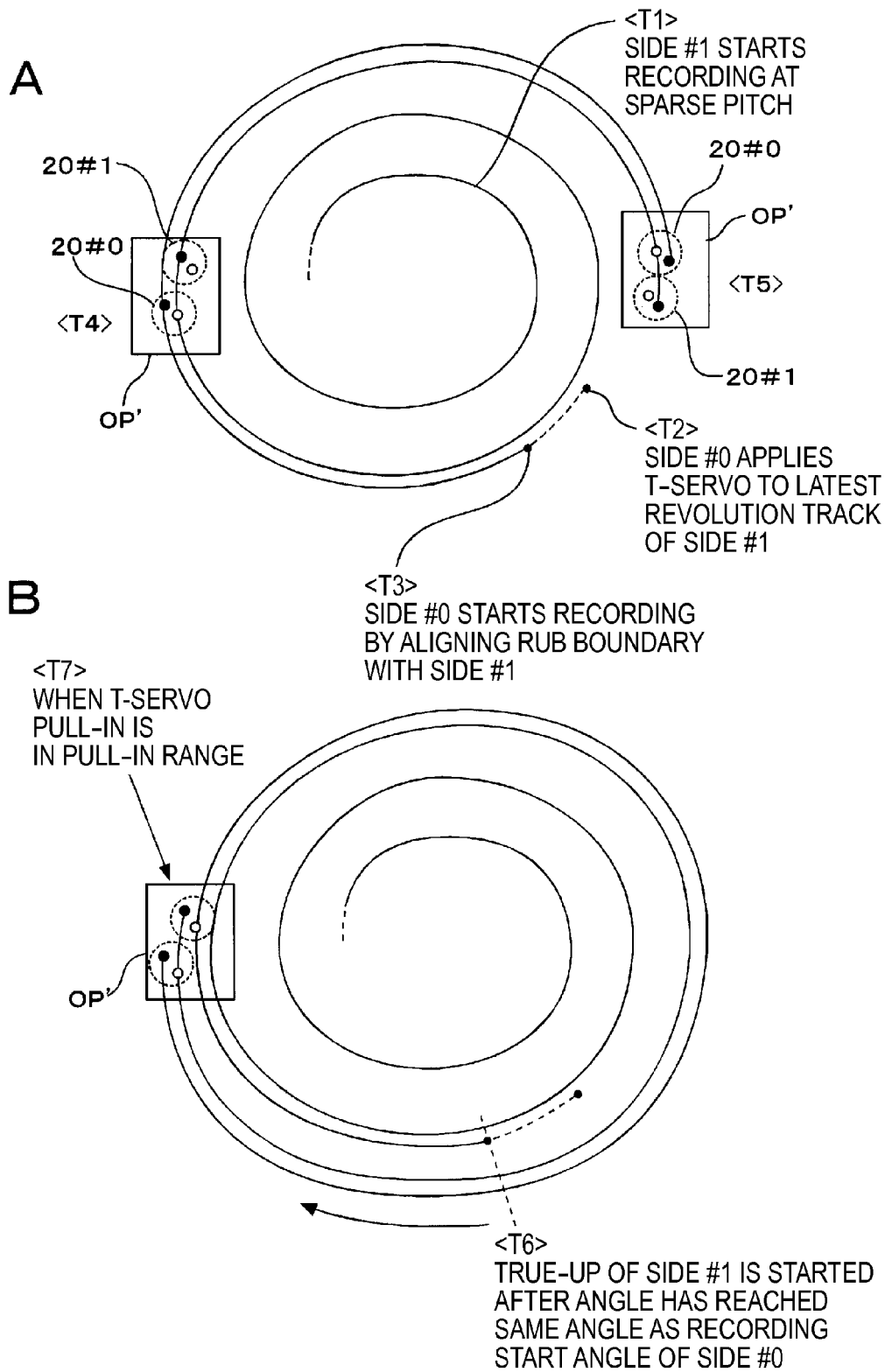
FIGS. 31A and 31B are explanatory diagrams of a technique for implementing a recording technique of the present application according to one optical pickup.

FIGS. 31A and 31B are explanatory diagrams of a technique of implementing the recording technique of the present application according to one optical pickup OP'.

First, as the assumption, two of an objective lens 20#0 and an objective lens 20#1 are mounted as the objective lenses 20 on the optical pickup OP'. Two sets of recording spots Swr and ATS spots Sats are formed on the recording layer 3 by radiating sets of recording/first reproducing laser light and ATS/second reproducing laser light using the objective lenses.

The objective lens 20#0 and the objective lens 20#1 are configured so that independent position control is possible.

In this case, first, as indicated by <T1> of FIG. 31A, for example, side #1 starts recording (dummy-data recording) at a sparse pitch. After the recording at the sparse pitch has been performed for a predetermined number of revolutions (a number of revolutions in a degree in which finding by side #0 is facilitated), side #0 applies the tracking servo to the latest revolution track of side #1 as indicated by <T2> in the drawing.

Thereafter, as indicated by <T3>, side #0 starts recording (dummy-data recording) by aligning an RUB boundary with side #1.

At this time, as can be seen by referring to the state of the optical pickup OP' of <T4> and <5> in the drawing, even in this case, side #0 traces a recording track of side #1, and verification of recording data of side #1 is possible.

After dummy-data recording of <T3> has been started, the true-up of side #1 is started after the angle has reached a recording start angle of side #0 as indicated by <T6> of FIG. 31B. Thereafter, as indicated by <T7>, when the pull-in is in a pull-in range, side #1 executes the T-servo pull-in on a recording track of side #0.

As a result, a state in which the ATSs are mutually applied on side #0 and side #1 is implemented.

As described above, when the recording technique in accordance with the present application is implemented, it is not necessary to radiate the two beams for forming the recording spot Swr and the ATS spot Sats by the separate optical pickups OP.

Specifically, it is only necessary to radiate beams for forming the recording spot Swr and the ATS spot Sats by two or more objective lenses, the positions of which are independently controlled.

In addition, although an example in which the number of spirals to be simultaneously formed is 2 and the recording rate is improved twofold has been described above, the number of spirals to be simultaneously formed can be three or more in the present application.

Figure 32:
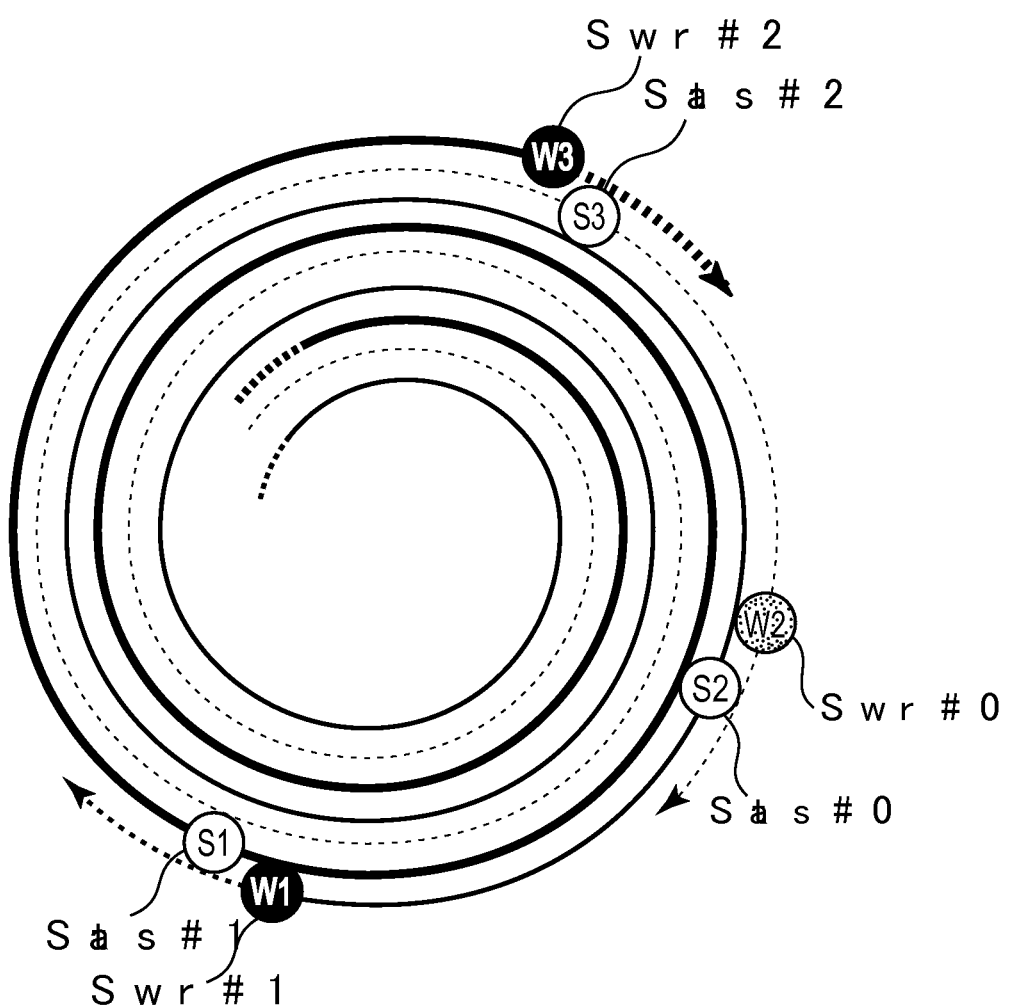
FIG. 32 is a diagram illustrating an example of a trace state of each recording track when threefold spirals are simultaneously recorded.

FIG. 32 is a diagram illustrating an example of a trace state of each recording track when threefold spirals are simultaneously recorded.

First, when the threefold spirals are simultaneously recorded, three sets of recording spots Swr and ATS spots Sats are used. These sets are a set of a first recording spot Swr#1 and a first ATS spot Sats#1, a set of a second recording spot Swr#0 and a second ATS spot Sats#0, and a set of a third recording spot Swr#2 and a third ATS spot Sats#2 as illustrated in the drawing.

When the threefold spirals have been simultaneously recorded, as illustrated in the drawing, user data is recorded by the first recording spot Swr#1, the second recording spot Swr#0, and the third recording spot Swr#2 so that the second ATS spot Sats#0 traces a recording track by the first recording spot Swr#1, the third ATS spot Sats#2 traces a recording track by the second recording spot Swr#0, and the first ATS spot Sats#1 traces a recording track by the third recording spot Swr#2 while the tracking servo of each ATS spot Sats is applied.

In other words, in a state in which the tracking servo has been applied to the recording tracks by the recording spots Swr of the separate sets without redundancy according to the ATS spots Sats of all sets #1, #0, and #2, user data is recorded by the recording spots Swr.

Thereby, three spirals having a constant pitch can be formed at a constant pitch, and a state in which verification is possible without interrupting recording for all spirals to be formed can be obtained.

Here, a writing technique for obtaining the state illustrated in FIG. 32 is specifically as follows.

That is, first, set #1 forms a guide track at a sparse pitch.

The T-servo is applied to the latest revolution track of the guide track recorded by set #1, and set #0 starts recording.

Then, the T-servo is applied to the latest revolution track of the guide track recorded by set #0, and set #2 starts recording.

So far, sets #0 and #2 are in the ATS control state.

Thereafter, set #1 performs the true-up to the side of a recording track by set #2. When the pull-in for the recording track by set #2 is in a possible range, set #1 performs the T-servo pull-in.

Thereby, it is possible to obtain a recording state as illustrated in FIG. 32, that is, a state in which the tracking servo has been applied to the recording track by the recording spots Swr of the separate sets according the ATS spots Sats of all sets #1, #0, and #2.

In addition, when the number of simultaneous recording spirals is further increased from three to four or more, it is only necessary that sets of beams for the increased number sequentially start recording by applying the ATS to the recording track by a set with which recording has been started by immediately previously applying the ATS until a pickup OP (an objective lens) responsible for recording of the guide track starts the true-up.

Specifically, when fourfold or more spirals have been simultaneously recorded, it is only necessary to take the following procedure when one set is a first set, another set is a second set, and still another set is an $m^{th}$ set among four or more sets of recording/first reproducing laser light and ATS/second reproducing laser light radiated to form the fourfold or more spirals.

First, recording of a guide track at a sparse pitch is started by the first set.

Thereafter, according to the second set, the tracking servo by the ATS/second reproducing laser light is applied to the latest revolution track of the above-described guide tracks and then recording by the recording/first reproducing laser light is started.

For sets other than the first, second, and $m^{th}$ sets, sequentially, according to the ATS/second reproducing laser light, the tracking servo is applied to the latest revolution track of recording tracks by a set with which recording has been started by applying the tracking servo to the latest revolution track of immediately previously recorded tracks and then recording by the recording/first reproducing laser light is started.

After all the sets other than the first, second, and $m^{th}$ sets have started recording, according to the above-described $m^{th}$ set, the tracking servo by the ATS/second reproducing laser light is applied to the latest revolution track of recording tracks by a set with which recording has been started by applying the tracking servo to the latest revolution track of immediately previously recorded tracks and then recording by the recording/first reproducing laser light is started.

After the start of the recording by the $m^{th}$ set, the pull-in of the tracking servo by the ATS/second reproducing laser light is executed by targeting the tracking track of the $m^{th}$ set after the beam spot of the first set has been trued up to the recording track side by the above-described $m^{th}$ set by moving the objective lens 20 of the above-described first set to a side reverse to a radial direction in which the recording progresses (that is, narrowing the pitch of the guide track).

By taking the above-described procedure, when fourfold or more spirals are recorded, it is possible to obtain a state in which the tracking servo has been applied to recording tracks by recording beams of separate sets using servo beams of all the sets without redundancy. In other words, it is possible to obtain a state in which one servo beam necessarily traces each spiral for all spirals to be simultaneously recorded.

If the fourfold spirals are formed using the first set, the second set, the third set, and the fourth set (corresponding to the $m^{th}$ set), when the first set reaches a recording start position of the second set before the tracking servo for the fourth set is applied to the latest recording track of the third set, then a state in which another recording track is formed on an outside (toward a radial direction in which recording progresses) of the latest recording track of the third set is obtained. In this case, there is a problem in that it is difficult to reliably apply the tracking servo for the fourth set to the latest recording track of the third set. Before the first set reaches the recording start position of the second set, it is desirable to end the application of the tracking servo to the latest revolution track of recording tracks by a set with which recording has been started by applying the tracking servo to the latest revolution track of the immediately previously recorded tracks for all the second to $m^{th}$ sets.

Here, even when threefold or more spirals are simultaneously recorded, as in the case of simultaneous recording of twofold spirals described above, recording data is divided for every constant length (for example, every RUB) so that continuous reproduction using a plurality of beams after the recording is possible, and each division data obtained by the division is recorded at an adjacent position on the recording layer 3 according to each recording beam.

In addition, when threefold or more spirals are simultaneously recorded, simultaneous reproduction is performed using beams, the number of which is the same as the number of simultaneously recorded spirals.

Even when simultaneous reproduction is performed for threefold or more spirals using beams, the number of which is the same as the number of simultaneously recorded spirals as described above, a seek operation is performed by targeting a position at which one of all reproducing beams is placed on one spiral corresponding to a spiral set on which data serving as a reproduction target has been recorded in access to a reproduction start position, and the occurrence of an ineffective read part is prevented.

In addition, although the spiral pitch is assumed not to exceed the optical limit in the above description, the spiral pitch can be set to exceed the optical limit (optical cutoff) for high-density recording.

However, in this case, because it is difficult to appropriately reproduce recording data by targeting only data read from a spiral set, a cross-talk cancelation process is also used, for example, as disclosed in Japanese Patent Nos. 3225611, 2601174, and 4184585 and Japanese Patent Application Publication No. 2008-108325. Specifically, appropriate data reproduction is implemented by removing a cross-talk component from a read signal serving as a reproduction target using a read signal of a track adjacent to a track serving as the reproduction target.

When the execution of the above-described cross-talk cancelation process is assumed, a seek target should be changed because it is difficult to efficiently read all read signals necessary for reproduction if the seek operation during reproduction as illustrated in FIG. 24 described above is performed.

Figure 33:
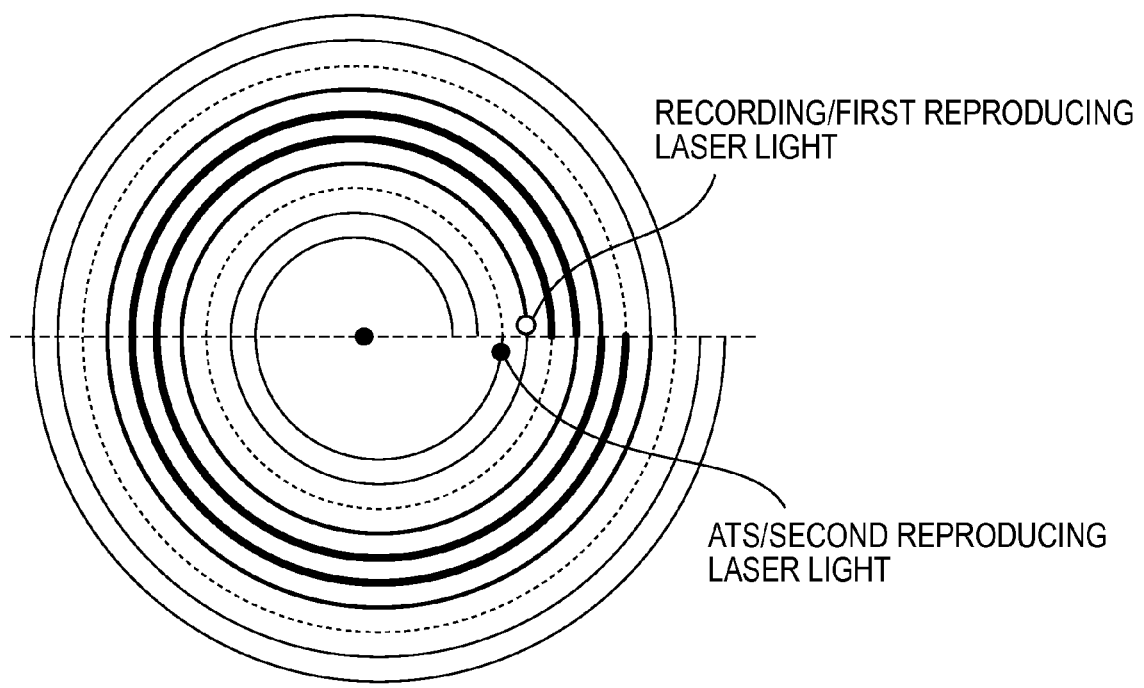
FIG. 33 is a diagram illustrating a form in which a seek operation is performed using a track before one track in a spiral set of a reproduction target as a target position based on a preceding beam.
Figure 34:
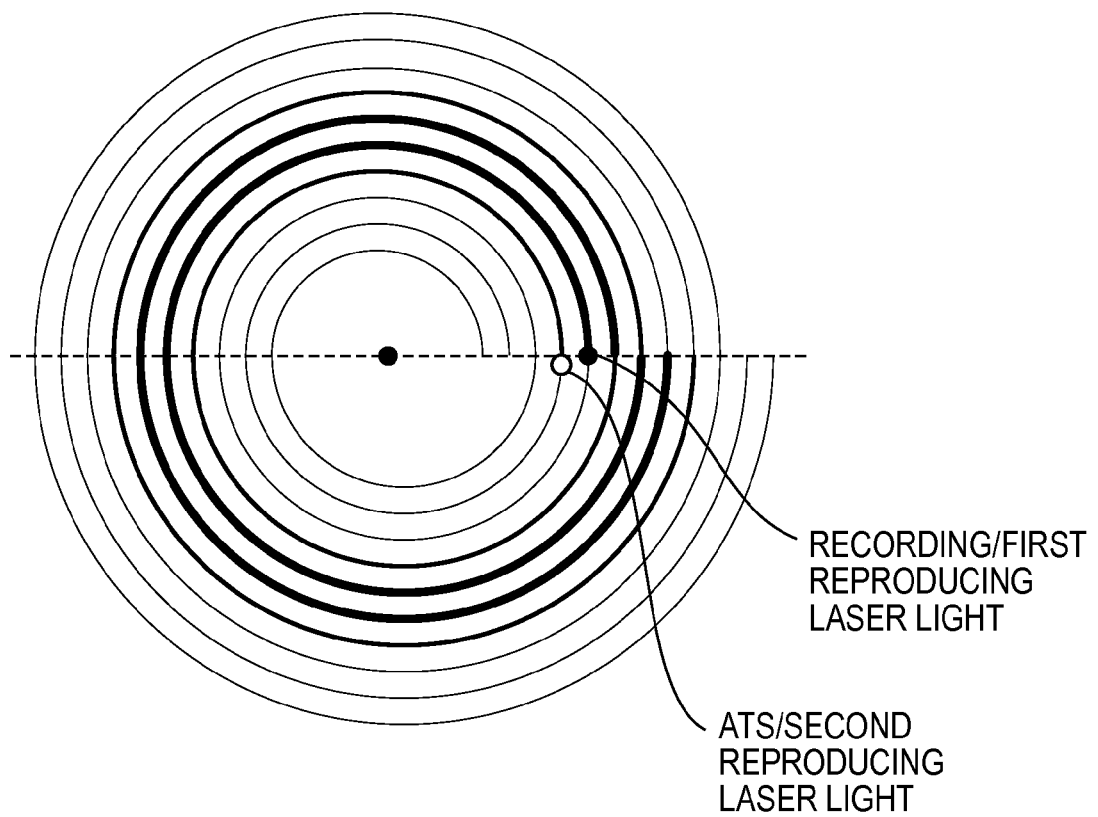
FIG. 34 is an explanatory diagram of a seek technique as a modified example.

FIG. 33 is a diagram illustrating a form in which the seek operation is performed using a track before one track of a spiral set of a reproduction target as a target position based on recording/first reproducing laser light, which is a preceding beam. In FIG. 33 and FIG. 34 to be described later, a thick black line indicates a spiral set serving as a reproduction target and a thick gray line indicates a necessary track to be further read when data of the spiral set serving as the reproduction target is reproduced.

In the example of this drawing, because the recording/first reproducing laser light serving as a preceding beam is positioned on a track before one track of the spiral set of the reproduction target, an ineffective read part (indicated by a dashed line in the drawing) for one round occurs on the side of the ATS/second reproducing laser light, which is the following beam. In addition, on the reproduction end side, an ineffective read part (similarly indicated by a dashed line) for one round occurs on the side of the recording/first reproducing laser light, which is a preceding beam. This is because the ATS/second reproducing laser light undertakes reading of a track after one track of the spiral set of the reproduction target on the reproduction end side.

As illustrated in FIG. 34, a seek operation is performed by targeting a position at which a spot of the following beam is placed on a track on the nearest side among necessary tracks to be read when the cross-talk cancelation process is assumed.

According to this, it is possible to prevent ineffective reading as illustrated in FIG. 33.

In the recording/reproducing apparatus 10 of the embodiment as described above, because position control on the objective lens 20 is executed based on reflected light of the ATS/second reproducing laser light, which is the following beam, it is possible to prevent ineffective reading by performing a seek operation targeting a track positioned on the nearest side among necessary tracks to be simply read in such a case.

In addition, although simultaneous recording of a plurality of spirals on one recording layer 3 has been mentioned in the above description, the recording of the plurality of spirals can be simultaneously performed on a plurality of recording layers 3.

For example, it is possible to improve the recording rate fourfold if simultaneous double-spiral recording is simultaneously executed on two different recording layers 3.

In addition, an example in which a relatively large pitch considering the occurrence of a spot position deviation (track intersection or the like) is set in relation to a pitch of a guide track to be formed during writing has been described above. For example, when the spot position deviation is not considered, it is only necessary to set the pitch of the guide track that is greater than or equal to 2× track pitch TP set on at least the recording layer 3.

If the pitch of the guide track is greater than or equal to track pitch TP×2 as described above, it is possible to prevent the pitches of the second spiral and the first spiral from being less than or equal to the track pitch TP set on the recording layer 3 after side #0 has started writing of the second spiral by performing the pull-in to the first spiral, and prevent the following reading from being disabled.

If recording of threefold or more spirals is considered, it is only necessary that the pitch of the guide track be greater than or equal to at least TP×number of simultaneously recorded spirals as can be defined.

In addition, although an example of a specific technique for enabling side #0 to apply the tracking servo to the latest revolution track of guide tracks has been shown in the above description of step S106 of FIG. 28, a technique for applying the tracking servo to the latest revolution track is not limited to the above-exemplified technique.

For example, the following other technique can be used.

That is, first, after the initiation of recording of a guide track by side #1, side #0 performs a reference-plane seek by targeting a position on the nearer side than the latest revolution track of the guide tracks. After the completion of the reference-plane seek, the tracking servo pull-in is performed when side #0 is trued up to the above-described latest revolution track side and the second ATS spot Sats#0 is in a pull-in range of the above-described latest revolution track.

The above-described technique for applying the tracking servo to the latest revolution track can also be applied as a technique when the tracking servo is newly applied to the latest revolution track of recording tracks by a set with which recording has been started by applying the tracking servo to the latest revolution track of immediately previously recorded tracks when threefold or more spirals are recorded.

Although only recording of user data has been mentioned in relation to a recording technique in accordance with the present application in the above description, the present application, for example, can also be preferably applied in relation to recording of management information to be executed after the user data has been recorded or the like. Here, the user data and management information (data) are collectively referred to as "real data."

In addition, although the recording direction from the inner circumference to the outer circumference is assumed in the above description, the recording direction may be from the outer circumference to the inner circumference.

(1) A recording apparatus including:

a light irradiation unit configured to have two objective lenses by which a reference-plane beam to be radiated to a reference plane and a recording beam and a servo beam to be radiated to a recording layer are incident as optical beams to be radiated to a recording medium having the reference plane on which a position guide is formed and the recording layer formed in a planar shape, and radiate the reference-plane beam, the recording beam, and the servo beam to the recording medium using the objective lenses;

a reference-plane tracking control unit configured to perform tracking control of a first objective lens based on reflected light of a first reference-plane beam and tracking control of a second objective lens based on reflected light of a second reference-plane beam when the reference-plane beam radiated by the first objective lens in the light irradiation unit is designated as the first reference-plane beam and the reference-plane beam radiated by the second objective lens in the light irradiation unit is designated as the second reference-plane beam;

a recording unit configured to execute recording on the recording medium by independently modulating a first recording beam and a second recording beam when the recording beam radiated by the first objective lens is designated as the first recording beam and the recording beam radiated by the second objective lens is designated as the second recording beam;

a recording-layer tracking control unit configured to perform tracking control of the first objective lens based on reflected light of a first servo beam and tracking control of the second objective lens based on reflected light of a second servo beam when the servo beam radiated by the first objective lens is designated as the first servo beam and the servo beam radiated by the second objective lens is designated as the second servo beam; and a control unit configured to control the reference-plane tracking control unit, the recording-layer tracking control unit, and the recording unit, wherein the control unit executes a tracking servo by the second servo beam targeting a latest revolution part on a first spiral recorded by the first recording beam after recording by the first recording beam has been started while the first recording beam is moved by the tracking control of the first objective lens based on the reflected light of the first reference-plane beam so that a spiral with a pitch of at least twice a track pitch recorded on the recording layer is drawn, starts recording by the second recording beam in a state in which the tracking servo by the second servo beam has been applied to the latest revolution part, and executes tracking servo pull-in by the first servo beam targeting a second spiral after the first servo beam has been trued up to the second spiral according to control of the first objective lens.

(2) The recording apparatus according to (1), wherein the control unit controls recording by the second recording beam to be started at a position aligned at a boundary of a minimum recording unit based on a result obtained by referring to address information read from the first spiral by the second servo beam in a state in which the tracking servo by the second servo beam targeting a latest revolution part on the first spiral has been applied.

(3) The recording apparatus according to (1) or (2), wherein the control unit controls the true-up to be started after the first recording beam has been arranged at a recording start position of the second spiral.

(4) The recording apparatus according to any one of (1) to (3), wherein the control unit performs the true-up by forcibly shifting the first objective lens by applying an offset to a servo loop of the tracking servo control of the first objective lens to be performed based on the reflected light of the first reference-plane beam.

(5) The recording apparatus according to any one of (1) to (4), wherein the control unit controls the recording by the first recording beam to be switched from dummy-data recording to real-data recording at a predetermined timing after the tracking servo pull-in for the second spiral of the first servo beam has been performed, and controls the recording by the second recording beam to be switched from dummy-data recording to real-data recording at a position aligned with a real-data recording start position of the first spiral based on a result obtained by referring to address information read from the first spiral by the second servo beam.

(6) A recording apparatus including:

a light irradiation unit configured to have three objective lenses by which a reference-plane beam to be radiated to a reference plane and a recording beam and a servo beam to be radiated to a recording layer are incident as optical beams to be radiated to a recording medium having the reference plane on which a position guide is formed and the recording layer formed in a planar shape, and radiate the reference-plane beam, the recording beam, and the servo beam to the recording medium using the objective lenses;

a reference-plane tracking control unit configured to perform tracking control on the objective lens radiating a received reference-plane beam based on a result obtained by receiving reflected light of the reference-plane beam radiated by the objective lens in the light irradiation unit;

a recording unit configured to execute recording on the recording medium by independently modulating the recording beams radiated by the objective lenses;

a recording-layer tracking control unit configured to perform tracking control on the objective lens radiating a received servo beam based on a result obtained by receiving reflected light of the servo beam radiated by each objective lens; and a control unit configured to control the reference-plane tracking control unit, the recording-layer tracking control unit, and the recording unit, wherein, when one set among sets of recording beams, servo beams, and reference-plane beams to be radiated via the objective lenses is a first set, another set is a second set, and still another set is an $m^{th}$ set, the control unit starts recording of a guide track at a pitch that is greater than or equal to at least a product of a track pitch set on the recording layer and the number of simultaneous recording spirals according to the first set, then starts recording by the recording beam after applying a tracking servo by the servo beam to a latest revolution track of the guide track according to the second set, starts recording by the recording beam by applying the tracking servo to a latest revolution track of recording tracks by a set with which recording has been started by applying the tracking servo to a latest revolution track of immediately previously recorded tracks according to the servo beam for all sets when there are sets other than the first, second, and $m^{th}$ sets, starts recording by the recording beam by applying the tracking servo by the servo beam to a latest revolution track of recording tracks of a set with which the recording has been started by applying the tracking servo to a latest revolution track of immediately previously recorded tracks according to the $m^{th}$ set, and performs pull-in of the tracking servo using a servo beam of the first set by targeting a recording track of the $m^{th}$ set after the servo beam of the first set has been trued up to a recording track side by the $m^{th}$ set according to control of an objective lens of the first set after the start of the recording by the $m^{th}$ set.

(7) A reproducing apparatus including:

a light irradiation unit configured to radiate a reference-plane beam to be radiated to a reference plane and n (n is a natural number greater than or equal to 2) recording-layer beams to be radiated to a recording layer to a recording medium on which data recording has been performed using n or more spirals as one set on the recording layer via a common objective lens, wherein the recording medium has the reference plane on which a position guide is formed and the recording layer formed in a planar shape;

a reference-plane position control unit configured to control a spot position of the reference-plane beam on the reference plane by performing at least position control of the objective lens based on a result obtained by receiving reflected light of the reference-plane beam;

a recording-layer position control unit configured to control a spot position of the recording-layer beam on the recording layer by performing at least position control of the objective lens based on a result obtained by receiving reflected light of at least one recording-layer beam among the recording-layer beams; and a control unit configured to control the reference-plane position control unit and the recording-layer position control unit so that a seek operation is performed by targeting a position at which one of the n recording-layer beams is placed on one corresponding spiral in the n-spiral set on which data serving as a reproduction target has been recorded.

(8) The reproducing apparatus according to (7), wherein the light irradiation unit is configured to have at least two of a first objective lens and a second objective lens as the objective lens and radiate at least (n×2) recording-layer beams by the objective lenses to the recording medium.

(9) The reproducing apparatus according to (8), wherein, after the seek operation, the control unit controls the reference-plane position control unit and the recording-laser position control unit so that reproduction by the n recording-layer beams radiated via the first objective lens and reproduction by the n recording-layer beams radiated via the second objective lens are each executed to overtake another reproduction section.

(10) The reproducing apparatus according to (8) or (9), wherein the control unit distributes reproduction sections so that reproduction section lengths by the n recording-layer beams radiated via each objective lens are equal.

(11) The reproducing apparatus according to (10), wherein the light irradiation unit includes a first optical pickup equipped with the first objective lens and a second optical pickup equipped with the second objective lens, and wherein a slide drive unit is configured to independently slidably drive the first optical pickup and the second optical pickup.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A recording apparatus comprising:
 a light irradiation unit configured to have two objective lenses by which a reference-plane beam to be radiated to a reference plane and a recording beam and a servo beam to be radiated to a recording layer are incident as optical beams to be radiated to a recording medium having the reference plane on which a position guide is formed and the recording layer formed in a planar shape, and radiate the reference-plane beam, the recording beam, and the servo beam to the recording medium using the objective lenses;
 a reference-plane tracking control unit configured to perform tracking control of a first objective lens based on reflected light of a first reference-plane beam and tracking control of a second objective lens based on reflected light of a second reference-plane beam when the reference-plane beam radiated by the first objective lens in the light irradiation unit is designated as the first reference-plane beam and the reference-plane beam radiated by the second objective lens in the light irradiation unit is designated as the second reference-plane beam;
 a recording unit configured to execute recording on the recording medium by independently modulating a first recording beam and a second recording beam when the recording beam radiated by the first objective lens is designated as the first recording beam and the recording beam radiated by the second objective lens is designated as the second recording beam;
 a recording-layer tracking control unit configured to perform tracking control of the first objective lens based on reflected light of a first servo beam and tracking control of the second objective lens based on reflected light of a second servo beam when the servo beam radiated by the first objective lens is designated as the first servo beam and the servo beam radiated by the second objective lens is designated as the second servo beam; and
 a control unit configured to control the reference-plane tracking control unit, the recording-layer tracking control unit, and the recording unit,
 wherein the control unit executes a tracking servo by the second servo beam targeting a latest revolution part on a first spiral recorded by the first recording beam after recording by the first recording beam has been started while the first recording beam is moved by the tracking control of the first objective lens based on the reflected light of the first reference-plane beam so that a spiral with a pitch of at least twice a track pitch recorded on the recording layer is drawn,
 starts recording by the second recording beam in a state in which the tracking servo by the second servo beam has been applied to the latest revolution part, and
 executes tracking servo pull-in by the first servo beam targeting a second spiral after the first servo beam has been trued up to the second spiral according to control of the first objective lens.

2. The recording apparatus according to claim 1, wherein the control unit controls recording by the second recording beam to be started at a position aligned at a boundary of a minimum recording unit based on a result obtained by referring to address information read from the first spiral by the second servo beam in a state in which the tracking servo by the second servo beam targeting a latest revolution part on the first spiral has been applied.

3. The recording apparatus according to claim 1, wherein the control unit controls the true-up to be started after the first recording beam has been arranged at a recording start position of the second spiral.

4. The recording apparatus according to claim 1, wherein the control unit performs the true-up by forcibly shifting the first objective lens by applying an offset to a servo loop of the tracking servo control of the first objective lens to be performed based on the reflected light of the first reference-plane beam.

5. The recording apparatus according to claim 1, wherein the control unit controls the recording by the first recording beam to be switched from dummy-data recording to real-data recording at a predetermined timing after the tracking servo pull-in for the second spiral of the first servo beam has been performed, and
 controls the recording by the second recording beam to be switched from dummy-data recording to real-data recording at a position aligned with a real-data recording start position of the first spiral based on a result obtained by referring to address information read from the first spiral by the second servo beam.

6. A recording method comprising:
 in a light irradiation unit, which has two objective lenses by which a reference-plane beam to be radiated to a reference plane and a recording beam and a servo beam to be radiated to a recording layer are incident as optical beams to be radiated to a recording medium having the reference plane on which a position guide is formed and the recording layer formed in a planar shape, and radiates the reference-plane beam, the recording beam, and the servo beam to the recording medium using the objective lenses, when the reference-plane beam, the recording beam, and the servo beam radiated by the first objective lens in the light irradiation unit are designated as a first reference-plane beam, a first recording beam, and a first servo beam, respectively, and the reference-plane beam, the recording beam, and the servo beam radiated by the second objective lens in the light irradiation unit are designated as a second reference-plane beam, a second recording beam, and a second servo beam, respectively,
 starting recording by the first recording beam while the first recording beam is moved by tracking control of the first objective lens based on the reflected light of the first reference-plane beam so that a spiral with a pitch of at least twice a track pitch recorded on the recording layer is drawn;
executing a tracking servo by the second servo beam targeting a latest revolution part on a first spiral recorded by the first recording beam;
starting recording by the second recording beam in a state in which the tracking servo by the second servo beam has been applied to the latest revolution part; and
executing tracking servo pull-in by the first servo beam targeting a second spiral after the first servo beam has been trued up to the second spiral according to control of the first objective lens.

\* \* \* \* \*